United States Patent
Schulte et al.

(10) Patent No.: US 6,722,504 B2
(45) Date of Patent: Apr. 20, 2004

(54) VIBRATORY SEPARATORS AND SCREENS

(75) Inventors: David L. Schulte, Broussard, LA (US); Thomas C. Adams, Hockley, TX (US); Kenneth W. Seyffert, Houston, TX (US); David W. Largent, Cleveland, TX (US); Guy L. McClung, III, Spring, TX (US); Jeffrey E. Walker, Lafayette, LA (US); Hector M. Murray, Aberdeen (GB)

(73) Assignee: Varco I/P, Inc., Houston, TX (US)

( * ) Notice: Subject to any disclaimer, the term of this patent is extended or adjusted under 35 U.S.C. 154(b) by 66 days.

(21) Appl. No.: 09/971,070

(22) Filed: Oct. 4, 2001

(65) Prior Publication Data

US 2002/0079251 A1 Jun. 27, 2002

Related U.S. Application Data

(63) Continuation-in-part of application No. 09/820,179, filed on Mar. 28, 2001, now Pat. No. 6,607,080, which is a continuation-in-part of application No. 09/707,277, filed on Nov. 6, 2000, now Pat. No. 6,581,781, which is a continuation-in-part of application No. 09/696,662, filed on Oct. 25, 2000, which is a continuation-in-part of application No. 09/634,610, filed on Aug. 5, 2000, now Pat. No. 6,454,099, and a continuation-in-part of application No. 09/228,572, filed on Jan. 11, 1999, now Pat. No. 6,152,307, which is a continuation-in-part of application No. 09/183,005, filed on Oct. 30, 1998, now abandoned, which is a continuation-in-part of application No. 09/090,554, filed on Jun. 4, 1998, now Pat. No. 6,267,247, which is a continuation-in-part of application No. 08/895,976, filed on Jul. 17, 1997, now Pat. No. 5,988,397, which is a continuation-in-part of application No. 08/786,515, filed on Jan. 21, 1997, now Pat. No. 5,971,159, and a continuation-in-part of application No. 08/598,566, filed on Feb. 12, 1996, now abandoned, which is a continuation-in-part of application No. 29/048,575, filed on Jan. 4, 1996, now Pat. No. Des. 377,656, which is a continuation of application No. 29/014,571, filed on Oct. 25, 1993, now Pat. No. Des. 366,040, which is a continuation-in-part of application No. 08/056,123, filed on Apr. 30, 1993, now Pat. No. 5,385,669, said application No. 08/598,566, is a continuation-in-part of application No. 08/504,495, filed on Jul. 20, 1995, now Pat. No. 5,598,930, and a continuation-in-part of application No. 08/220,101, filed on Mar. 30, 1994, now Pat. No. 5,490,598, and a continuation-in-part of application No. 08/105,696, filed on Aug. 12, 1993, now Pat. No. 5,392,925, application No. 09/971,070, which is a continuation-in-part of application No. 09/716,176, filed on Nov. 17, 2000, and a continuation-in-part of application No. 09/544,572, filed on Apr. 6, 2000, now Pat. No. 6,283,302, and a continuation-in-part of application No. 09/517,212, filed on Mar. 2, 2000, and a continuation-in-part of application No. 09/228,572, and a continuation-in-part of application No. 09/183,003, filed on Oct. 30, 1998, and a continuation-in-part of application No. 09/090,554.

(51) Int. Cl.$^7$ .................................................. B07B 1/12
(52) U.S. Cl. ..................... 209/359; 209/360; 209/365.1
(58) Field of Search ................................ 209/359, 360, 209/365.1

(56) References Cited

U.S. PATENT DOCUMENTS 40,242 A   10/1863   Capell (List continued on next page.)

Primary Examiner—Donald P. Walsh
Assistant Examiner—Jonathan R Miller
(74) Attorney, Agent, or Firm—Guy McClung

(57) ABSTRACT

A vibratory separator with a base, vibrating apparatus, a screen container on the base, the screen container having a plurality of spaced-apart drain holes, a plurality of spaced-apart screens in the screen-container, said screens oriented vertically within the screen container, and the screens positioned so that screened fluid passes through the screens and flows from the container through the plurality of spaced-apart drain holes.

13 Claims, 37 Drawing Sheets

U.S. PATENT DOCUMENTS

| | | |
|---|---|---|
| 235,851 A | 12/1880 | Bourne |
| 236,416 A | 1/1881 | Bourne |
| 246,144 A | 8/1881 | Keeler |
| 268,491 A | 12/1882 | Hubbell |
| 275,190 A | 4/1883 | Gilbert |
| 275,340 A | 4/1883 | Kimball |
| 500,302 A | 6/1893 | Stoecket et al. |
| 516,673 A | 3/1894 | Wilson |
| 526,562 A | 9/1894 | Cross |
| 560,858 A | 5/1896 | Missroon |
| 583,981 A | 6/1897 | Plaisted |
| 607,598 A | 7/1898 | Closz |
| 777,317 A | 12/1904 | Traylor |
| 865,185 A | 9/1907 | Kerrigan |
| 948,222 A | 2/1910 | Honabach |
| 964,897 A | 7/1910 | Bryant |
| 966,578 A | 8/1910 | Murphy et al. ......... 209/401 X |
| 984,866 A | 2/1911 | Tate |
| 1,082,612 A | 12/1913 | Smith et al. |
| 1,098,979 A | 6/1914 | Schuchard |
| 1,132,667 A | 3/1915 | Milliot |
| 1,139,041 A | 5/1915 | Larson |
| 1,242,982 A | 10/1917 | Reynolds |
| 1,248,081 A | 11/1917 | Couch |
| 1,250,768 A | 12/1917 | Baumgartner ............... 209/392 |
| 1,344,747 A | 6/1920 | Wright |
| 1,359,426 A | 11/1920 | Plaisted |
| 1,397,339 A | 11/1921 | Sturtevant |
| 1,423,021 A | 7/1922 | Reynolds |
| 1,462,804 A | 7/1923 | Evans |
| 1,505,735 A | 8/1924 | Stebbins |
| 1,561,632 A | 11/1925 | Woodward |
| 1,626,774 A | 5/1927 | Allan |
| 1,614,586 A | 10/1927 | Anderson et al. |
| 1,678,941 A | 7/1928 | Helman |
| 1,713,143 A | 5/1929 | Overstrom |
| 1,716,758 A | 6/1929 | Bland |
| 1,785,195 A | 12/1930 | Hoes et al. |
| 1,822,298 A | 9/1931 | Kerrigan |
| 1,879,377 A | 9/1932 | McNeely |
| 1,950,861 A | 3/1934 | O'Toole, Sr. |
| 1,997,713 A | 4/1935 | Boehm |
| 1,997,740 A | 4/1935 | Nickerson |
| 2,052,467 A | 8/1936 | Harmann .................... 209/401 |
| 2,061,850 A | 11/1936 | Roberts |
| 2,082,513 A | 6/1937 | Roberts |
| 2,089,548 A | 8/1937 | Frantz et al. |
| 2,104,785 A | 1/1938 | Akayson .................... 210/384 |
| 2,190,262 A | 2/1940 | Geist |
| 2,251,909 A | 8/1941 | Lindsay ..................... 210/149 |
| 2,274,700 A | 3/1942 | Jonks |
| 2,335,084 A | 11/1943 | Rice ........................... 209/408 |
| 2,406,051 A | 8/1946 | Weiss |
| 2,462,878 A | 3/1949 | Logue |
| 2,480,320 A | 8/1949 | Carrier ....................... 210/388 |
| 2,511,239 A | 6/1950 | Behnke et al. .............. 209/403 |
| 2,648,441 A | 8/1953 | Soldan |
| 2,667,975 A | 2/1954 | Seaholm ..................... 210/152 |
| 2,670,079 A | 2/1954 | Botta ......................... 209/405 |
| 2,677,462 A | 5/1954 | Conkling .................... 209/403 |
| 2,706,047 A * | 4/1955 | Dockins ..................... 209/360 |
| 2,723,032 A | 11/1955 | Gisler et al. |
| 2,726,184 A | 12/1955 | Cox et al. |
| 2,774,477 A | 12/1956 | Pollitz ....................... 209/403 |
| 2,800,227 A | 7/1957 | Kioer ..................... 209/412 X |
| 2,813,629 A | 11/1957 | Brugmann ................. 209/403 |
| 2,827,169 A | 3/1958 | Cusi |
| 2,902,165 A | 9/1959 | Imershein |
| 2,929,464 A | 3/1960 | Sprouse |
| 2,973,866 A | 3/1961 | Cibula ..................... 209/392 X |
| 2,980,208 A | 4/1961 | Neumann |
| 2,985,303 A | 5/1961 | Wright |
| 3,057,481 A | 10/1962 | Pale ........................... 210/493 |
| 3,070,231 A | 12/1962 | McCorkal et al. ........... 209/319 |
| 3,092,573 A | 6/1963 | Lambert et al. ............. 209/403 |
| 3,165,473 A | 1/1965 | Pall et al. ................... 210/510 |
| 3,176,843 A | 4/1965 | Hoskins et al. ............. 209/403 |
| 3,243,943 A | 4/1966 | Getzin ......................... 55/499 |
| 3,255,885 A | 6/1966 | Burls .......................... 209/314 |
| 3,285,413 A | 11/1966 | Taylor-Smith |
| 3,458,978 A | 8/1969 | Davis ........................... 55/499 |
| 3,465,413 A | 9/1969 | Rosaen et al. ................ 29/428 |
| 3,542,636 A | 11/1970 | Handel ........................ 161/114 |
| 3,574,103 A | 4/1971 | Latkin .......................... 428/72 |
| 3,655,060 A | 4/1972 | Lennart ..................... 210/493 |
| 3,679,057 A | 7/1972 | Perez ......................... 210/223 |
| 3,716,138 A | 2/1973 | Lumsden .................... 209/401 |
| 3,747,770 A | 7/1973 | Zentis ........................ 210/402 |
| 3,747,772 A | 7/1973 | Brown ....................... 210/493 |
| 3,789,498 A | 2/1974 | Cole ......................... 29/470.9 |
| 3,793,692 A | 2/1974 | Tate et al. .................. 29/163.5 |
| 3,853,529 A | 12/1974 | Boothe et al. ................ 55/499 |
| 3,900,628 A | 8/1975 | Stewart |
| 3,929,642 A | 12/1975 | Ennis et al. ................ 210/113 |
| 3,970,549 A | 7/1976 | Ennis et al. ................ 209/341 |
| 4,019,987 A | 4/1977 | Krashow ..................... 210/232 |
| 4,022,596 A | 5/1977 | Pedersen ..................... 55/528 |
| 4,033,865 A | 7/1977 | Derrick, Jr. ................. 209/275 |
| 4,062,769 A | 12/1977 | Simonson ................... 209/399 |
| 4,065,382 A | 12/1977 | Derrick, Jr. ................. 209/313 |
| 4,075,106 A | 2/1978 | Yamazaki ................... 210/487 |
| 4,138,303 A | 2/1979 | Taylor ........................ 156/264 |
| 4,224,146 A | 9/1980 | Kent et al. .................. 209/243 |
| 4,306,974 A | 12/1981 | Harry ......................... 210/388 |
| 4,375,199 A | 3/1983 | Graeme-Barber et al. .. 144/222 |
| 4,380,494 A | 4/1983 | Wilson ....................... 209/319 |
| 4,410,427 A | 10/1983 | Wydeven .................... 210/317 |
| 4,446,022 A | 5/1984 | Harry ......................... 210/388 |
| 4,457,839 A | 7/1984 | Bailey ........................ 209/234 |
| 4,464,242 A | 8/1984 | Boulton ..................... 204/253 |
| 4,472,473 A | 9/1984 | Davis et al. ................. 428/184 |
| 4,546,783 A | 10/1985 | Lott ........................... 134/109 |
| 4,575,421 A | 3/1986 | Derrick et al. ............. 209/397 |
| 4,582,597 A | 4/1986 | Huber ........................ 204/313 |
| 4,589,983 A | 5/1986 | Wydevan .................... 210/317 |
| 4,603,653 A | 8/1986 | Bews .......................... 116/209 |
| 4,617,122 A | 10/1986 | Kruse et al. .............. 210/493.3 |
| 4,634,535 A | 1/1987 | Lott ........................... 210/780 |
| 4,647,373 A | 3/1987 | Tokar et al. ................ 210/232 |
| 4,678,578 A | 7/1987 | Nodes et al. ................ 210/445 |
| 4,696,751 A | 9/1987 | Eifling ....................... 210/780 |
| 4,728,422 A | 3/1988 | Bailey ........................ 210/314 |
| 4,744,898 A | 5/1988 | Bailey ........................ 210/236 |
| 4,769,968 A | 9/1988 | Davis et al. .................. 52/814 |
| 4,819,809 A | 4/1989 | Derrick ...................... 209/275 |
| 4,820,407 A | 4/1989 | Lilie .......................... 209/397 |
| 4,832,834 A | 5/1989 | Baird, Jr. ................... 209/397 |
| 4,846,352 A | 7/1989 | Bailey ........................ 209/399 |
| 4,857,176 A | 8/1989 | Derrick et al. ............. 209/392 |
| 4,882,044 A | 11/1989 | Friessle .................... 209/319 |
| 4,882,054 A | 11/1989 | Derrick et al. ............. 210/389 |
| 4,892,767 A | 1/1990 | Friessle ...................... 428/52 |
| 4,940,500 A | 7/1990 | Tadokoro et al. ........... 156/204 |
| 4,954,249 A | 9/1990 | Gero et al. .................. 209/273 |
| 5,028,474 A | 7/1991 | Czaplicki ................... 428/178 |
| 5,056,286 A | 10/1991 | Bokor ......................... 52/483 |
| 5,084,178 A | 1/1992 | Miller et al. .............. 210/493.5 |
| 5,137,622 A | 8/1992 | Souter ........................ 209/403 |
| 5,139,154 A | 8/1992 | Gero et al. .................. 209/273 |
| 5,162,143 A | 11/1992 | Porter et al. ................ 428/179 |
| 5,167,740 A | 12/1992 | Michaelis et al. .......... 156/73.1 |

| | | | |
|---|---|---|---|
| 5,211,291 A | 5/1993 | Kelley et al. | 209/680 |
| 5,221,008 A | 6/1993 | Derrick, Jr. et al. | 209/269 |
| 5,256,292 A | 10/1993 | Cagle | 210/499 |
| 5,312,508 A | 5/1994 | Chisholm | 156/292 |
| 5,330,057 A | 7/1994 | Schiller et al. | 209/392 |
| 5,385,669 A | 1/1995 | Leone, Sr. | 210/488 |
| 5,392,925 A | 2/1995 | Seyffert | 209/405 |
| 5,417,793 A | 5/1995 | Bakula | 156/308.2 |
| 5,417,858 A | 5/1995 | Derrick et al. | 210/388 |
| 5,417,859 A | 5/1995 | Bakula | 210/388 |
| 5,490,598 A | 2/1996 | Adams | 209/403 X |
| 5,614,094 A | 3/1997 | Deister et al. | 210/388 |
| 5,626,234 A | 5/1997 | Cook et al. | 209/315 |
| 5,636,749 A | 6/1997 | Wojciechowski | 209/403 |
| 5,667,661 A | 9/1997 | Hughes | 205/138 |
| 5,720,881 A | 2/1998 | Derrick et al. | 210/388 |
| 5,783,077 A | 7/1998 | Bakula | 210/388 |
| 5,814,218 A | 9/1998 | Cagle | 210/388 |
| 5,819,952 A | 10/1998 | Cook et al. | 209/400 |
| 5,851,393 A | 12/1998 | Carr et al. | 204/489 |
| 5,868,929 A | 2/1999 | Derrick et al. | 210/388 |
| 5,876,552 A | 3/1999 | Bakula | 156/308.2 |
| 5,921,399 A | 7/1999 | Bakula et al. | 209/272 |
| 5,927,511 A | 7/1999 | Riddle et al. | 209/405 |
| 5,944,197 A | 8/1999 | Batlzer et al. | 209/400 |
| 5,944,993 A | 8/1999 | Derrick et al. | 210/388 |
| 5,950,841 A | 9/1999 | Knox et al. | 209/315 |
| 5,958,236 A | 9/1999 | Bakula | 210/388 |
| 5,967,336 A | 10/1999 | Baltzer et al. | 209/403 |
| 6,053,332 A | 4/2000 | Bakula | 210/388 |
| 6,269,954 B1 | 8/2001 | Baltzer | 209/405 |

* cited by examiner

*Fig.1D*
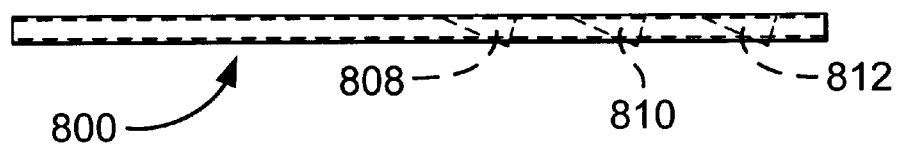
*Fig.1E*
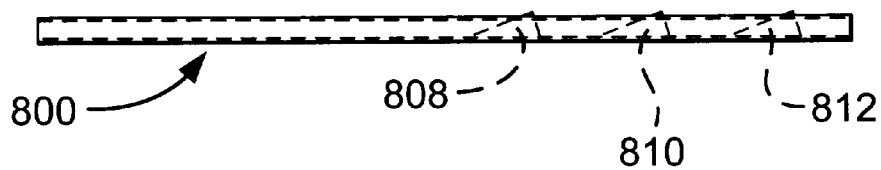
*Fig.1F*
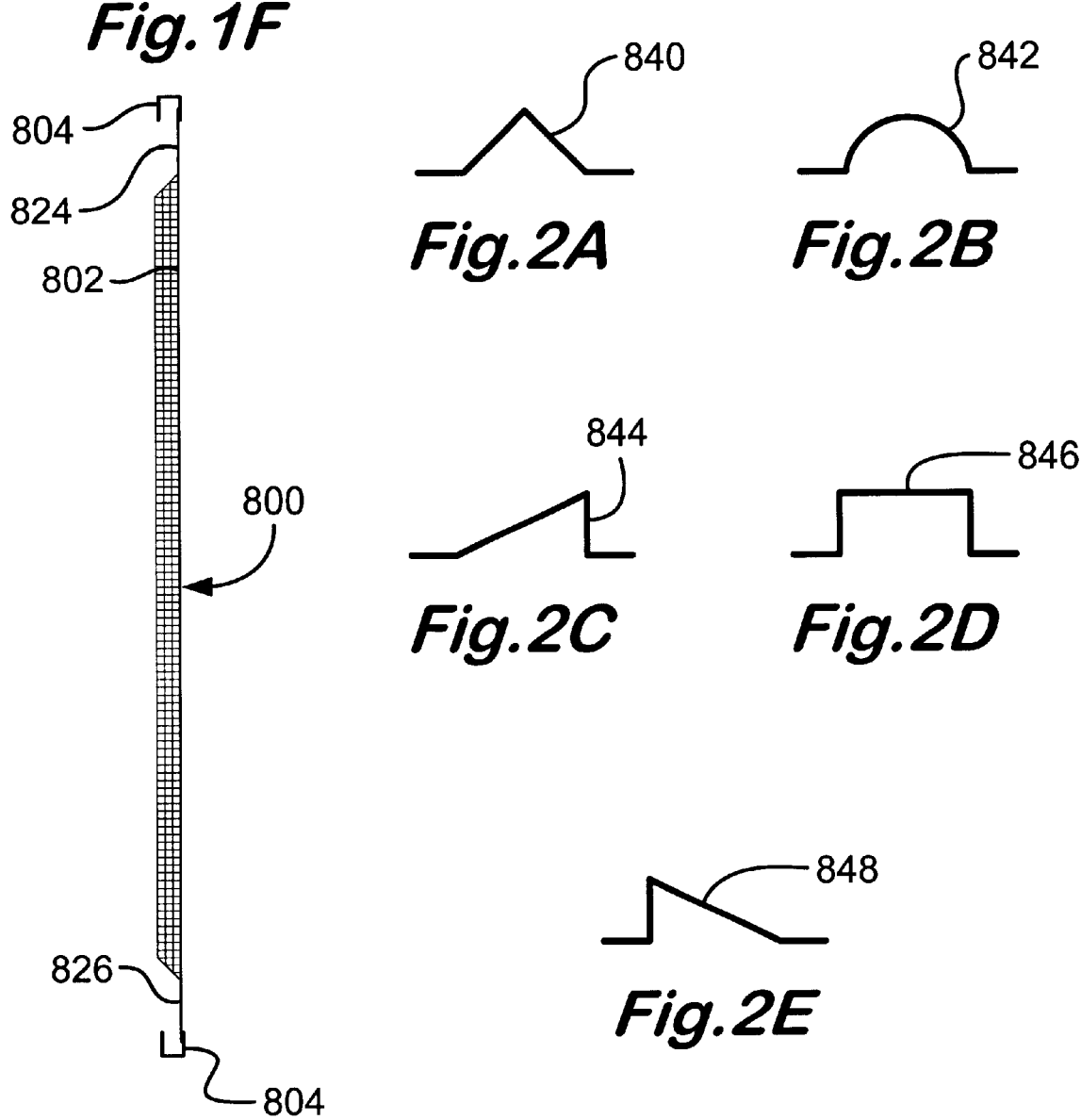
*Fig.2A*
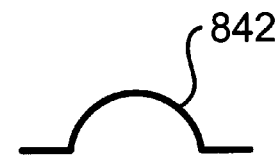
*Fig.2B*
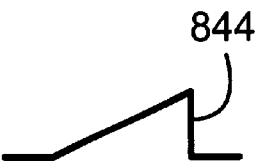
*Fig.2C*
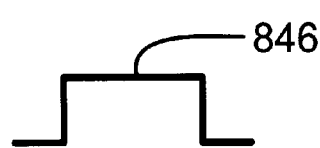
*Fig.2D*
*Fig.2E*

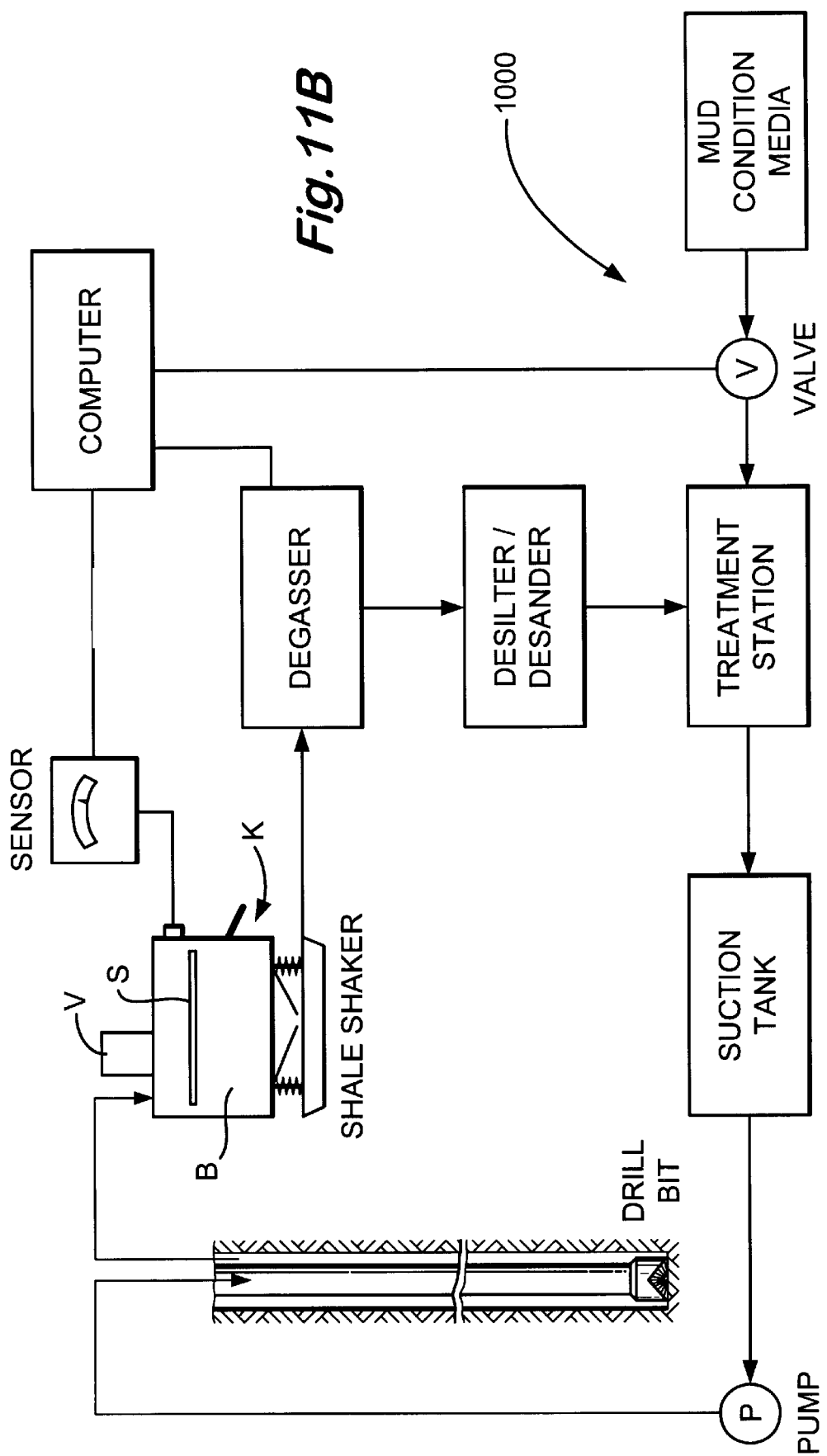

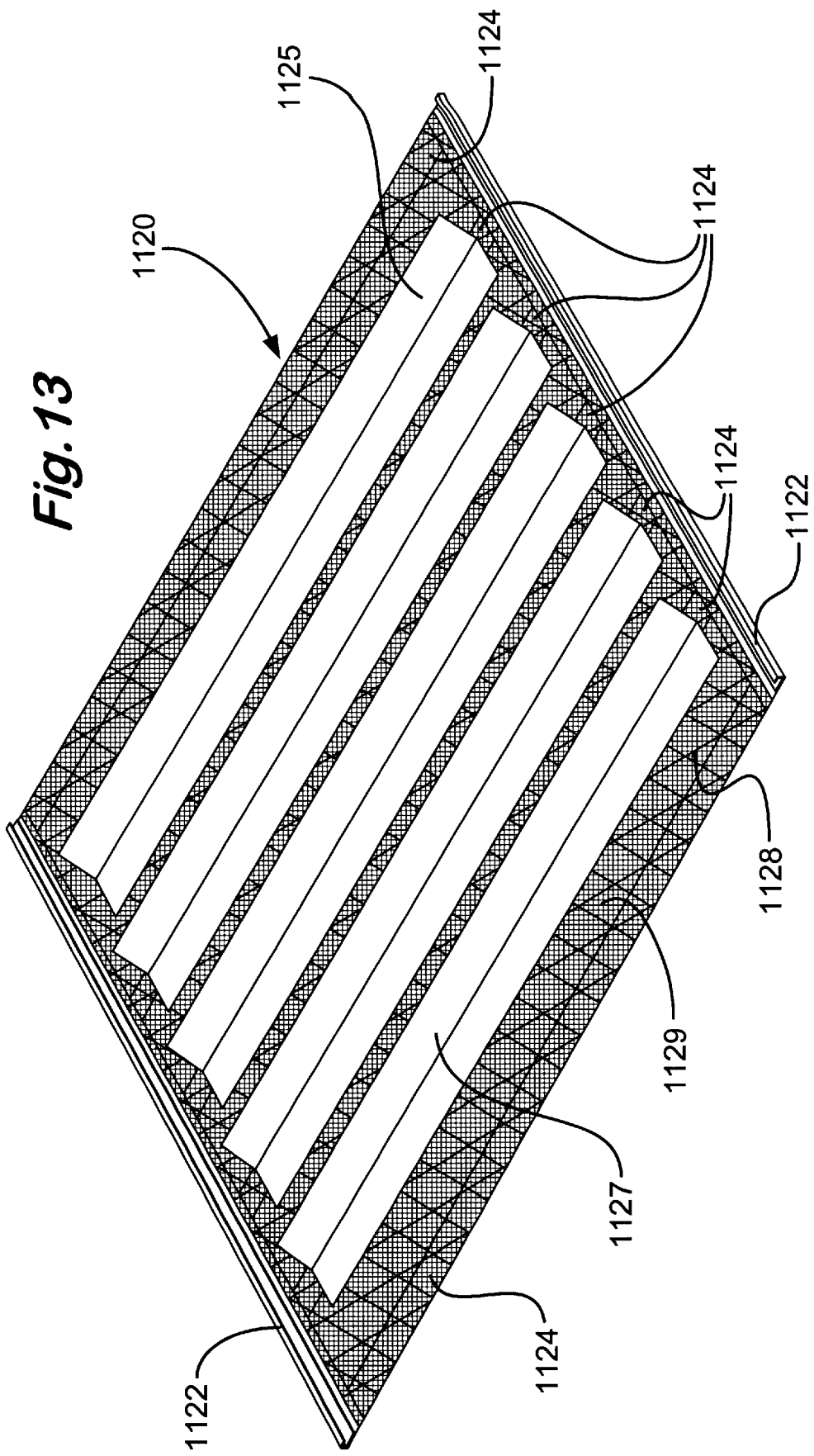

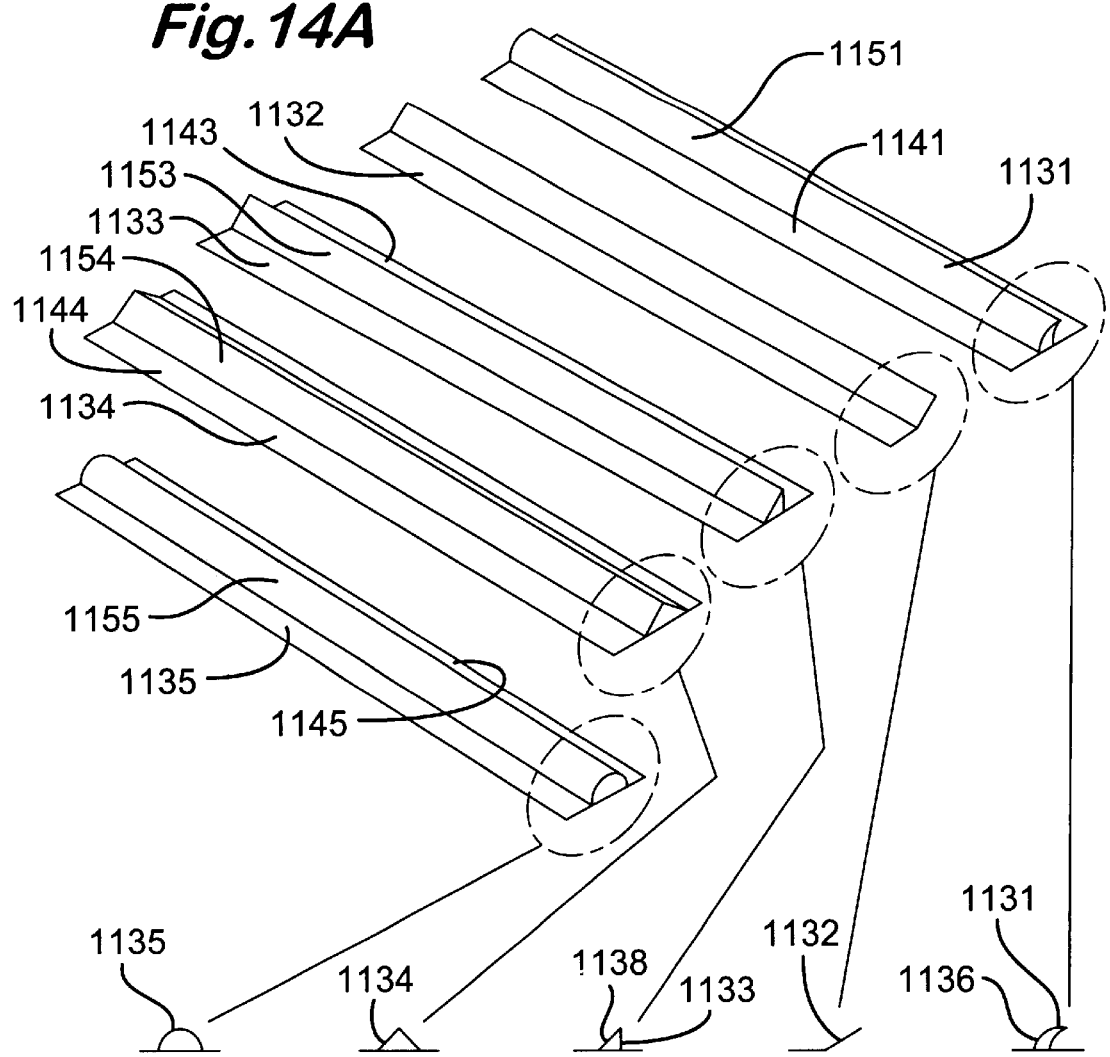
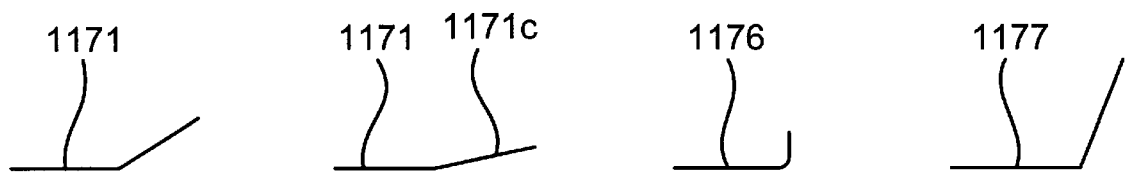

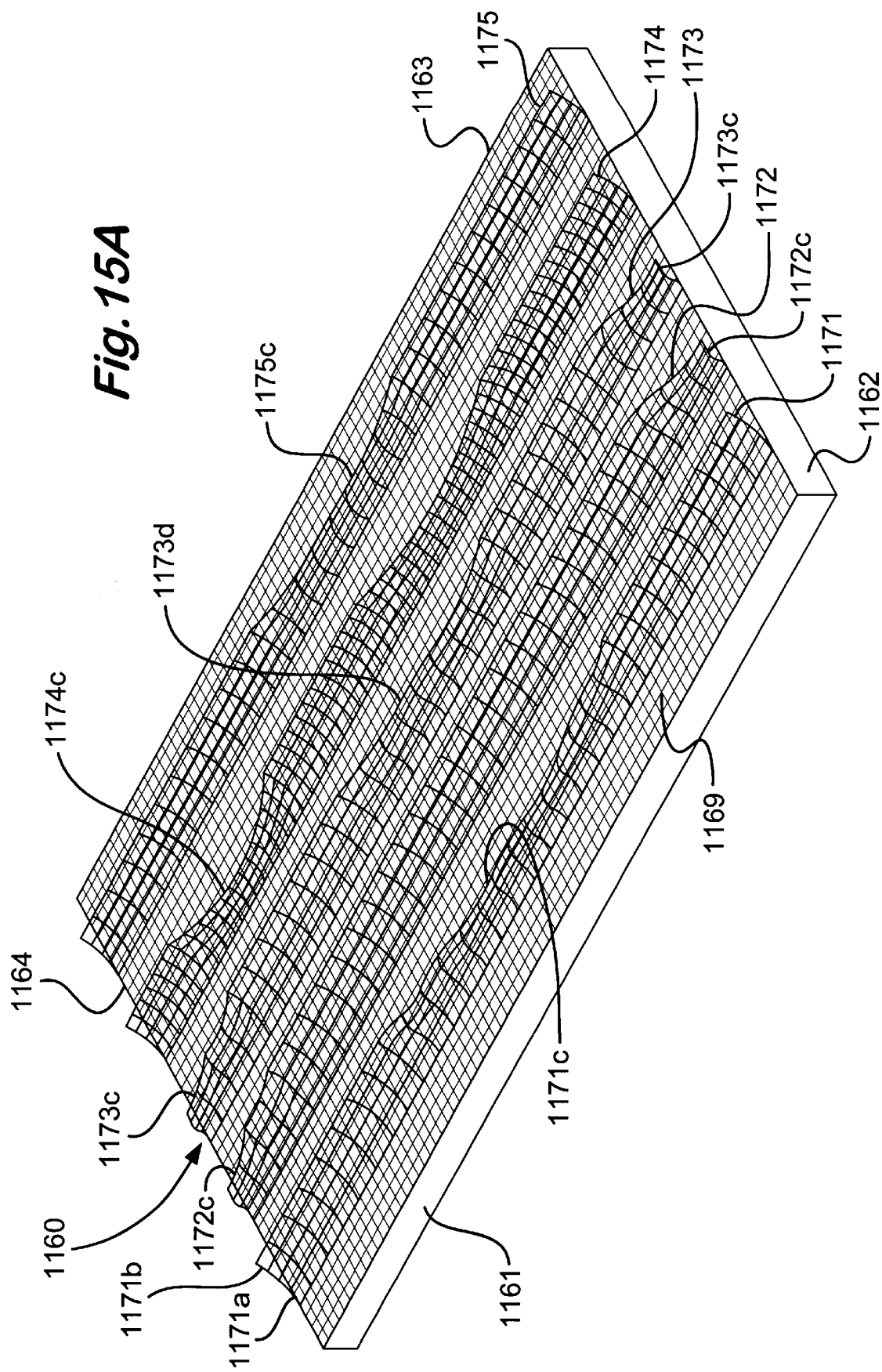

*Fig. 17A*
*Fig. 17B*
*Fig. 18A*
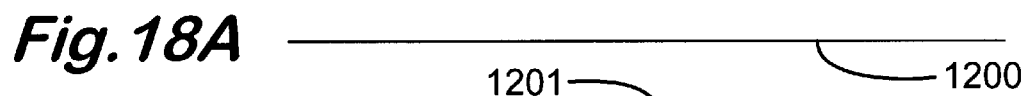
*Fig. 18B*
*Fig. 19A*
*Fig. 19B*
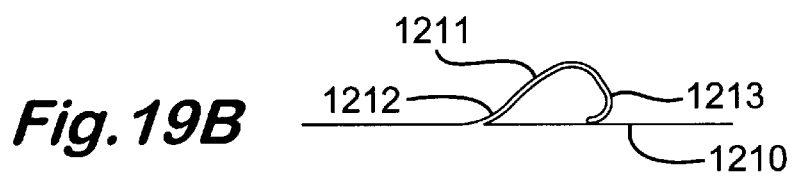
*Fig. 20A*
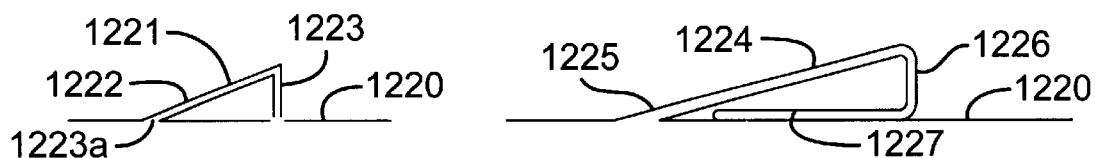
*Fig. 20B*     *Fig. 20C*
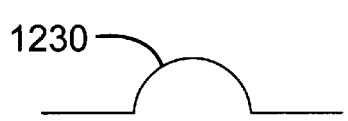 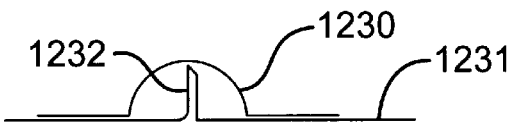
*Fig. 21A*     *Fig. 21B*
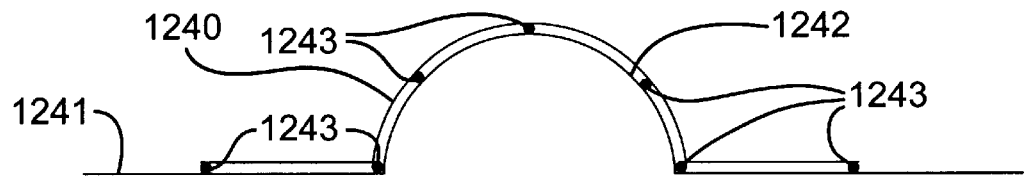
*Fig. 22*

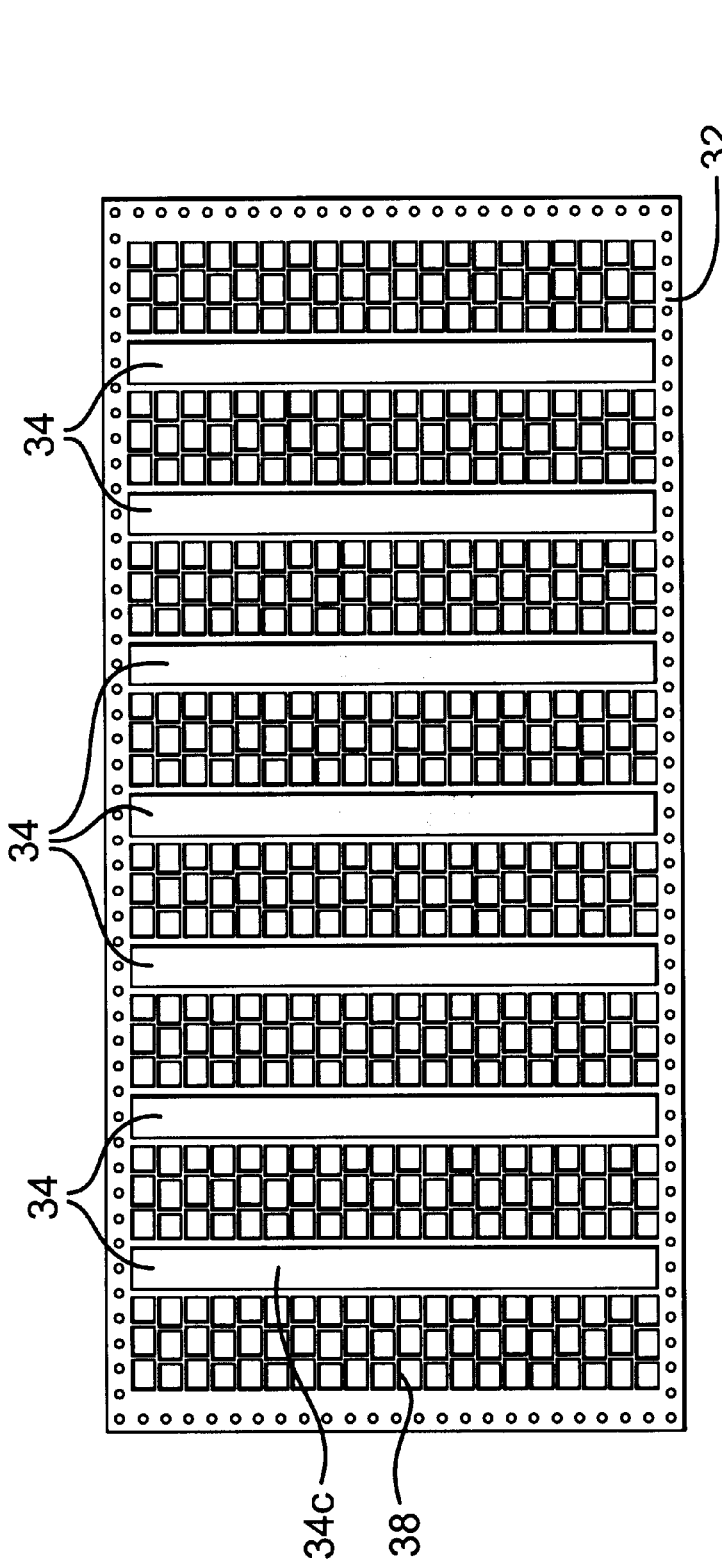
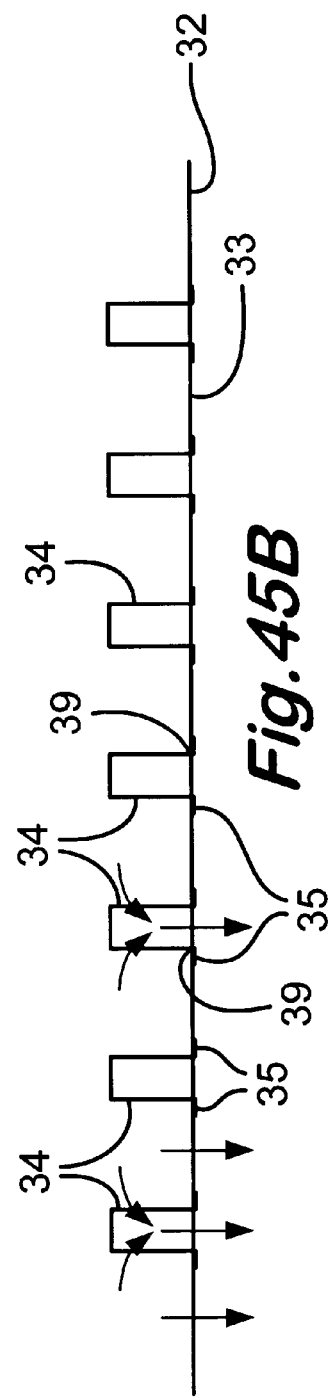

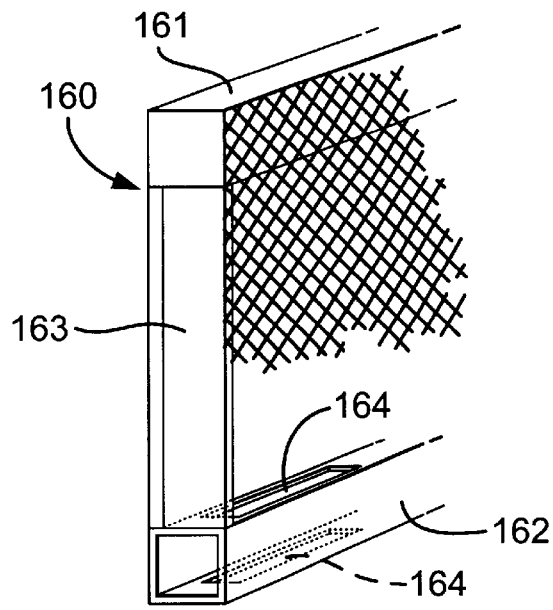
*Fig.50A*
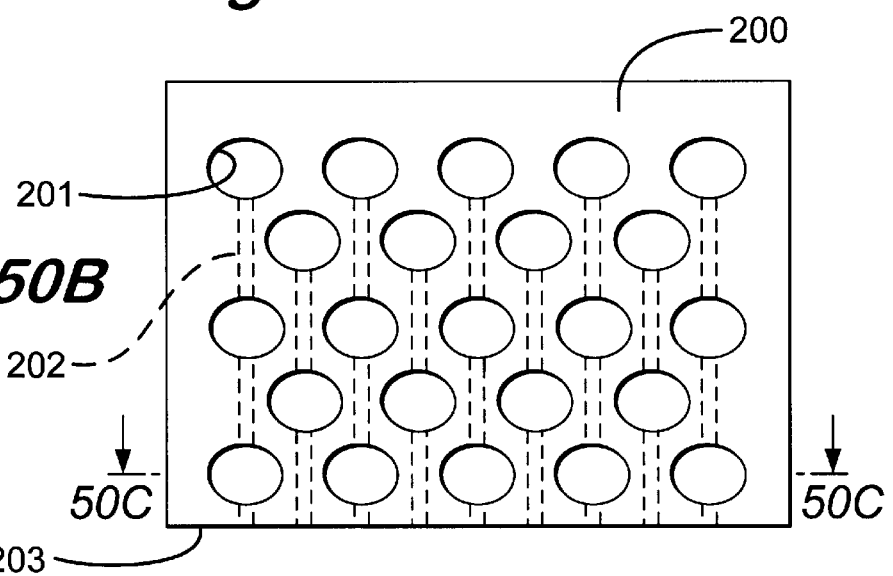
*Fig.50B*
*Fig.50C*
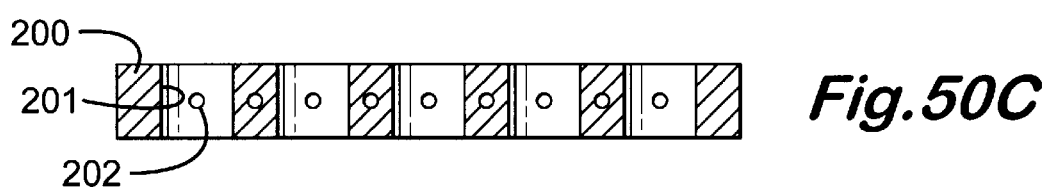
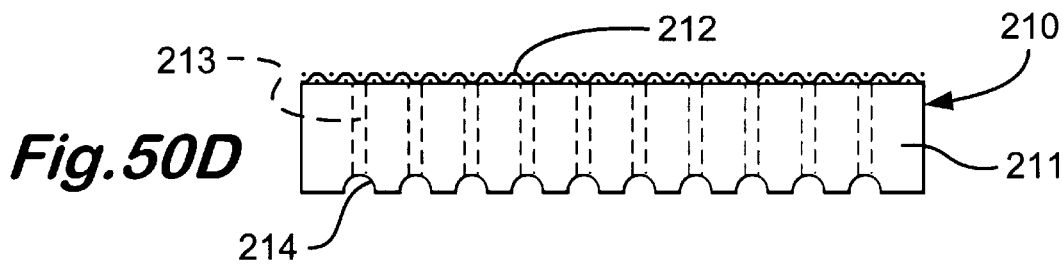
*Fig.50D*

VIBRATORY SEPARATORS AND SCREENS

RELATED APPLICATIONS

This is a continuation-in-part of U.S. application Ser. No. 09/820,179 filed Mar. 28, 2001 now U.S. Pat. No. 6,607,080, which is a continuation-in-part of U.S. application Ser. No. 09/707,277 filed Nov. 6, 2000 now U.S. Pat. No. 6,581,781, which is a continuation-in-part of U.S. application Ser. No. 09/696,662 filed Oct. 25, 2000 which is a continuation-in-part of U.S. application Ser. No. 09/634,610 filed Aug. 5, 2000, now U.S. Pat. No. 6,454,099, a continuation-in-part of U.S. application Ser. No. 09/228,572 filed Jan. 11, 1999 now U.S. Pat. No. 6,152,307, which is a continuation-in-part of U.S. application Ser. No. 09/183,005 filed Oct. 30, 1998, now abandoned which is a continuation-in-part of U.S. application Ser. No. 09/090,554 filed Jun. 4, 1998 now U.S. Pat. No. 6,267,247 which is a continuation-in-part of U.S. application Ser. No. 08/895,976 filed Jul. 17, 1997 now U.S. Pat. No. 5,988,397 which is a continuation-in-part of U.S. application Ser. No. 08/786,515 filed Jan. 21, 1997 now U.S. Pat. No. 5,971,159 and of U.S. application Ser. No. 08/598,566 filed Feb. 12, 1996 now abandoned which is a continuation in part of the following co-owned applications and patents: U.S. Ser. No. 29/048,575 filed Jan. 4, 1996, now U.S. Pat. No. D 377,656 issued Jan. 28, 1997 which is a continuation of U.S. Ser. No. 29/014,571 filed Oct. 25, 1993, now U.S. Pat. No. D 366,040 issued on Jan. 9, 1996 which is a continuation-in-part of U.S. applications Ser. No. 08/056,123 filed Apr. 30, 1993, now U.S. Pat. No. 5,385,669 issued on Jan. 31, 1995; and Ser. No. 08/105,696 filed Aug. 12, 1993, now U.S. Pat. No. 5,392,925 issued on Feb. 28, 1995; U.S. Ser. No. 08/504,495 filed Jul. 20, 1995 now U.S. Pat. No. 5,598,930; U.S. Ser. No. 08/598,566 filed Feb. 12, 1996 now abandoned which is a continuation-in-part of U.S. Ser. No. 08/220,101 filed Mar. 30, 1994 now U.S. Pat. No. 5,490,598 issued Feb. 13, 1996. This is a continuation-in-part of U.S. applications Ser. Nos. 09/517,212 filed Mar. 2, 2000; 09/544,572 filed Apr. 6, 2000 now U.S. Pat. No. 6,283,302; 09/228,572 filed Jan. 11, 1999 now U.S. Pat. No. 6,152,307; and 09/183,003 filed Oct. 30, 1998. This is a continuation-in-part of U.S. application Ser. No. 09/090,554 filed Jun. 4, 1998 now U.S. Pat. No. 6,267,247 entitled "Vibratory Separator Screen" which is a continuation-in-part of U.S. application Ser. No. 08/895,976 filed Jul. 17, 1997 now U.S. Pat. No. 5,988,397 entitled "Screen For Vibratory Shaker" which is a continuation-in-part of U.S. application Ser. No. 08/786,515 filed Jan. 21, 1997 now U.S. Pat. No. 5,971,159 entitled "Screen For Shale Shaker" and of U.S. application Ser. No. 08/598,566 filed Feb. 12, 1996 now abandoned entitled "Screen For Vibrating Separator." U.S. application Ser. No. 08/786,515 is a continuation in part of the following co-owned applications and patents: U.S. Ser. No. 29/048,575 filed Jan. 4, 1996, now U.S. Pat. No. D 377,656 issued Jan. 28, 1997 which is a continuation of U.S. Ser. No. 29/014,571, now U.S. Pat. No. D 366,040 issued on Jan. 9, 1996 which is a continuation-in-part of U.S. applications Ser. No. 08/056,123 filed Apr. 30, 1993, now U.S. Pat. No. 5,385,669 issued on Jan. 31, 1995; and Ser. No. 08/105,696 filed Aug. 12, 1993, now U.S. Pat. No. 5,392,925 issued on Feb. 28, 1995; U.S. Ser. No. 08/504,495 filed Jul. 20, 1995 now U.S. Pat. No. 5,598,930 entitled "Shale Shaker Screen;" U.S. Ser. No. 08/598,566 filed Feb. 12, 1996 now abandoned entitled "Screen For Vibrating Separator" which is a continuation-in-part of U.S. Ser. No. 08/220,101 filed Mar. 30, 1994 now U.S. Pat. No. 5,490,598 issued Feb. 13, 1996. This is a continuation-in-part of U.S. Ser. No. 09/183,004 filed Oct. 30, 1998.

This is a continuation-in-part of U.S. application Ser. No. 09/716,176 filed Nov. 17, 2000. All of these related applications and patents are incorporated herein in their entirety for all purposes.

BACKGROUND OF THE INVENTION

1. Field of the Invention

The present invention is directed to vibratory separators and shale shakers, such separators and shakers with one or more vertically oriented screens, screens that may be used therein in a vertical orientation, and methods of use.

2. Description of Related Art

The related art section of each of the above-identified applications is incorporated here fully by reference.

SUMMARY OF THE PRESENT INVENTION

The present invention discloses, in at least certain embodiments, a vibratory separator, e.g., but not limited to a shale shaker, which has: a base; vibrating apparatus; a screen container on the base, the screen container having a plurality of spaced-apart drain holes; a plurality of spaced-apart screens in the screen-container, said screens oriented vertically within the screen container, and the screens positioned so that screened fluid passes through the screens and flows from the container through the plurality of spaced-apart drain holes. Screens a separator or shaker may also have a screen or screens positioned beneath the container for screening material that flows down from the container. The container may have at least one bottom opening through which fluid to be treated is passable without passing through a screen of the plurality of spaced-apart screens and selectively movable gate apparatus for selectively opening the at least one bottom opening to allow the fluid to be treated to pass through.

Screens of the plurality of spaced-apart screens may have two spaced apart screening sides and the container may have a plurality of screen mounting slots with a pair of mounting slots corresponding to each screen of the plurality of spaced-apart screens, each slot of each pair of mounting slots for receiving part of a screening side What follows are some of, but not all, the objects of this invention. In addition to the specific objects stated below for at least certain preferred embodiments of the invention, other objects and purposes will be readily apparent to one of skill in this art who has the benefit of this invention's teachings and disclosures. It is, therefore, an object of at least certain preferred embodiments of the present invention to provide:

New, useful, unique, efficient, nonobvious vibratory separators (including, but not limited to, shale shakers) with one or with a plurality of two or more vertically oriented screens for treating fluid, including, but not limited to drilling fluid, which has suspended solids therein;

New, useful, unique, efficient, nonobvious containers for screens; and

New, useful, unique, efficient, nonobvious screens for mounting vertically in such separators.

Certain embodiments of this invention are not limited to any particular individual feature disclosed here, but include combinations of them distinguished from the prior art in their structures and functions. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods. To one skilled in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

BRIEF DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

FIGS. 2A–2E are cross-section views of screen ramp portions according to the present invention.

FIG. 11B is a schematic view of a system according to the present invention.

FIGS. 12A, 12B and 13 are perspective views of screen assemblies according to the present invention.

FIG. 14A presents perspective views of a variety of components according to the present invention for screen assemblies according to the present invention. FIG. 14B presents end views of the components of FIG. 14A.

FIG. 15A is a perspective view of a screen assembly according to the present invention. FIGS. 15B and 15C present cross-section views of parts of the screen assembly of FIG. 15A. FIGS. 15D and 15E present alternative configurations for screen components according to the present invention.

FIGS. 17A, 18A, 19A and 20A present a side view of a piece of material, screen or mesh which is formed into the screen components shown, respectively in FIGS. 17B, 18B, 19B, 20B and 20C.

FIG. 21A is a side view of a screen component according to the present invention. FIG. 21B shows the component of FIG. 21A on a screen according to the present invention.

FIG. 22 is a side view of a screen component (as in FIG. 21A) on a screen according to the present invention and FIGS. 23A–23C are side view of a screen according to the present invention.

FIG. 45A is a top view of part of the screen of FIG. 45D. FIG. 45B is a cross-section view of parts of the screen of FIG. 45D.

FIG. 50A is a perspective view of a frame according to the present invention for a screen according to the present invention. FIG. 50B is a top view of a perforated plate according to the present invention. FIG. 50C is a cross-section view along line 50C—50C of FIG. 50B. FIG. 50D is a top view of the plate of FIG. 50B.

DESCRIPTION OF EMBODIMENTS PREFERRED AT THE TIME OF FILING FOR THIS PATENT

Figure 1A:
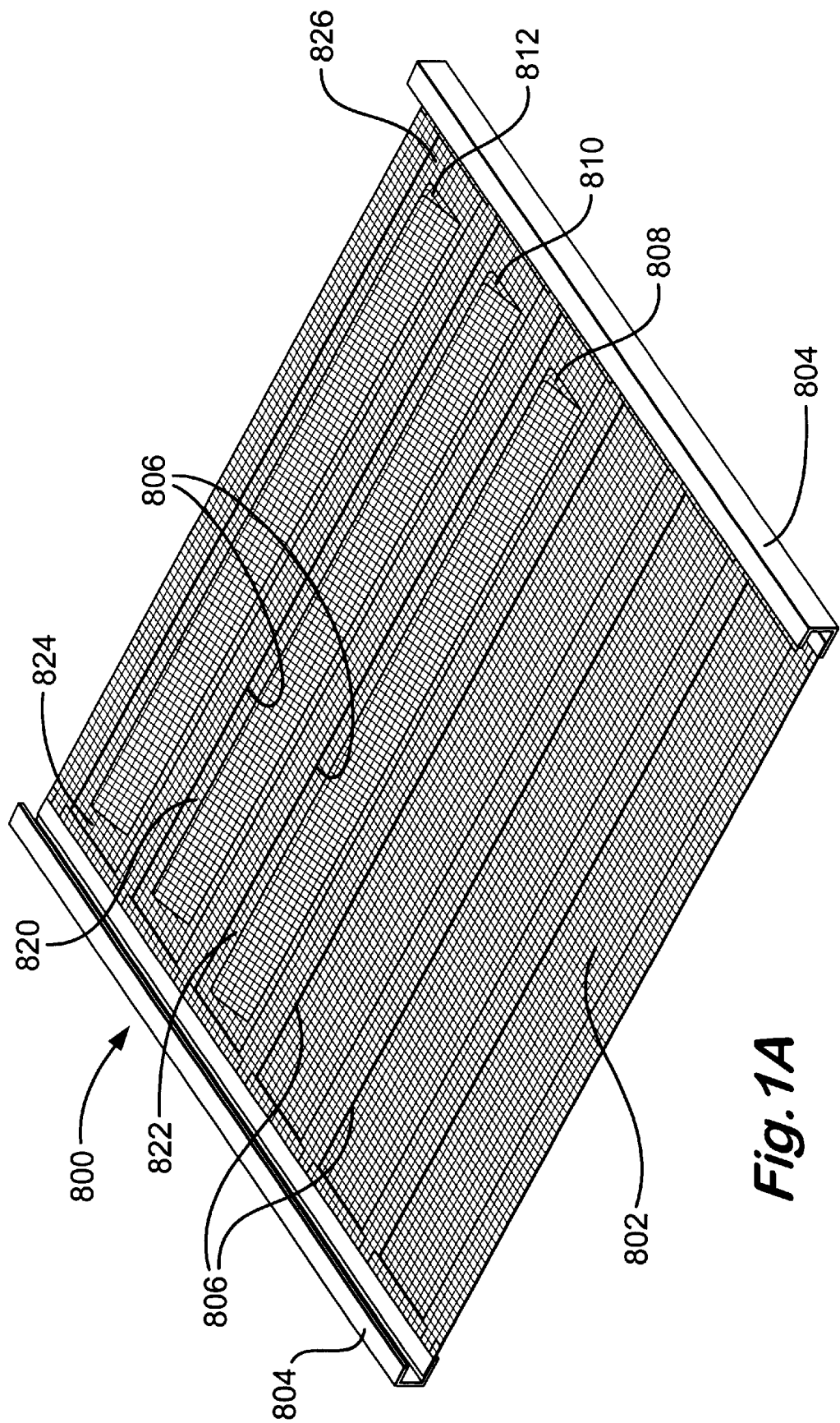
FIG. 1A is a perspective view of a screen according to the present invention.
Figure 1B:
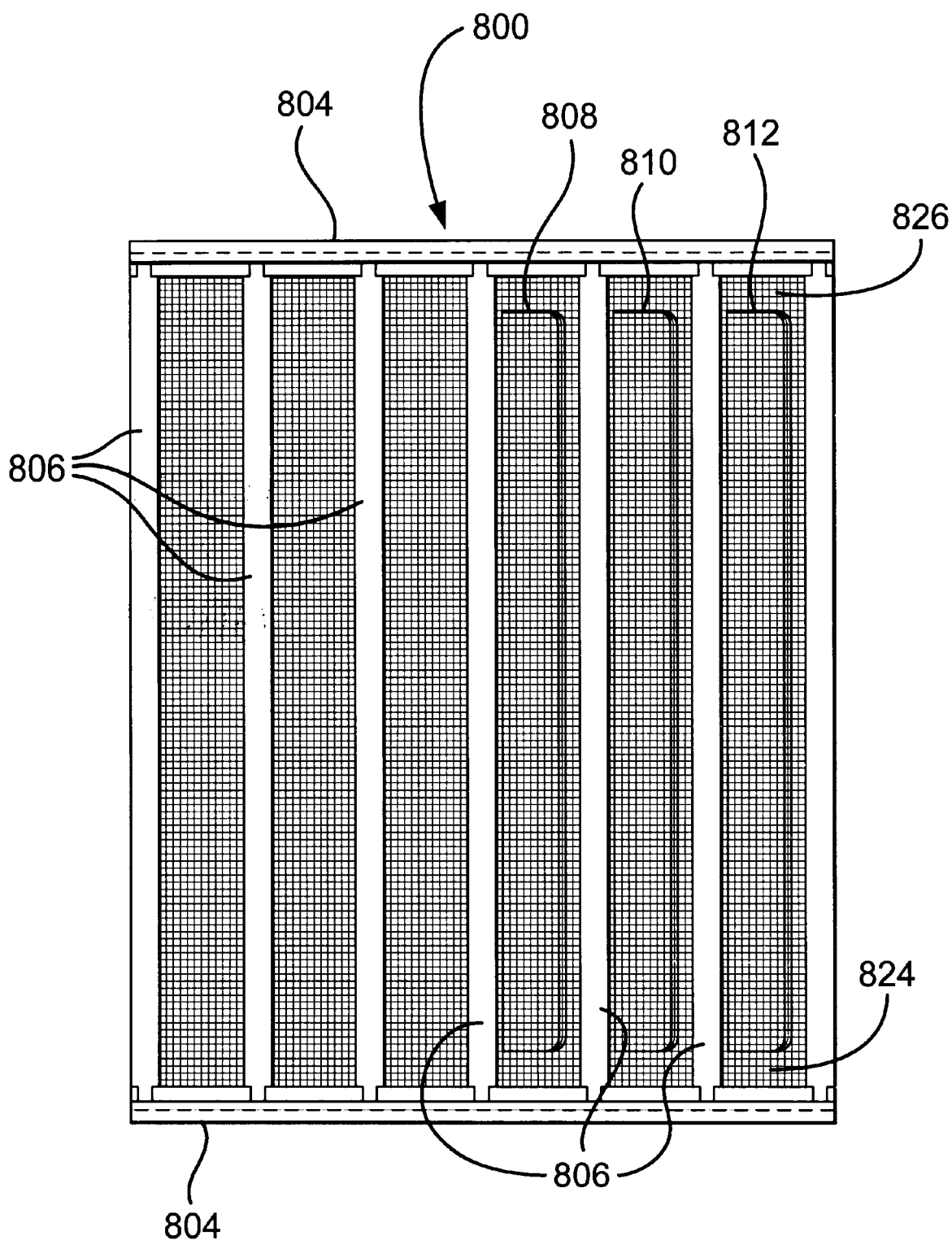
FIG. 1B is a bottom view, FIG. 1C a top view, FIG. 1D a side view, FIG. 1E a side view, and FIG. 1F an end view of the screen of FIG. 1A.

FIG. 1A shows a screen 800 according to the present invention with mesh 802 supported on spaced-apart straps 806. The mesh 802 may be any suitable known mesh, screen, meshes, screens, or combination thereof, secured together or lying on each other and/or partially bonded or sintered together, or so connected to each other over substantially all of their area. In the screen 800, the mesh 802 is, in one aspect, a wire mesh that is bonded to the straps 806.

The straps 806 are secured to hookstrips 804, e.g. as previously described for straps herein.

As shown, the screen 800 has three spaced-apart ramps 808, 810, 812. A dewatering area or pool 822 is defined between the two ramps 808, 810 and a dewatering area or pool 820 is defined between the two ramps 810, 812. Side flow paths 824, 826 are positioned between ends of the ramps 808, 810, 812 and the hookstrips 804.

Figure 1C:
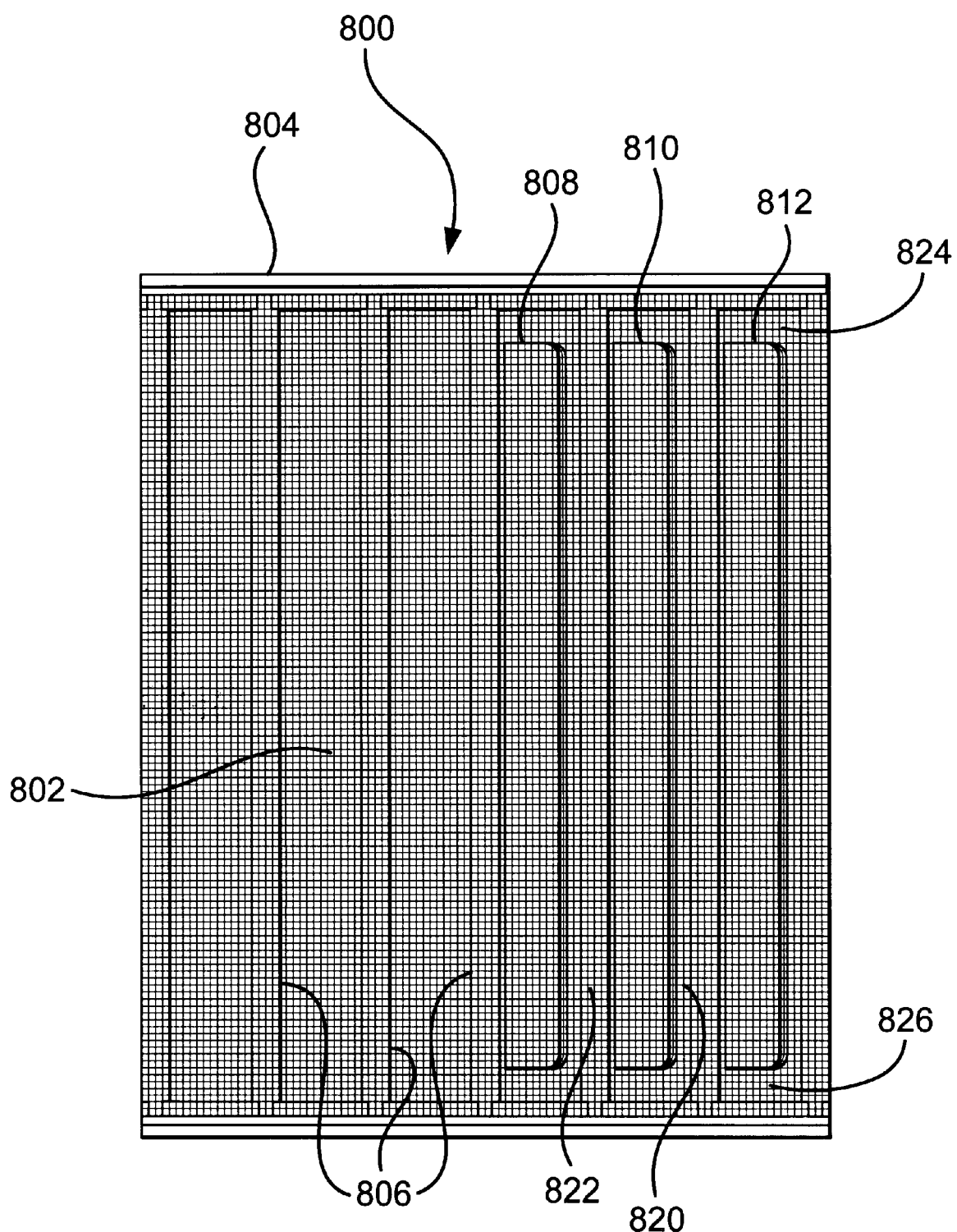

In one aspect the ramp 808 is located so that fluid material is introduced onto the screen 800 in an area behind (to the left in FIG. 1C) the ramp 808 and which includes one of the straps 806 therebeneath to counter effects of the impact of the fluid material on the wire mesh 802 in this area. Also such a location of the ramp 808 with respect to the strap 806 facilitates dewatering of solids in this area while inhibiting screen wear. Liquid rising to the top can exit through the screen ramp. Similarly a strap 806 traverses the areas 822 and 826.

Alternatively, the ramp portions and straps may be positioned so that any or part of the ramp portions overlie a strap or a portion of a strap. The ramp portions may be spaced apart any desired distance. In one aspect the screen 800 is about 36 inches by 45½ inches; the right-hand edge (as viewed in FIG. 1C) of the ramp 808 is between about three to about five inches or more from the left-hand edge of the ramp 810; the right-hand edge of the ramp 810 is between about three to about five inches or more from the left-hand edge of the ramp 812; the right-hand edge of the ramp 812 is between about three to about five inches or more from the right edge of the screen 800; and the ramps are between about three to about five inches wide (horizontal dimension as viewed in FIG. 1E) and about ½ inch high (as in FIG. 1E). Each ramp 808, 810, 812 has a ramped surface 808a, 810a, 812a, respectively at an angle, preferably, between about twenty to about forty degrees from the horizontal, more preferably between about twenty-five to about thirty degrees, and in one particular aspect about twenty seven-degrees. Each ramp also has a rear face at between about eighty to about one hundred twenty-five degrees to the horizontal, more preferably between ninety and one hundred twenty degrees, and in one particular aspect about one hundred fifteen degrees.

FIGS. 2A–2E show cross-section views for a variety of ramp profiles 840–848 according to the present invention. In certain preferred embodiments ramp heights range between ¼ inch and 1½ inches and ramp widths range between about one inch and about five inches.

Figure 3:
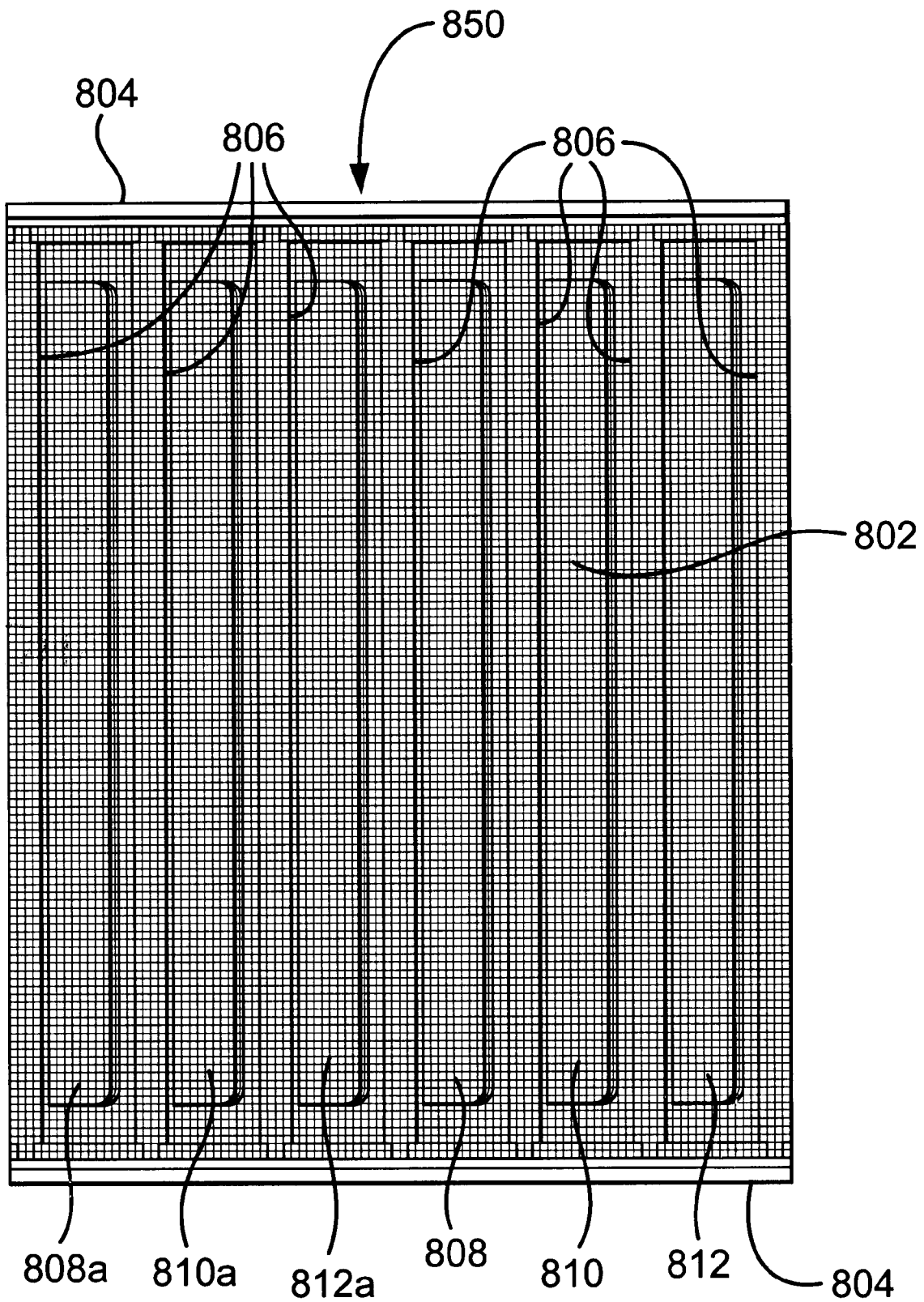
FIGS. 3–5 are top views of screens according to the present invention.

It is within the scope of this invention to provide a screen with one, two, three, four, five, six or more ramps and the ramps may be the same or different on a multi-ramp screen—and may be any ramp with any profile disclosed herein. FIG. 3 shows a screen 850 like the screen 800 (and like numerals indicate the same parts), but with an additional series of ramps 808a, 810a, 812a.

Figure 4:
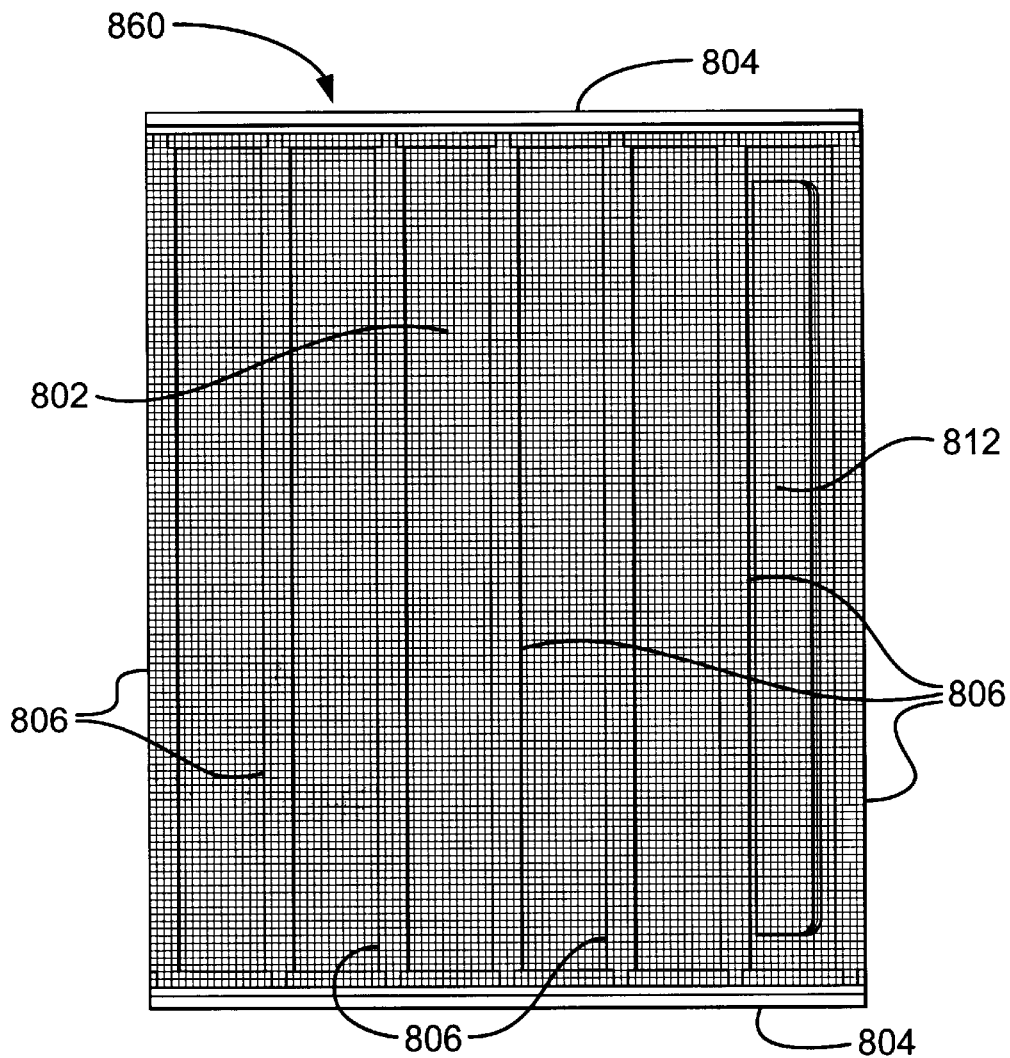

FIG. 4 shows a screen 860 like the screen 800 (and like numerals indicate the same parts), but with only one ramp 812.

Figure 5:
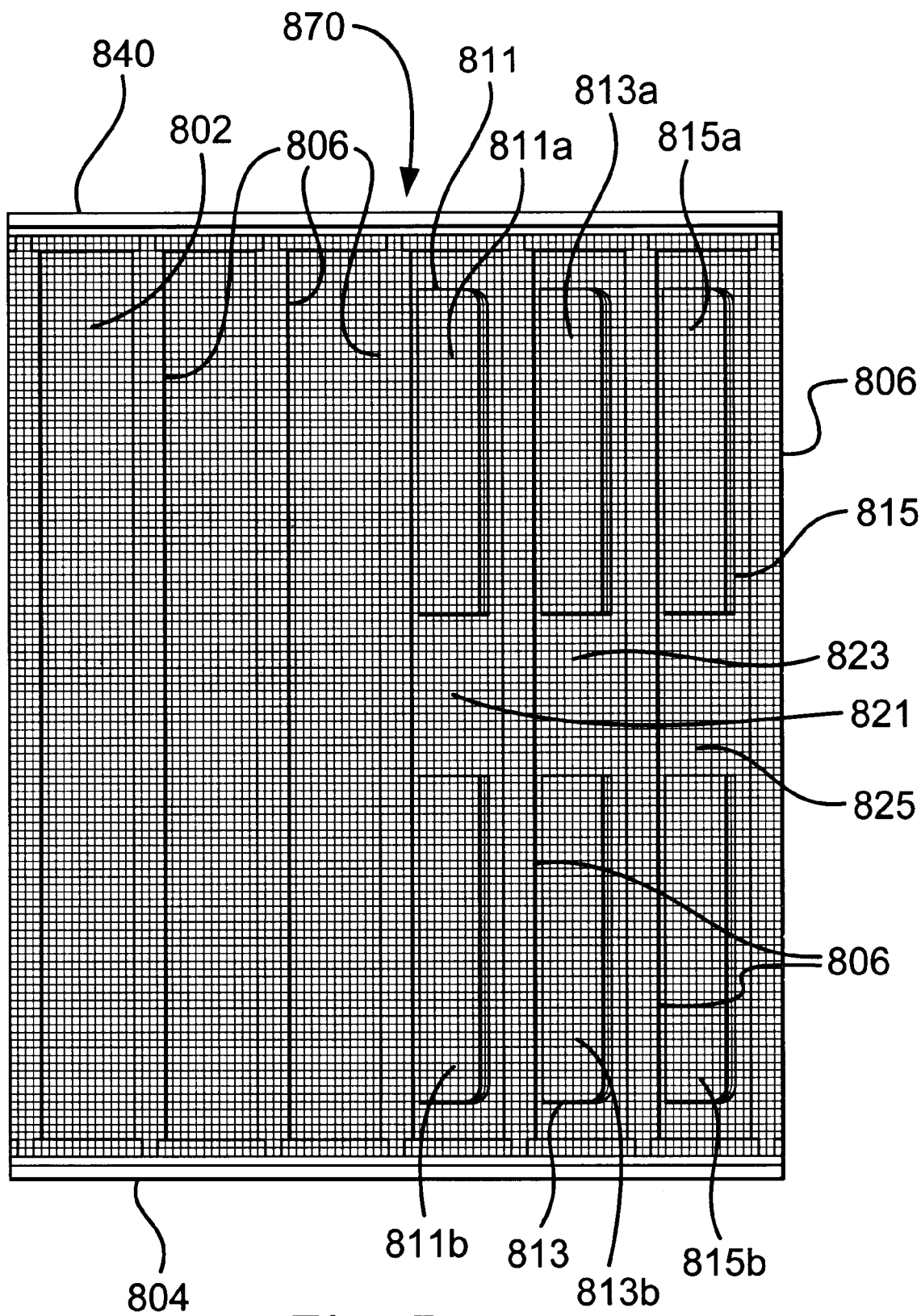

FIG. 5 shows a screen 870 like the screen 800 (and like numerals indicate the same parts), but with divided ramps 811, 813, 815 (each with ramp portions 811a, 811b; 813a, 813b; 815a, 815b, respectively) each having a flow path 821, 823, 825 between ramp portions. It is within the scope of this invention to provide: a full undivided ramp for any of the ramps 811, 813 or 815; a flow path between ramp portions of any desired width, including, but not limited to, between about three inches and about five inches; and to provide additional flow paths (one, two, or more) through the ramp portions themselves. In one aspect, ramp portions are offset to provide a more tortuous path for wet solids. Any one or two of the paths 821, 823, 825 may be deleted by providing an undivided ramp across the screen 870.

In any screen disclosed herein with one, two or three ramps on one side of the screen (as viewed from above), e.g. as in FIGS. 1D, 4 and 5, it is within the scope of this invention to provide one, two or more ramps on the other side of the screen.

Figure 6A:
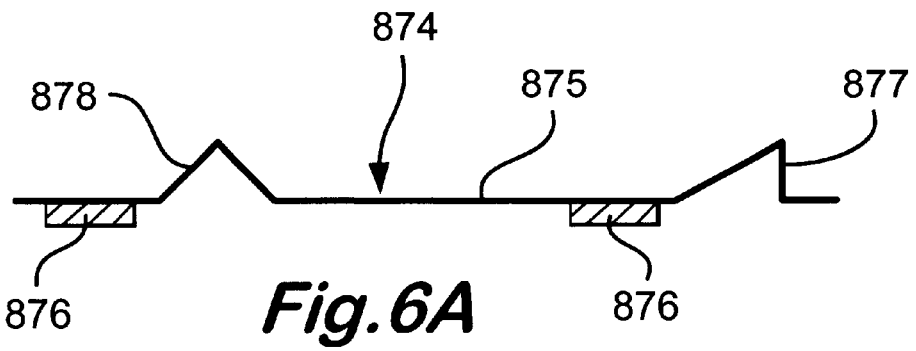
FIGS. 6A and 6B are cross-section views of screen ramp portions according to the present invention.
Figure 6B:
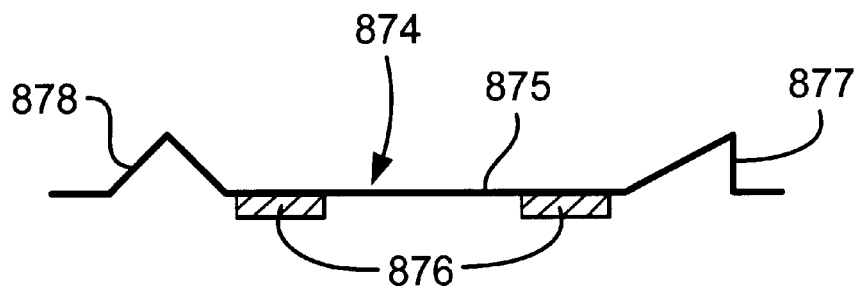

Different ramp profiles may be used on the same screen. FIG. 6A shows part of a screen 874 according to the present invention (like the screen 800) with mesh 875 and spaced-apart ramps 877, 878. Straps 876 (like the straps 806) are beneath the mesh 875. FIG. 6B shows a different location for the straps 876.

Figure 7A:
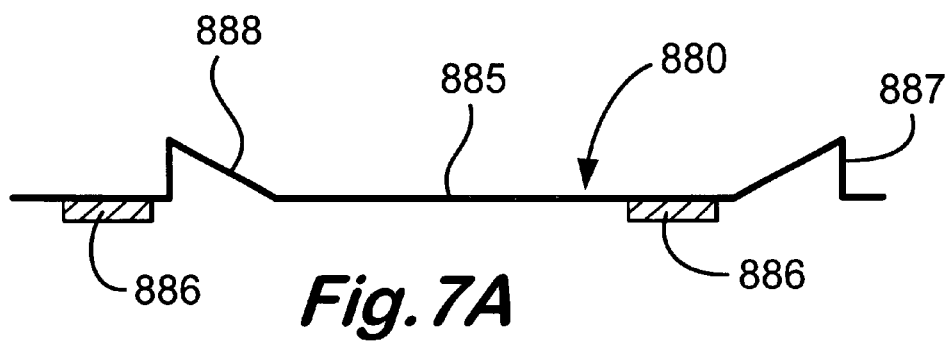
FIGS. 7A and 7B are cross-section views of screen ramp portions according to the present invention.
Figure 7B:
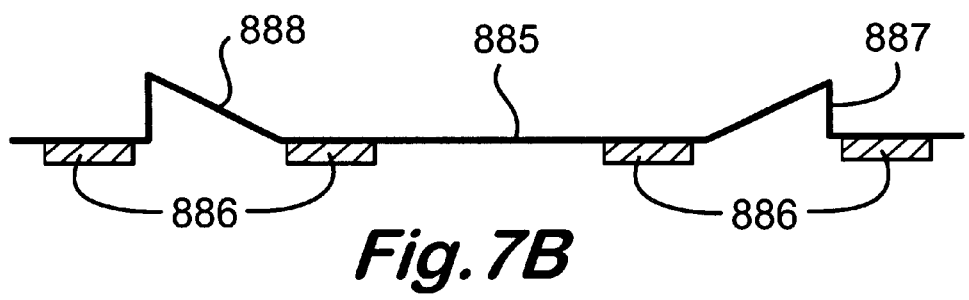

FIG. 7A shows a screen 880 according to the present invention (like the screen 800) with mesh 885 in straps 886 (like the straps 806) and ramps 887, 888. FIG. 7B shows the screen 880 with additional straps 886. The screens of FIGS. 6A–7B may have hookstrips and straps like the screens 800, 850, 860 and/or 870.

Figure 8:
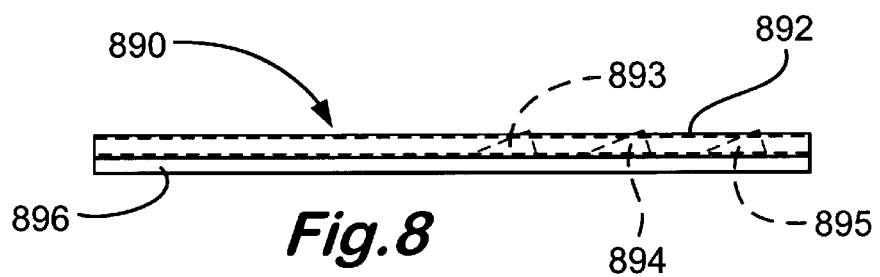
FIG. 8 is a side view of a screen according to the present invention.

Although a series of spaced-apart parallel straps is not the legal equivalent of a perforated plate, a screen as described herein (FIGS. 1D–7B) and/or any ramp or ramp portion as described herein may be used on a perforated plate and, in particular aspects, on a perforated plate of any prior art screen instead of the prior art mesh(es) and/or screen(s) used thereon, including, but not limited to, with flat and/or three-dimensional screens and/or with the plates of the screens of previous U.S. Pat. Nos. 4,575,421; 5,720,881; 5,417,858; 5,783,077; 5,417,859; 5,417,793; 5,636,749; 4,033,865; 5,221,008; 4,819,809; 4,065,382; 3,929,642; and 5,211,291 (all incorporated fully herein for all purposes). Such a screen is illustrated by the screen 890 of FIG. 8 which has mesh 892; ramps 893, 894, 895; and a perforated plate 896 (side view shown without showing perforations that do extend through the plate). It is also within the scope of this invention to use a perforated plate under a portion of the screen mesh and one or more straps under the remaining portions of the screen mesh, with one or more ramped screen portions over the perforated plate and/or over the strap(s).

Figure 9B:
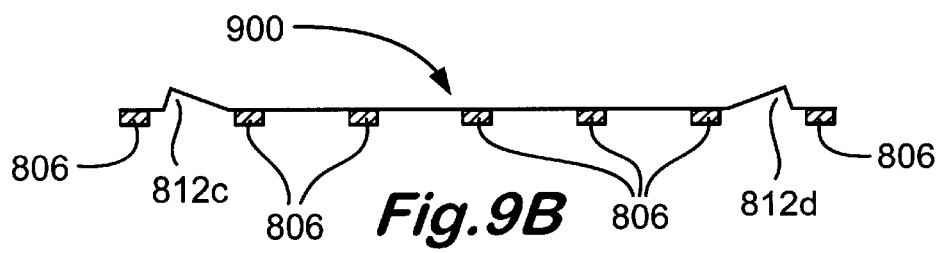
FIG. 9B is a cross-section view along line 32B—32B of FIG. 9A.
Figure 9A:
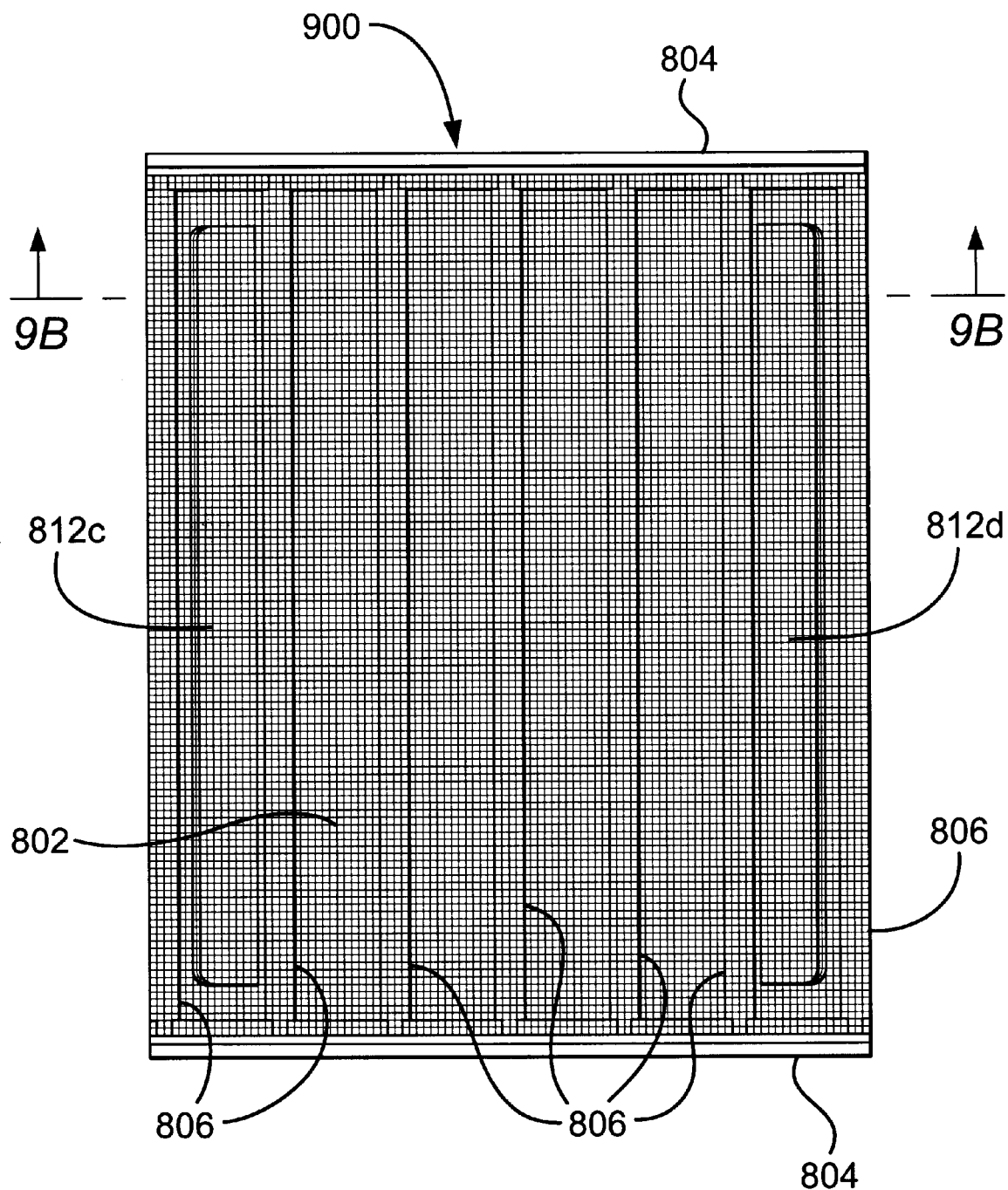
FIG. 9A is a top view of a screen according to the present invention.

FIGS. 9A and 9B show a screen 900 like the screen 860 (like numerals indicate the same parts) but with an additional ramp 812c at the side of the screen opposite the side with the ramp 812d. Such a ramp 812c may be used with the screens 800 or 870. Flow paths may be used through the ramp 812c and/or through the ramp 812d. The ramps 812c and 812d are separate pieces that are bonded to, sintered to, and/or secured to the mesh 802 and/or to a strap 806, e.g. by any structure or securement apparatus or method disclosed herein. Any ramp or ramp portion herein may also be so connected to a mesh, screen, plate, and/or strap and/or secured to the mesh (screen, strap, and/or plate), e.g. by any structure or securement.

Figure 10:
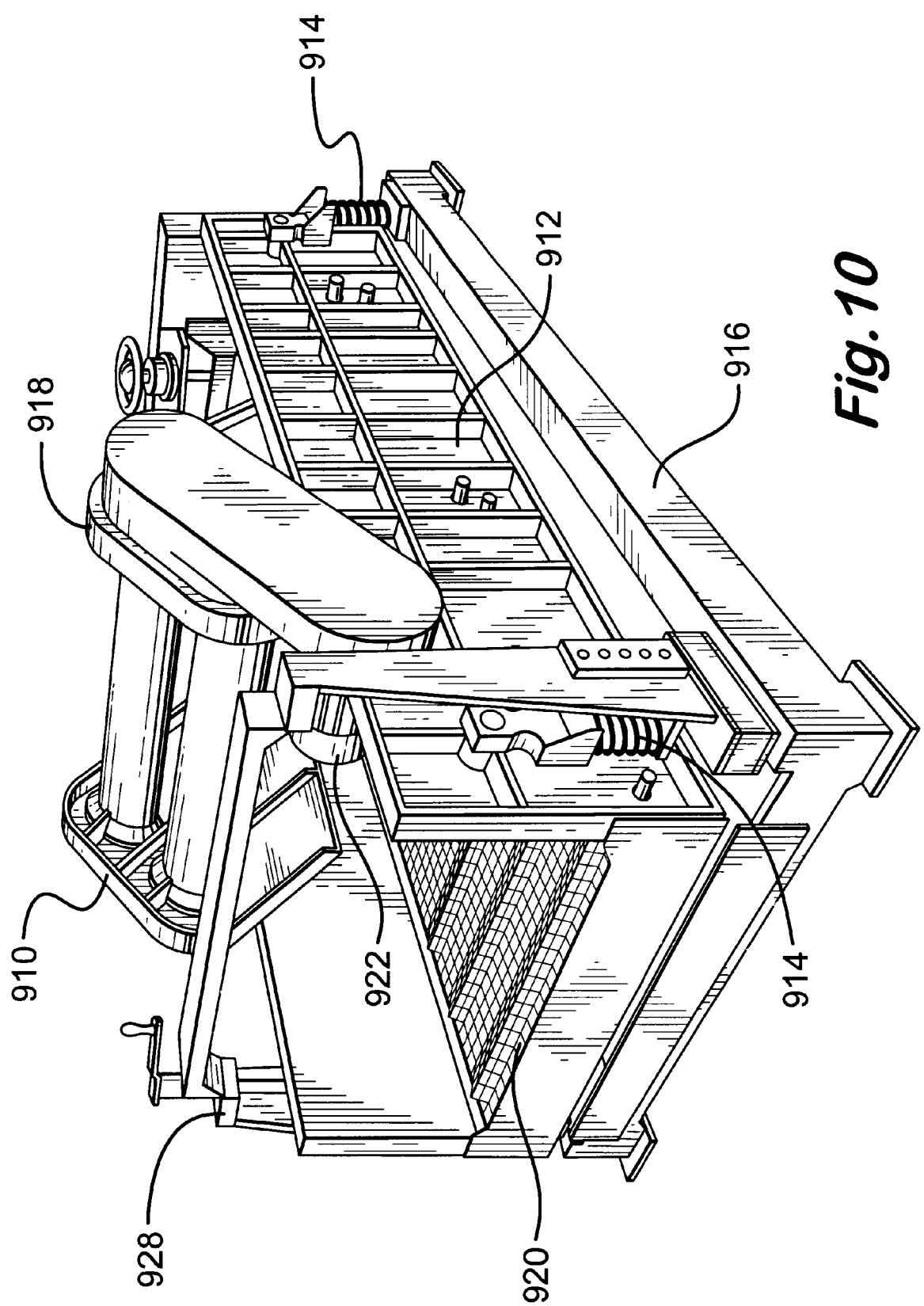
FIG. 10 is a perspective view of a system according to the present invention.

Referring now to FIG. 10, a vibratory separator system 910 according to the present invention has a screen 920 (with screen or screening cloth or mesh as desired) according to the present invention mounted on vibratable screen mounting apparatus or "basket" 912. The screen 920 may be any screen disclosed herein or have any combination of any feature or features of any screen or screen part disclosed herein; and any such screen may be used with any appropriate shaker or screening apparatus. The basket 912 is mounted on springs 914 (only two shown; two as shown are on the opposite side) which are supported from a frame 916. The basket 912 is vibrated by a motor 922 and interconnected vibrating apparatus 918 which is mounted on the basket 912 for vibrating the basket and the screens. Elevator apparatus 928 provides for raising and lowering of the basket end. The screen 920 may be any screen disclosed herein, including, but not limited, those of FIGS. 1D–9A. As shown the screen 920 is like the screen 800 of FIG. 1D. In certain aspects using a ramped screen as in FIG. 1A produces processed cuttings with an oil content of 3% or less and a water content of 20% or less when the screen is used in a multi-screen BRANDT LCM2D shaker beneath two standard DX 210 screens; and in a particular embodiment of such a screen, the oil content is less than 2% with a water content less than 15%. Any ramp disclosed herein may have a curved or undulating shape as viewed from above instead of the straight shape, e.g. as disclosed in FIG. 3. One or more ramps and/or divided ramps as described above may be used on any screen disclosed herein having one or more screens formed with an undulating shape.

Figure 11A:
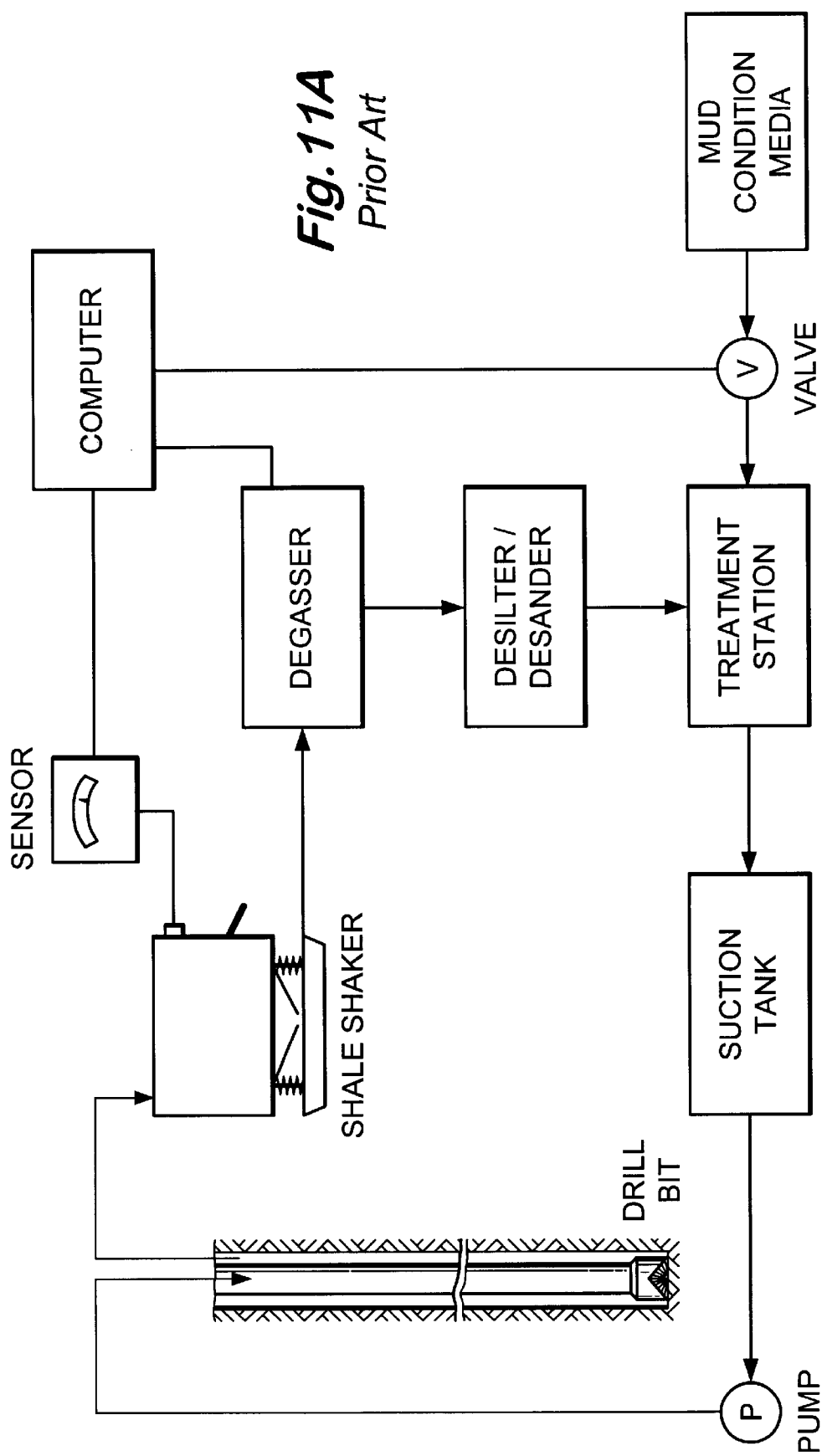
FIG. 11A is a schematic view of a prior art system.

FIG. 11B shows a system 1000 according to the present invention with parts like those of the prior art system of FIG. 11A; but with a shale shaker K having a screen or screens S according to the present invention (any screen or screens disclosed herein). The screen(s) S are mounted in a typical shaker basket B and one or more vibrators V (any known suitable shaker vibrator) vibrate the basket B and hence the screen(s) S.

Figure 12A:
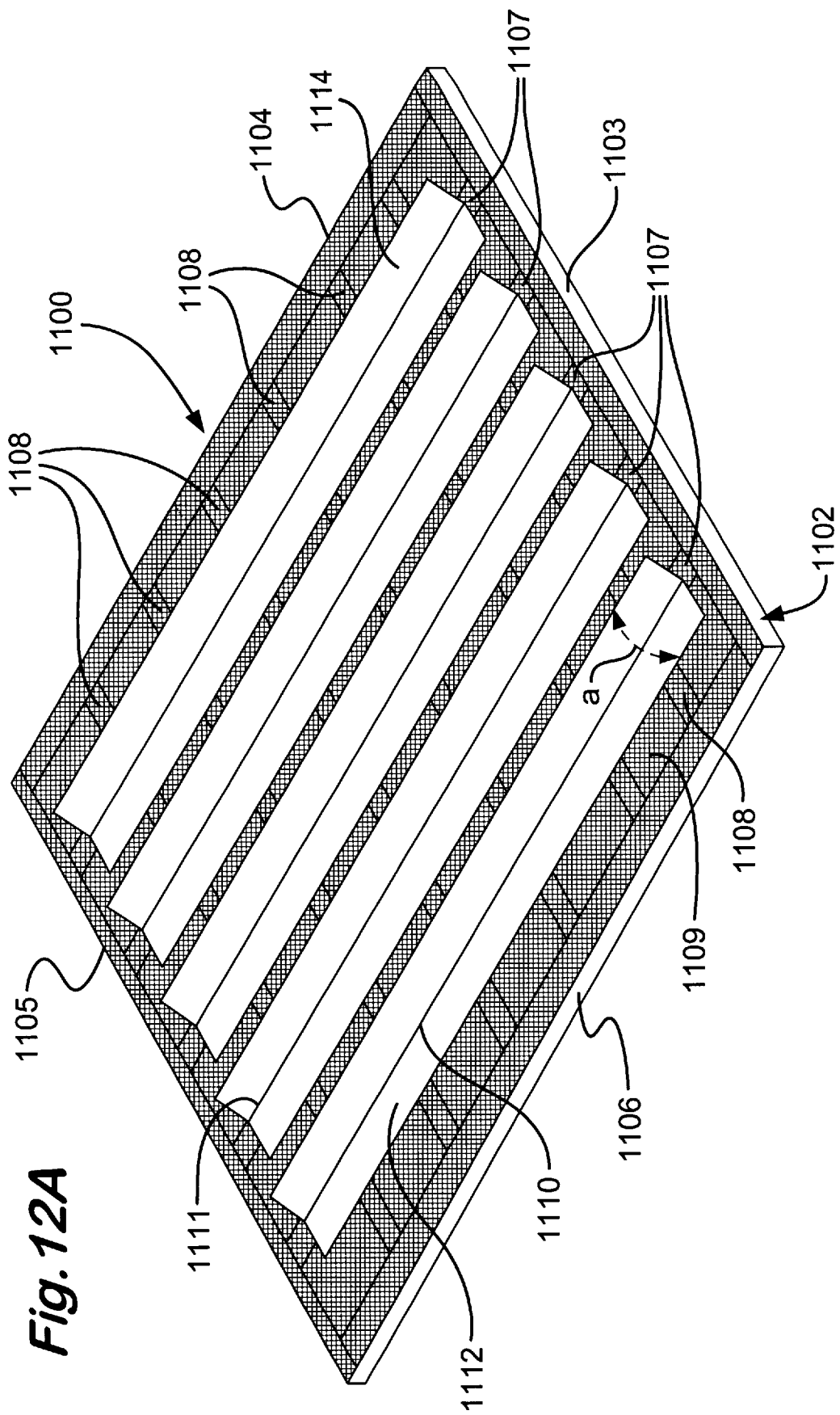

FIGS. 12A shows a screen assembly 1100 according to the present invention which has a tubular frame 1102 with interconnected outer frame members 1103, 1104, 1105, 1106 and crossbars 1107, 1108 each with two spaced-apart ends connected to an outer frame member.

Screening material 1109 is located over the crossbars and attached to the outer frame members (and, in certain aspects to the crossbars) by any suitable known method, connectors, glue, welding, etc. The screening material 1109 may be any known screen and/or mesh; in any combination of one, two, three or more layers; connected, fused, glued, and/or sintered together in any known way either substantially over the entire surface of screening material or only in portions thereof.

Connected on top of the screening material 1109 are a plurality of spaced-apart ramps 1110 each with a base 1112 and a portion 1114 projecting up from the screening material 1109. AS shown there is an obtuse angle a between each ramp's base 1112 and projecting portion 1114. The angle a may be any desired angle from zero to one hundred eighty degrees (i.e., acute, right, obtuse or straight angle). In certain aspects the base portion of one, some or all of the ramps may be deleted, and the projecting portions alone are connected to the screening material. The ramps (and any other screen component disclosed herein for connection to a screen assembly) (the bases and/or the projecting portions) may be connected to the screening material with any suitable connector or method, including, but not limited to, with screws, rivets, welding, gluing, releasable cooperating hook-loop fastener material, solder, adhesive, tape (single or double-sided), and/or sintering.

As shown in FIG. 12A a line 1111 defining a boundary between each ramp base and projecting portion is located above a crossbar 1107 and portions of each base are over parts of the crossbars 1108. It is within the scope of this invention for these ramp base portions to also be connected to these cross bar portions as well as to the screening material; alternatively, there is no such connection, connection only to the crossbars 1107, or connection only to the crossbars 1108 (as can be the case for any screen assembly according to the present invention).

Figure 12B:
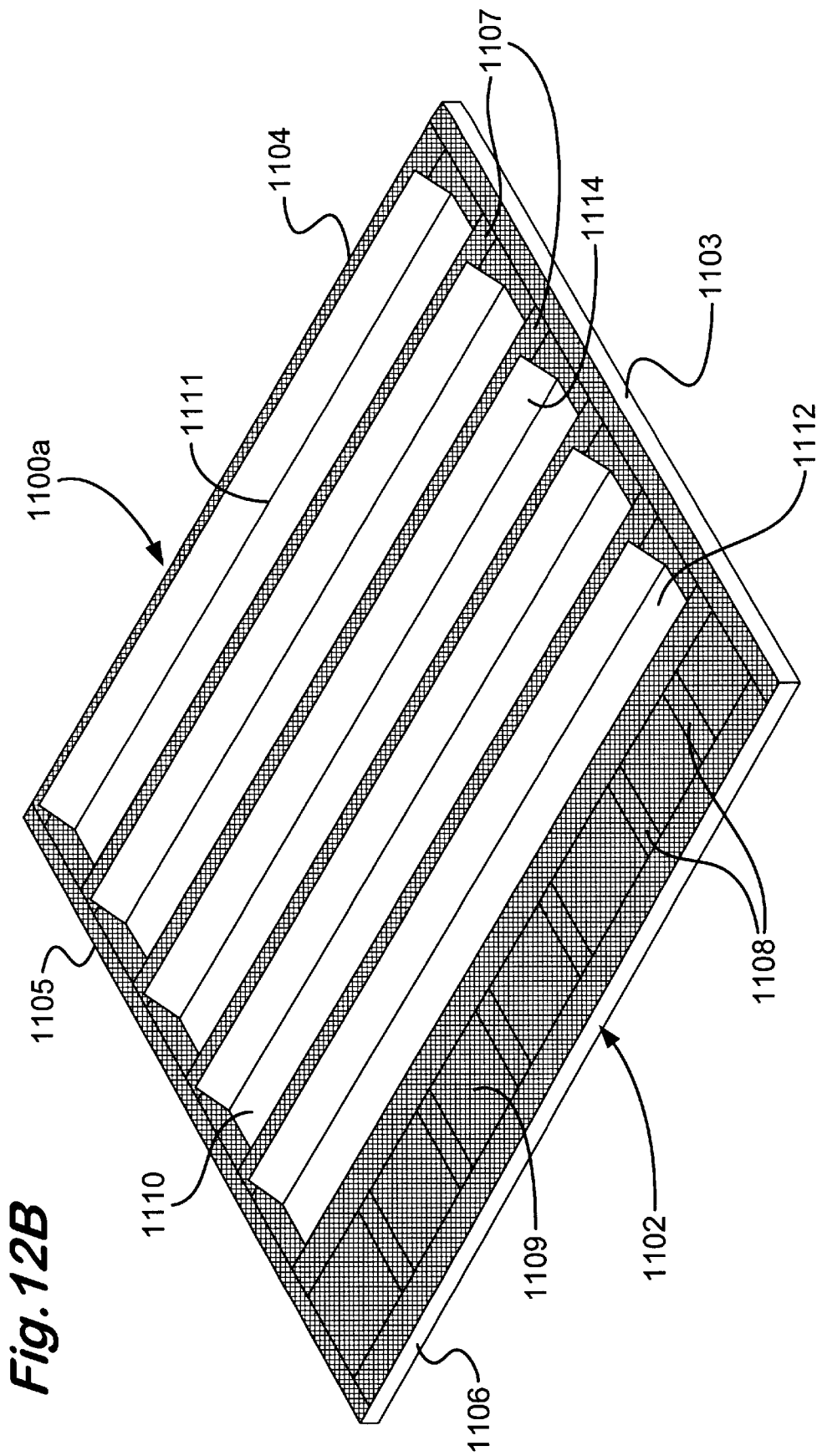

FIG. 12B shows another version of the screen assembly 1100 designated 1100a with like numerals indicating like parts. In the screen assembly 1100a, the ramp bases 1112 are positioned above the crossbars 1107 with the lines 1111 located between crossbars, i.e., not over a crossbar. Alternatively, it is within the scope of this invention to place one or some of the ramps as in FIG. 12A and one or some of the ramps as in FIG. 12B. Also as shown the ramps are generally parallel to the crossbars 1107 and the outer frame members 1104, 1106; but it is within the scope of this invention for the ramps to be at an angle to these items and, in one aspect for different ramps to be at different angles, e.g., but not limited to, a plurality of spaced-apart ramps with every other ramp at one angle and the ramps between them at a different angle—which in one aspect includes ramps with an acute angle between adjacent ramp ends.

FIG. 13A shows a screen assembly 1120 according to the present invention which has two spaced-apart hook strips 1122 between which and to which are connected a plurality of spaced-apart support strips 1124 (which may be as in disclosed herein or as any disclosed in any parent application or patent listed herein) on which is mounted screening material 1129 (like the screening material (1109 or as any disclosed herein) and may include a diamond-patterned layer 1128 (e.g. of metal, glue, plastic, adhesive, rubber, or epoxy). A plurality of ramps 1123, like the ramps 1110 above, are connected to the screening material 1129. A line 1125 defining a boundary between a base 1121 and a projecting portion 1127 of each ramp is located above a strip 1124; but it is within the scope of this invention, as with the screen assembly of FIG. 12A, to locate this line as desired.

The hook strips 1122 may be of any known shape and/or configuration for hooking apparatus for shale shakers and vibratory separators (including but not limited to any known side channels, hooks, or strips for mounting a screen to a shale shaker).

FIG. 14A discloses a plurality (1131–1135) of various ramps according to the present invention useful with any screen assembly according to the present invention and which may be used instead of any ramp shown on any screen assembly herein; alternatively, a combination of any of these ramps on a single screen assembly may be used according to the present invention.

FIG. 14B shows end views of the ramps of FIG. 14A. Certain of the ramps according to the present invention have an enclosed area and, therefore, an end which, according to the present invention, may be open or closed (e.g. as in ramps 1131, 1133, 1134, 1134). It is within the scope of this invention to leave these ramp ends open; partially open (e.g. top, bottom, one side or the other side closed off); or closed off either with solid material or with screen or mesh (as shown in the ramps 1131 and 1133 closed off, respectively with screening material 1136, 1138). Screening material used to close off or partially close off a ramp end may be any screening material disclosed herein and the ramp ends thus closed-off may be flat (i.e. perpendicular to the surface of the screen assembly) or non-flat, e.g. as disclosed in U.S. application Ser. No. 09/634,610 Sep. 5, 2000, incorporated fully herein for all purposes. The ramps 1131, 1133, 1134, 1135 each has a base 1141, 1143, 1144, 1145, respectively, with portions on either side of a projecting ramp portion 1151, 1153, 1154, 1155, respectively. Suitable connection of these base portions on either or both sides of the projecting portions may be made to screening material of a screen assembly according to the present invention. It is also within the scope of the present invention to fold either or both base portions either under or over prior to attaching the ramps to a screen assembly.

FIG. 15A shows a screen assembly 1160 according to the present invention that has an outer frame with interconnected frame members 1161, 1162, 1163, 1164 (however it is within the scope of this invention for the ramps of the screen 1160 to be used on a screen like that in FIG. 13 that has hookstrip sides). Ramps 1171–1175 are connected to screening material 1169.

In one aspect the ramps 1171–1175 are made of mesh or screen or a combination thereof that can be folded down or pushed down and remains in the "down" position, i.e., it has memory. As indicated any desired part of a ramp may be positioned lower than the other parts.

Ramp 1171 has a base 1171a, a projecting portion 1171b, and a portion 1171c that has been pushed down. FIG. 15B shows an end view of the ramp 1171 and FIG. 15C shows a cross-section view of the lower portion 1171C. Ramp 1172 has lower, pushed down portions 1172c; ramp 1173 has lower, pushed down portions 1173c and 1173d; ramp 1174 has lower pushed down portions 1174c; and ramp 1175 has lower pushed down portions 1175c. Alternatively, the ramps 1171—1175 are preformed of suitable material which has no memory (does not retain a shape, position, or configuration into which it is pressed, pushed, or moved), e.g. metal, rubber, or solid plastic (with or without fluid-passing perforations across its surface). All of the ramps of a particular screen assembly according to the present invention may be like any one of the ramps 1171–1175; or any combination of such ramps may be used according to the present invention. It is also within the scope of this invention to make different parts of a ramp out of different screening material. For example, in the ramp 1171 the base 1171a and part 1171b may be made from screening material of a mesh size similar to that of the screening material 1169 and the portion 1171c may be made of a much finer mesh that lays down (rather than a mesh with memory that needs to be pushed or folded down). Upper or projecting portions of the ramps (e.g. portions 1171b, 1127, 1114) may be made of non-memory material that is so non-rigid that it moves up and down or flaps uncontrollably as the screen assembly is vibrated (e.g. a shale shaker processing fluid with drilling mud and drill cuttings or other solids entrained therein). Any projecting portion or upper portion of a screen or ramp disclosed herein may be made of multiple layers, e.g. a non-memory movable layer with a one, two, or more lower and/or upper layer(s) of metal or of synthetic material, perforated or not, to inhibit or prevent up/down or uncontrollable flapping and/or to inhibit or prevent wear of and damage to such a non-memory layer. Optionally, different parts of a single projecting portion may have one or more of these reinforced areas along the length of the projecting portion. In one aspect a coarse mesh is used beneath a projecting portion and a fine mesh is used on top so that fine solids or particles separated from a fluid more easily climb up the projecting portion. Alternatively, a reinforcing material (mesh, screen, solid) may be used around the top, bottom, and/or side edges of a projecting portion to strengthen the projecting portion. Also, an upstanding ramp portion or a front ramp portion may be made of a very coarse mesh, e.g. 19 mesh, for strength and stability.

FIGS. 15D and 15E illustrate other possible ramp end profiles for ramps 1176, 1177 and relative sizes for base and projecting portions which may be used for any ramp herein. Also any number (e.g. one, two, three, four, five, six, or more) of any ramp 1171–1175 may be used on any screen.

Figure 16:
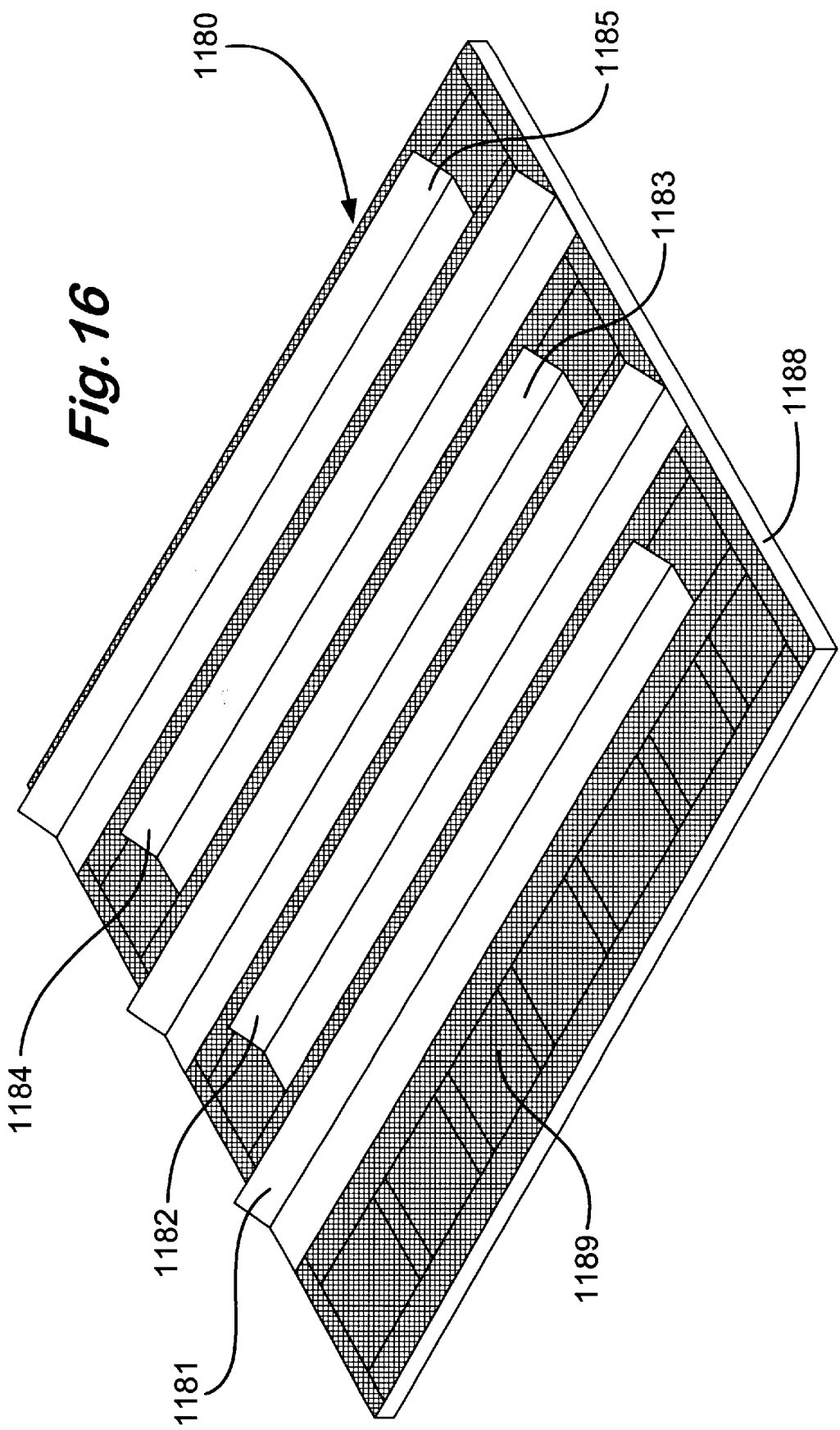
FIG. 16 is a perspective views of screen assemblies according to the present invention.

FIG. 16 shows a screen assembly 1180 according to the present invention which has an outer frame 1182 (like the frame of the screen 1160) with crossbars and screening material 1189 like that of the screen 1160. Ramps 1181–1185 represent any ramp according to the present invention. As shown, the ramps are offset from each other, as may be any two ramps of any screen assembly according to the present invention and any number (e.g. one, two, three, four, five, six, or more) of any ramp may be used. Also any portion of any ramp may be deleted providing a flow path through that ramp at that area. In one particular embodiment central portions e.g. between one and fourteen inches wide, are deleted from alternating ramps, beginning with ramp 1181 or with ramp 1182.

FIG. 17A shows a piece of screening material 1190 which may be any screening material or combination thereof disclosed herein. As shown in FIG. 17B, the screening material 1190 has been formed or folded to form upwardly-projecting portions 1191 and 1192 that can serve as ramps for any screen assembly according to the present invention with one or more such ramps. As shown the lower ends of the upwardly projecting portions are open; but it is within the scope of the present invention to close off these ends (or the ends of any ramp disclosed herein) with solids material or with material such as screen or mesh that permits fluid flow therethrough.

FIG. 18A shows a piece of screening material 1200 which may be any screening material disclosed herein. As shown in FIG. 18B the screening material 1200 has been formed or folded to make a ramp 1201 with an inclined portion 1202 and a wall portion 1203. The area under the ramp may be open or closed off (with solids or with fluid-passing material).

FIG. 19A shows a piece of screening material 1210 which may be any screening material disclosed herein. As shown in FIG. 19B the screening material 1210 has been formed or folded to make a ramp 1211 with an inclined portion 1212 and a front portion 1213. The open area under the inclined portion may be open or closed off (with solids or with fluid-passing material). The front portion 1213 is shown as contacting the screening material 1210. It is within the scope of this invention to also connect the front portion 1213 to the screening material 1210 either all along the length of a ramp with such a profile or at spaced-apart points along the length.

FIG. 10A shows a piece of screening material 1220 which may be any screening material disclosed herein. As shown in FIG. 10B the screening material 1220 has been formed or folded to make a ramp 1221 with an inclined portion 1222 and a front portion 1223. The open area (1223a) under the inclined portion may be open or closed off (with solids or with fluid-passing material). The front portion 1223 is shown as contacting the screening material 1220. It is within the scope of this invention to also connect the front portion 1223 to the screening material 1220 either all along the length of a ramp with such a profile or at spaced-apart points along the length. FIG. 20C shows another ramp 1224 made (formed or folded) with the screening material 1220. The ramp 1224 has an inclined portion 1225, a front portion 1226 and a lower portion 1227. The front portion 1226 may be connected to the screening material at points or all along its length, as may be the lower portion 1227. Also the end of the lower portion 1227 may touch or be connected to the inclined portion 1225. Alternatively, the portion 1227 may extend out in front of the ramp rather than beneath the portion 1224.

FIG. 21A shows an end profile of a ramp 1230 according to the present invention, e.g. like the ramp 1135 above, FIG. 14A. FIG. 21B shows the ramp 1230 in place connected to screening material 1231 which has an upwardly projecting portion 1232 (formed or folded into the screening material). The ramp 1230 may be connected to the portion 1232. Any ramp according to the present invention with a raised portion may be so-positioned above any screening material disclosed herein with an upwardly-projecting portion.

FIG. 22 shows a ramp 1240 (end view or cross-section) according to the present invention (like the ramp 1230) connected to screening material (any disclosed herein or any combination thereof) 1241 with welds, connectors or glue 1243 (any one of which or all but one may be deleted). An upwardly-projecting portion 1242 of the screening material 1241 has been formed or folded to correspond in shape to the projecting portion of the ramp 1240. For any shape ramp according to the present invention screening material can be formed or shaped to correspond in shape to a ramp shape for positioning of and/or connection of a ramp to screening material. Any ramp described herein as made or formed of screening material may be made or formed of one, two, three or more layers of screening material and/or mesh.

Figure 23A:
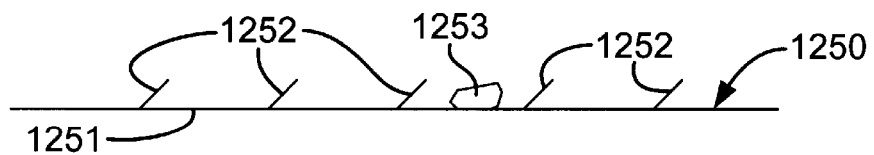
Figure 23B:
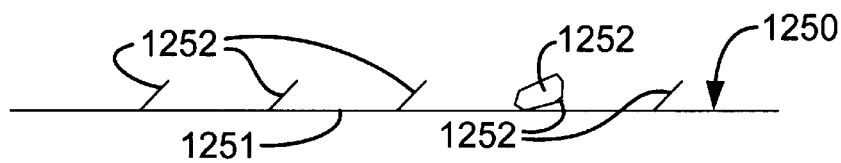
Figure 23C:
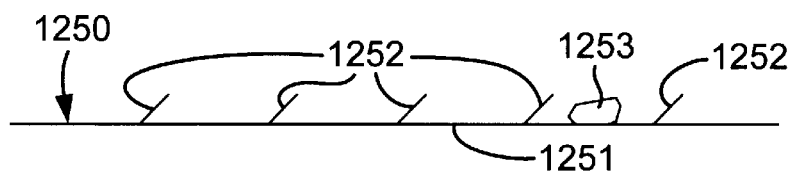

FIG. 23A shows a screen 1250 according to the present invention with screening material 1251 (any disclosed herein or any combination thereof) with spaced-apart ramps 1252 connected to the screening material (which may be any ramp herein including, but not limited to, any ramp herein that is a separate piece connected to screening material or any ramp folded from screening material). A mass of solids 1253 (e.g. solids separated from drilling mud flowing across the screen 1250 in a shale shaker) is moving over the screen 1250. As shown in FIG. 23B, the ramps 1252 are configured, sized, and made of such material that the mass of solids 1253 moves the ramps downwardly as it passes over them, facilitating movement of the mass of solids across the screen. As shown in FIG. 23C the ramp that was moved down by the mass of solids has moved or sprung back to its initial position. In certain prior art machines, a relatively large mass or conglomeration of separated solids might not be able to climb or be moved over an upwardly projecting portion or ramp of a screen.

Figure 24A:
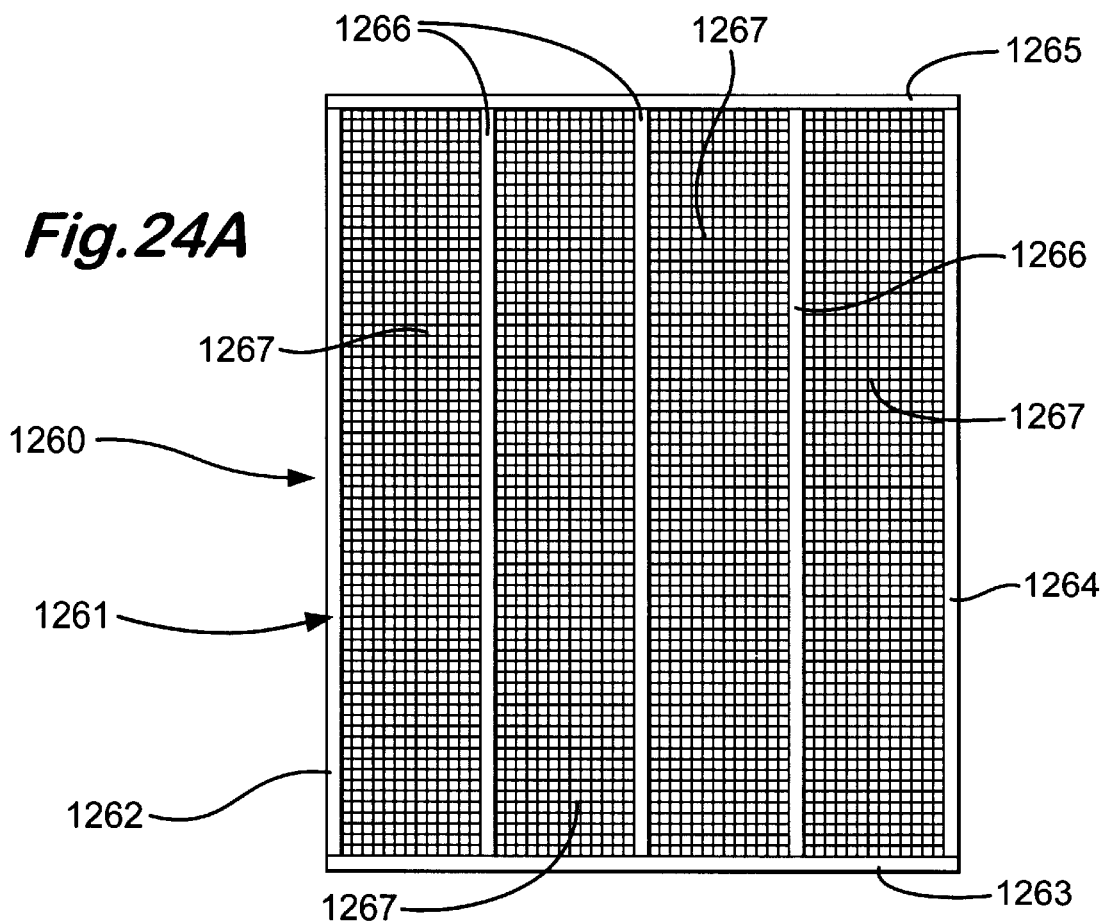
FIG. 24A is a top view of a screen assembly according to the present invention.
Figure 24B:
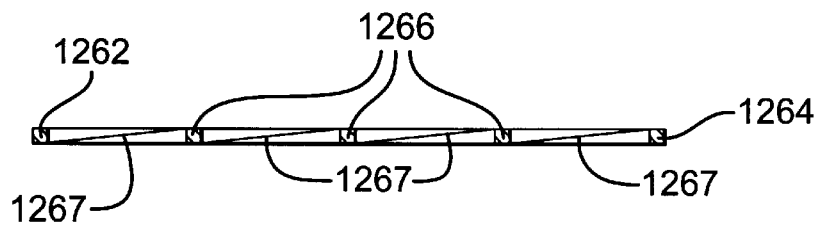
FIG. 24B is a cross-section view of the screen assembly of FIG. 24A.

FIG. 24A shows a screen 1260 according to the present invention which has a frame 1261 made of frame members 1262, 1263, 1264, 1265 with a plurality of cross members 1266. Between pairs of frame members and cross members, and between pairs of cross members are connected pieces 1267 of screening material (any disclosed herein or any combination thereof). Alternatively, a single piece of screening material may be placed over the frame 1261 and folded to result in screen part placement as in FIG. 24B.

Figure 25:
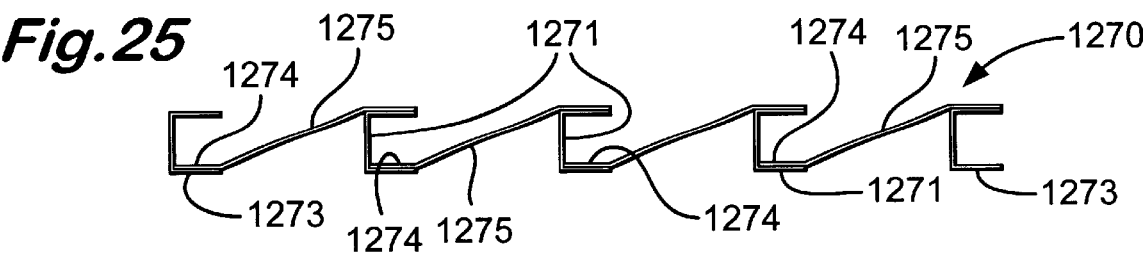
FIG. 25 is a cross-section view of a screen assembly according to the present invention.
Figure 26:
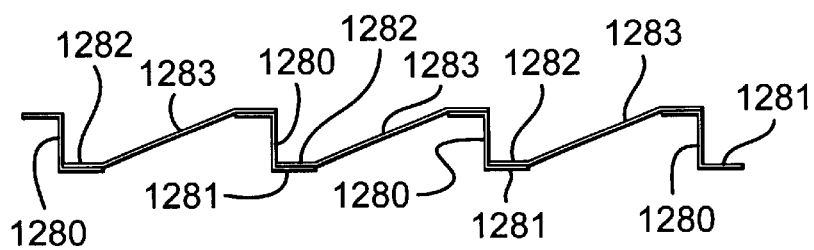
FIG. 26 is a cross-section view of a screen assembly according to the present invention.
Figure 27:
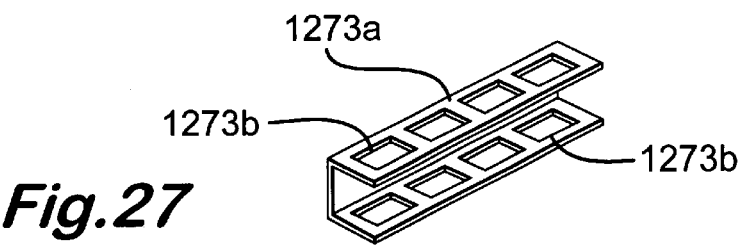
FIG. 27 is a perspective view of a channel member for a screen according to the present invention.

FIGS. 25, 26 and 27 illustrate various types of frame and cross members useful in screens as in FIG. 24A. FIG. 25 shows a screen 1270 with cross members 1271 and frame members 1273 having a "C" channel shape when viewed in cross-section; and an end 1244 of a piece of screening material 1275 is in and connected to each channel.

FIG. 26 shows a channel member 1280 which may be used for a frame or cross member, e.g., but not limited to, in the screens 1260 and 1270. The channel member 1280 has a lower portion 1281 on which an end 1282 of screening material 1283 is placed and to which it is connected. Such a channel may be used for a screen as in FIG. 24A. FIG. 27 shows a channel member 1273a, like the channel member 1273, but with holes 1273b therethrough.

Figure 28A:
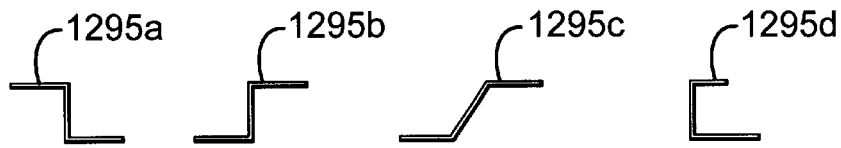
FIGS. 28A and 28B are cross-section views of channel members for a screen according to the present invention.
Figure 28B:
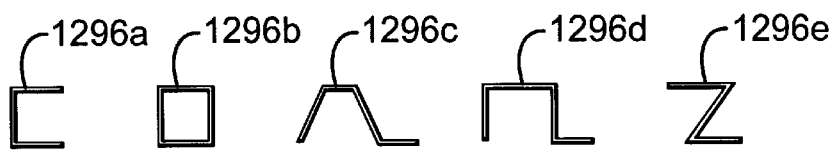

FIGS. 28A and 28 show alternative frame and cross member profiles 1295a, 1295b, 1295c, 1295d and 1296a, 1296b, 1296c, 1296d, 1296e, respectively (cross-section) for any of the frame or cross members disclosed above (with or without holes in any or all of the parts of the profiles).

Figure 28C:
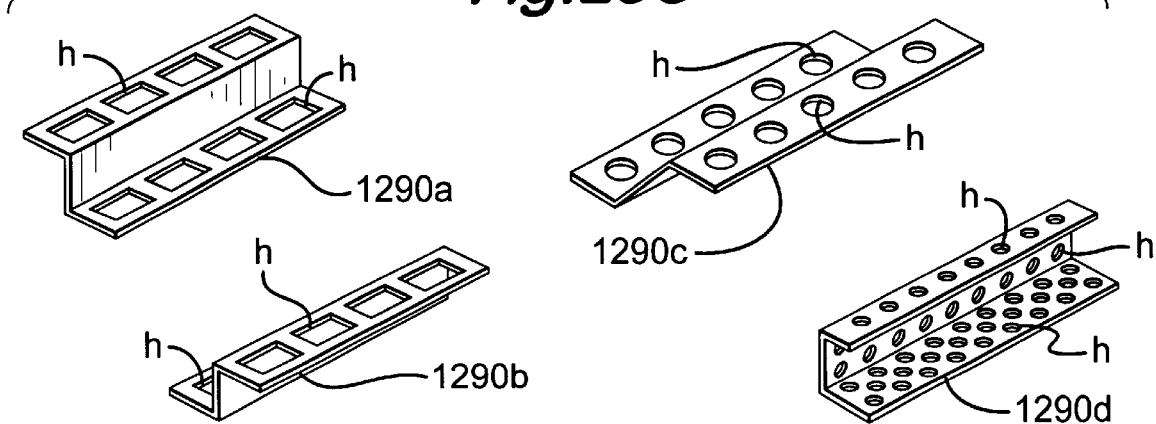
FIG. 28C presents perspective views of channel members for a screen according to the present invention.

FIG. 28C illustrates that any cross member in any frame according to the present invention may have perforations along its length to facilitate solids separation. As shown in cross-section, channel members 1290a, 1290b, 1290c and 1290d (shown in cross-section) have holes h therethrough along their lengths. Any series of holes may be deleted from any channel member.

Figure 29A:
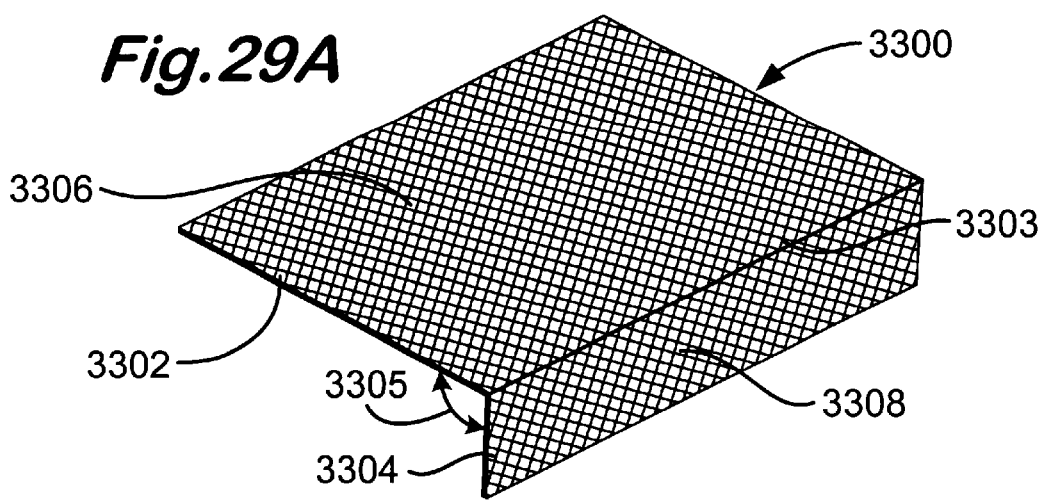
FIG. 29A is a perspective view of a screen assembly according to the present invention.

FIG. 29A shows a screen assembly 3330 according to the present invention for a vibratory shaker or shale shaker which has a first part 3302 and a second part 3304. The second part 3304 is connected to or formed integrally of the first part 3330. In one particular aspect an original generally flat screen is folded along a line 3303 to form the second part 3304. In other embodiments a separate piece forms the second part 3304 and it is connected to the first part 3302. In other aspects a frame (see e.g. FIG. 32) has frame support portions corresponding to the parts 3302 and 3304 and each part is connected to its corresponding frame portion.

It is within the scope of this invention for the angle 3305 to be any desired angle.

The second assembly 3300 has screen mesh 3306 for the first part 3302 and screen mesh 3308 for the second part 3304. These screen meshes may be identical, e.g. but not limited to, both fine screen material or both coarse screening material; or they may be made of different screening material. It is also within the scope of this invention for either or both parts 3302, 3304 to include multiple (two, three, four or more) layers of screening material, including, but not limited to, any combination of layers disclosed or referred to herein; bonded, connected, sintered and/or sewn together (or not) as any disclosed or referred to herein; and with any shape screen openings including, but not limited to square or rectangular. Either part 3302, 3304 that has multiple layers of screening material may have the layers free of each other (i.e., unbonded, unconnected, etc.) and the layers may be calendered together or not.

Figure 29B:
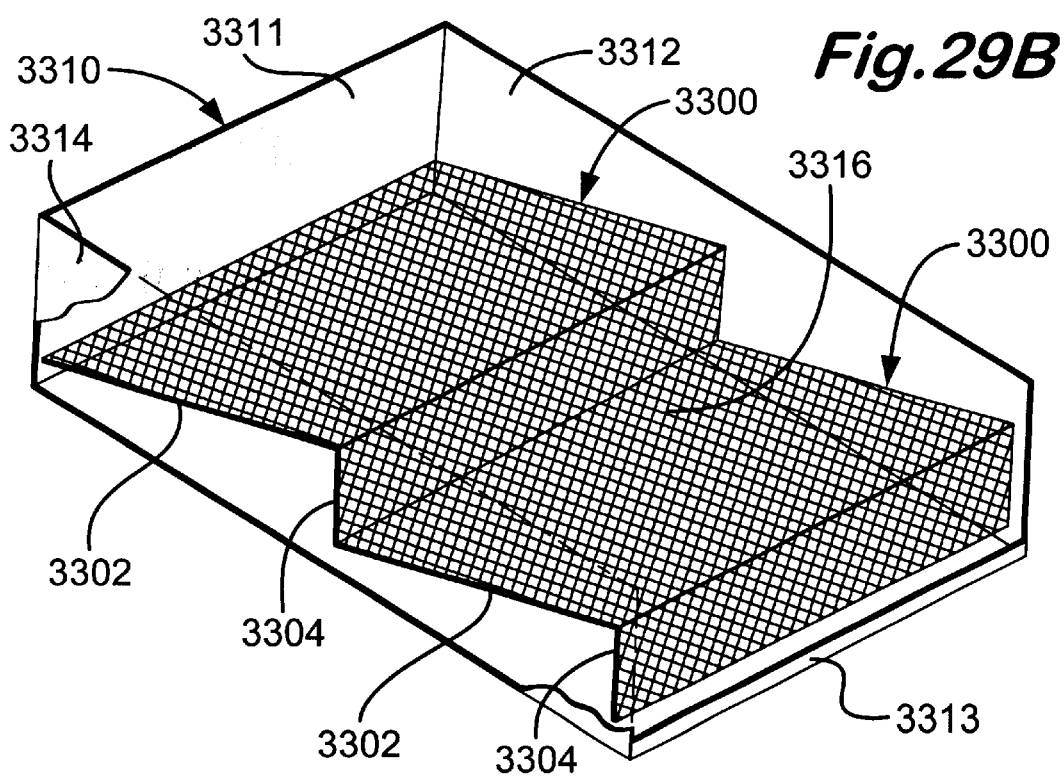
FIG. 29B is a perspective view of a basket with screen assemblies as in FIG. 29A.
Figure 29C:
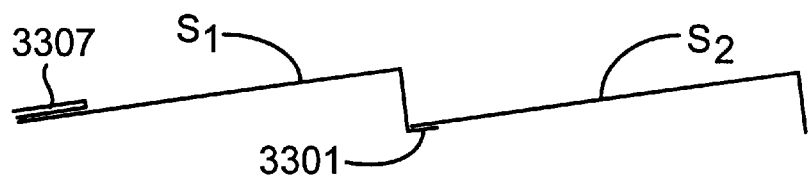
FIGS. 29C–29E are side views of screen assemblies according to the present invention.
Figure 29D:
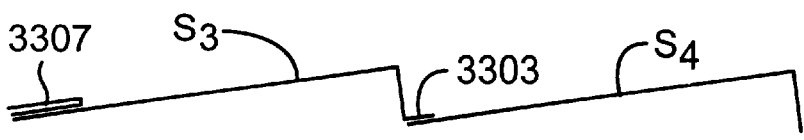
Figure 29E:
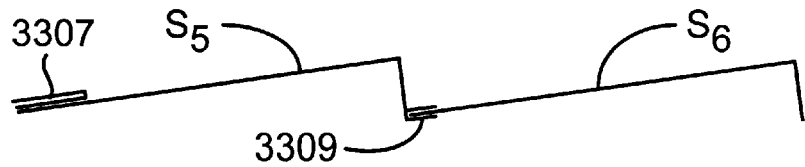

FIG. 29B shows a typical basket 3310 for a vibratory separator apparatus with two screen assemblies 3300 placed end-to-end therein. Any suitable known mounting apparatus and/or devices may be used to releasably mount the screen assemblies 3300 in the basket 3310. The basket 3310 has a first end 3311 at which material to be handled by a vibratory separator is introduced into the basket; sides 3312 and 3314; and a material exit end 3313. Material passing through the screen assemblies 3300 falls through them and then through an open bottom 3316 of the basket 3310.

As shown there are two screens 3300 in the basket 3310; but the screens 3300 may be any suitable length so that any desired number of screen assemblies (e.g. three, four, five or more) may be disposed end-to-end in the basket 3310. It is also within the scope of this invention to delete a screen assembly 3300 (or screen assemblies 3300 when there are three or more) from the basket 3310 and replace it (or them) with any suitable known screen assembly, including, but not limited to any screen assembly disclosed or referred to herein.

It is within the scope of the present invention to use two or more screen assemblies 3300 stacked one on top of the other in the basket 3310. It is within the scope of this invention to use one or more screen assemblies 3300 (and/or any screen assembly disclosed in FIGS. 30A-34) with any basket as disclosed in U.S. application Ser. No. 09/716,176 filed Nov. 17, 2000 incorporated fully herein for all purposes and co-owned with the present invention.

Figure 30A:
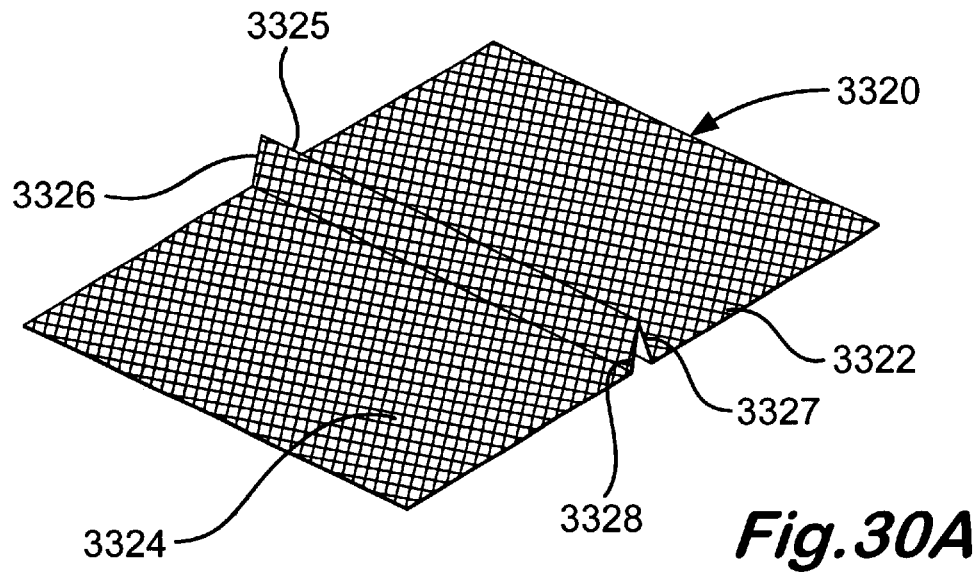
FIG. 30A is a perspective view of a screen assembly according to the present invention.

FIG. 30A shows a screen assembly 3320 according to the present invention which has two side portions 3322, 3324 of screening material and between them a raised portion 3326 that includes sides 3327, 3328 that meet at an apex 3325. The screening material may be any as described for the screen assembly 3300 in any combination of layers or form as described for the screen assembly 3300. As shown the apex 3325 is above the screen portions 3322, 3324 and there is an angle between the sides 3327, 3328 which can be any suitable desired angle. The apex 3325 may be any desired height above the screen portions 3322, 3324. It is within the scope of this invention to have one, two, three, four or more raised portions 3326 spaced-apart on a screen assembly such as the screen assembly 3320; and the cross-section of such raised portions viewed on end may be as shown in FIG. 30A or of an end shape as shown for any raised portion, insert or ramp disclosed herein.

Figure 30B:
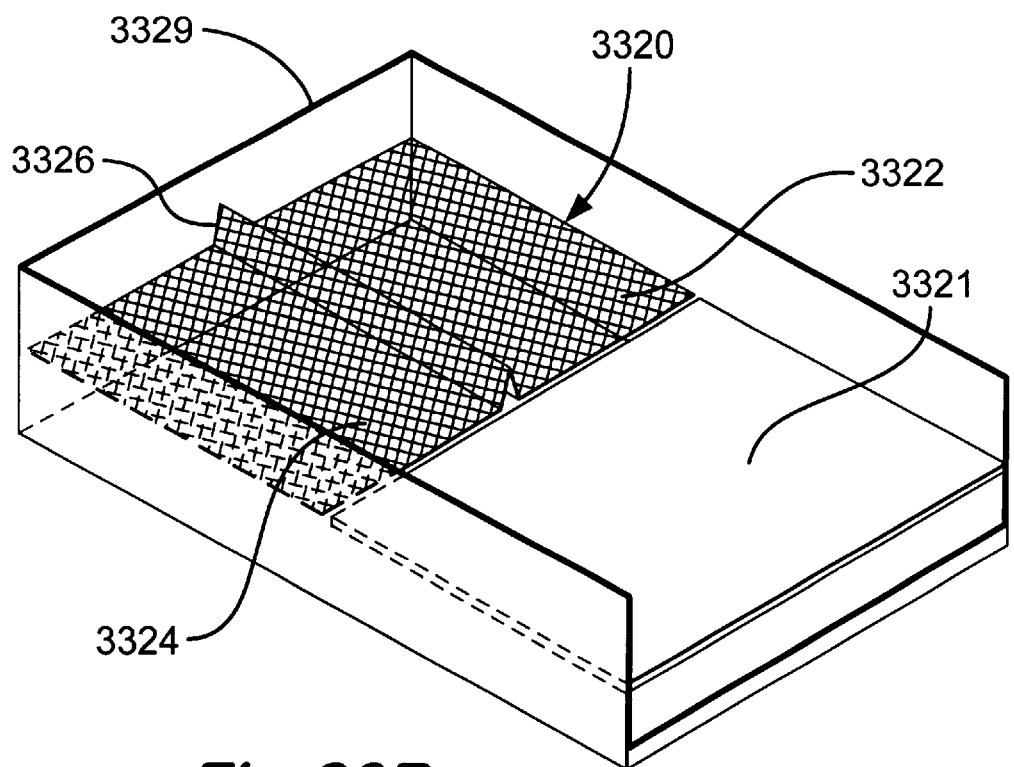
FIG. 30B is a perspective view of a basket with screen assemblies as in FIG. 30A.

FIG. 30B shows a basket 3329 (like the basket 3310) with a screen assembly 3320 mounted therein. Shown schematically is a second screen assembly 3321 which may be like the screen assembly 3320, the screen assembly 3300, or any other screen assembly disclosed or referred to herein. One, two, or more screen assemblies 3320 may be stacked one on top of the other; and one screen assembly 3320 may be inverted on top of another so that the apex of the raised portion(s) of the invented screen assembly points down instead of up.

Figure 31:
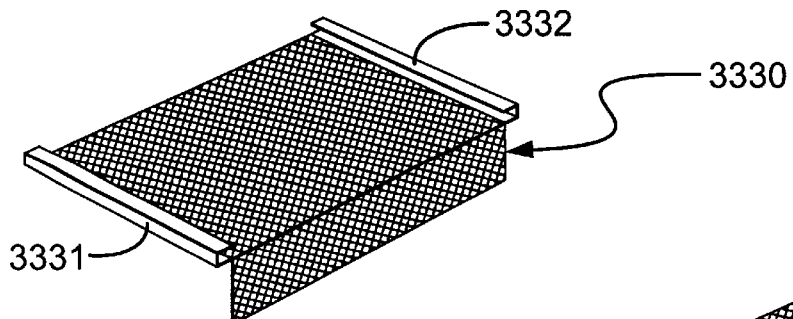
FIGS. 31–35 are perspective views of screen assemblies according to the present invention.

FIG. 31 shows a screen assembly 3330, like the screen assembly 3300, with side hookstrips 3331, 3332 for mounting the screen assembly in a basket.

Figure 32:
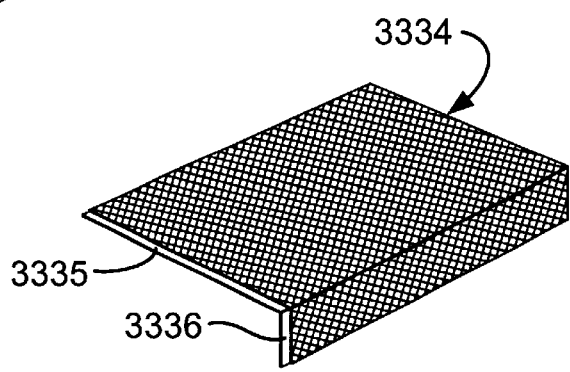

FIG. 32 shows a screen assembly 3334, like the screen assembly 3300, with the screening material mounted on a frame with frame parts 3335 and 3336. Any known frame structure may be used for the parts 3335 and 3336. Alternatively a perforated plate may be used (for any screen assembly 3310, 3320, 3340, 3344) under either or both screen portions or a series of support strips (which are not the legal equivalent of a perforated plate) may be used.

Figure 33:
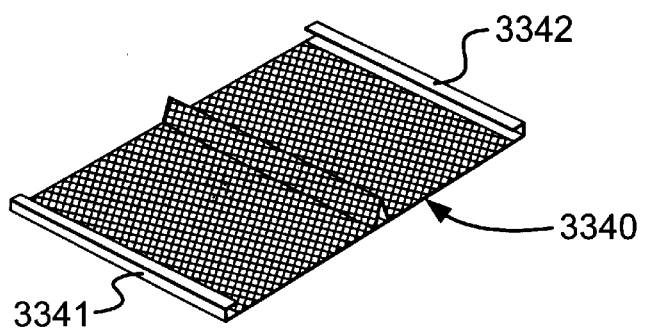

FIG. 33 shows a screen assembly 3340, like the screen assembly 3320, with side hookstrips 3341, 3342 for mounting the screen assembly in a basket.

Figure 34:
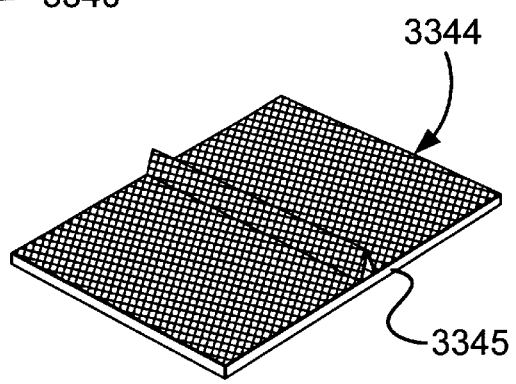

FIG. 34 shows a screen assembly 3344, like the screen assembly 3320, with the screen portions mounted on a frame 3345. Any known frame structure may be used.

Figure 35:
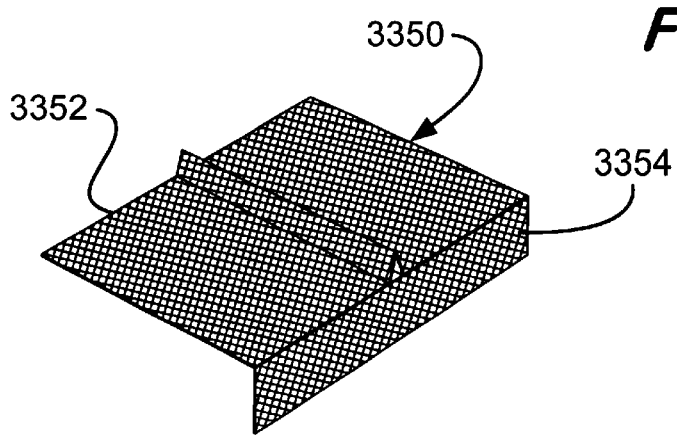
Figure 36:
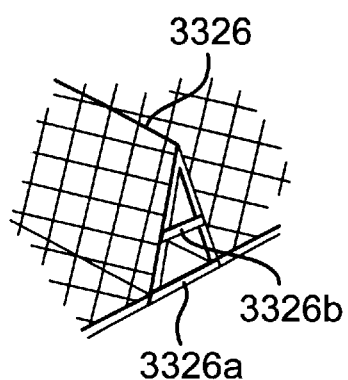
FIGS. 36–38 are perspective views of raised portions of screen assemblies according to the present invention.
Figure 37:
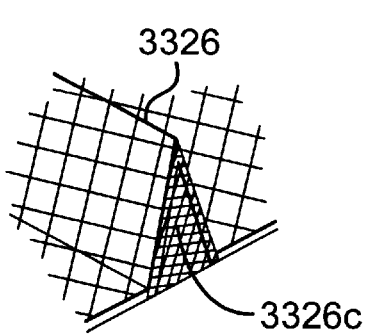
Figure 38:
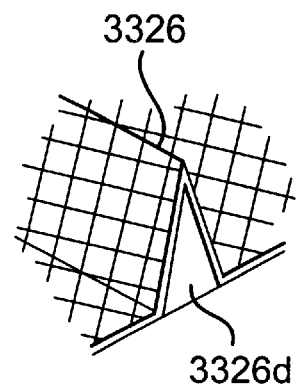
Figure 39:
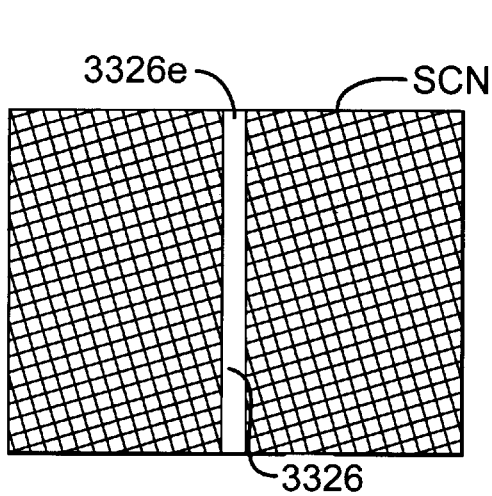
FIGS. 39–41 are bottom views of screen assemblies according to the present invention.
Figure 40:
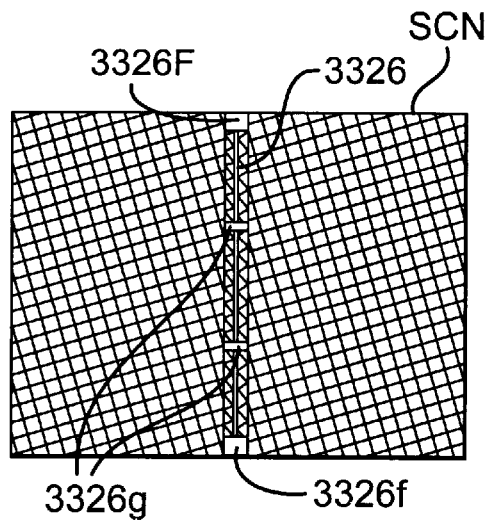
Figure 41:
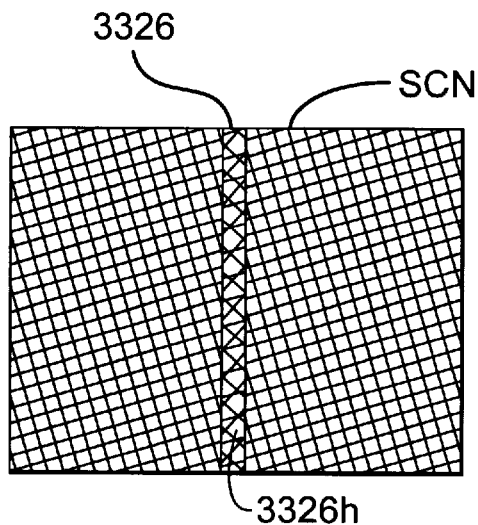
Figure 42A:
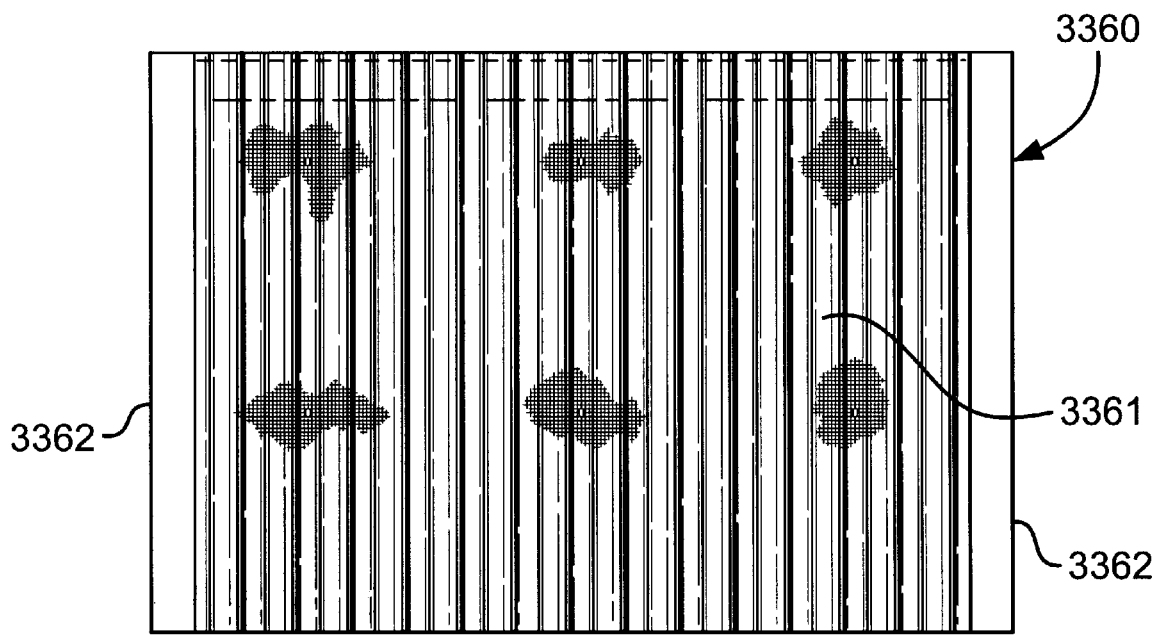
FIG. 42A is a top view and FIG. 42B is an end view of a screen according to the present invention.
Figure 42B:
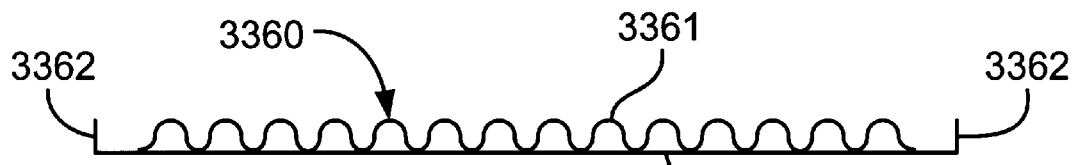
Figure 43:
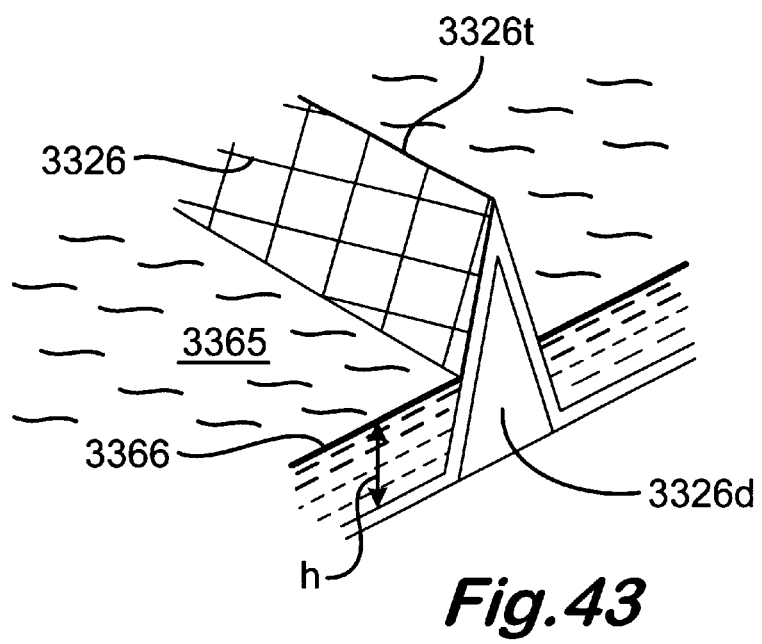
FIG. 43 is a perspective view of a screen according to the present invention.

FIG. 35 shows a screen assembly 3350 according to the present invention with a top portion 3352 like the screen assembly 3320, FIG. 30A (or like any screen assembly discussed above with a raised portion or portions with an apex (or apices); and with a portion 3354, like the portion 3304 of the screen assembly 3300, FIG. 29A (or like such a portion of any screen assembly disclosed above).

Any of the screen assemblies of FIGS. 29A-35 may be used, e.g., in the apparatuses of FIGS. 10 and 11B discussed above.

Figure 44A:
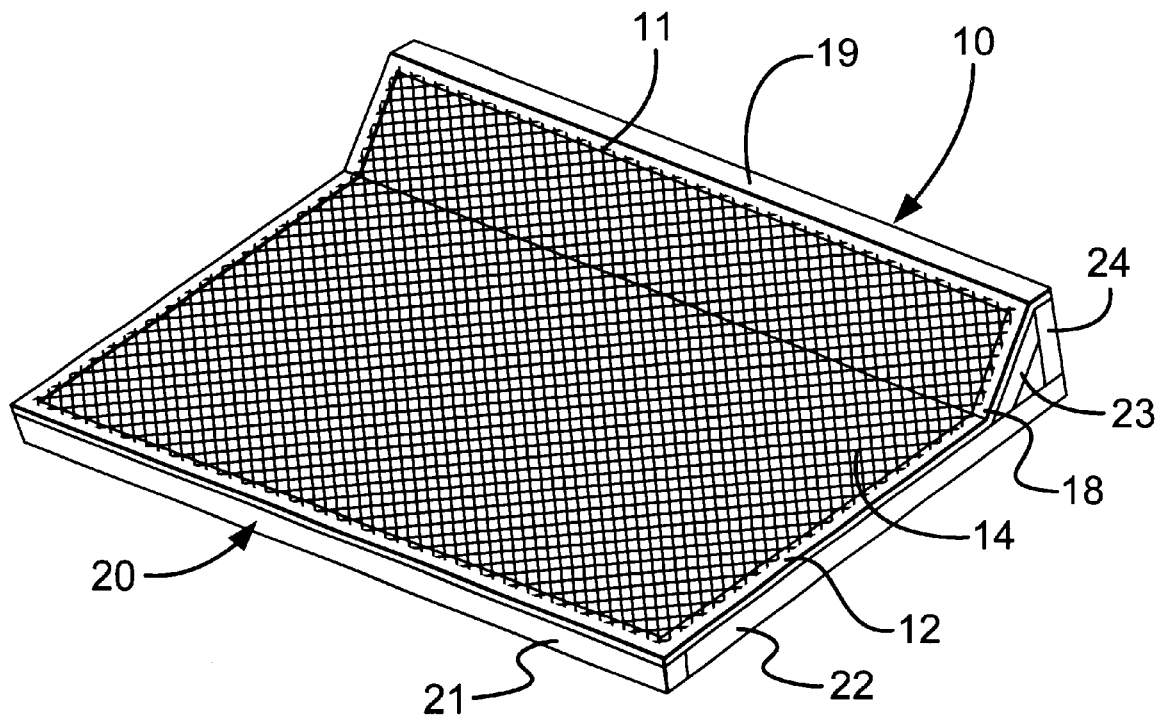
FIGS. 44A, 44B, and 44C are perspective views of screens according to the present invention.
Figure 44B:
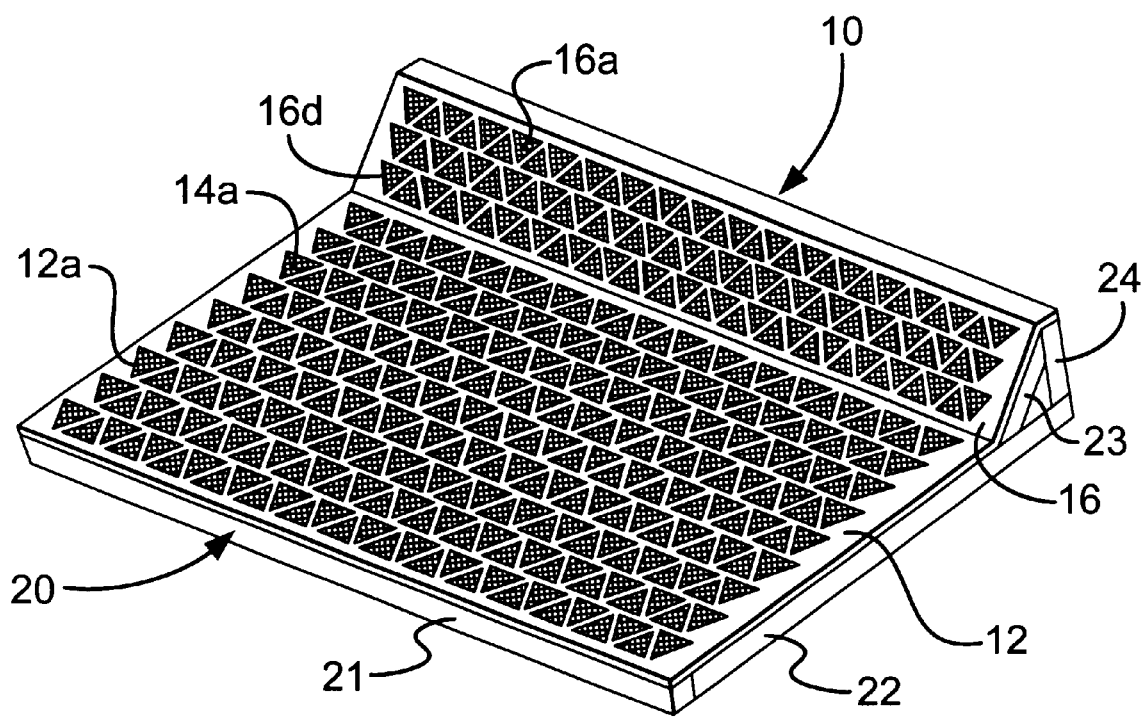

FIGS. 44A and 44B show a screen assembly 10 according to the present invention which has a top panel 12 on which is a layer (or layers, e.g., two, three, four, or more) 14 of screen mesh. The layer 14 is bonded with an epoxy or similar adhesive to the panel 12. The panel 12 and screen mesh layer(s) are mounted on a frame 20 with four sides (two shown, sides 21, 22). Optionally, support crossmembers may be used between pairs of sides of the frame 20.

An end portion 16 of the screen assembly 10 has a panel 18 at an angle to the panel 12. Screen mesh 11 on the panel 16 is like the screen mesh 14 (and, similarly, two, three, four or more layers may be used for the mesh 11). Two pairs of support members connected to the frame 20 (one shown, support members 23, 24) support the panel 16 above the level of the panel 12. A top portion 19 of the panel 16 rests on top ends of the support 24 and another support (not shown) at the opposite side of the frame 20 form the support 24. As shown in FIG. 44B screen mesh 14a, optionally, is connected to, bonded to or adhered to an underside of the panel 12 and screen mesh 16a is connected to, bonded or adhered to and underside of the panel 16. Either mesh 14a or 16a may include two, three, four or more mesh layers.

Both the panel 12 and the panel 16 have a plurality of openings 12a and 16d, respectively, therethrough. As shown, these openings are triangular, but it is within the scope of this invention to employ any suitable shape for these openings including, but not limited to, square, rectangular, oval, and polygonal (including, but not limited to, any disclosed or referred to herein)—and to employ any pattern, number and size of openings.

In certain particular aspects the panels 12 and 16 are made of plastic, nylon, mild steel, polypropylene, fiberglass, stainless steel, zinc, zinc alloy, aluminum, aluminum alloy, or brass; and, in one aspect in which mild steel is used, these panels are about 0.06 to about 0.14 inches thick inches thick; and the frame 20 and its supports are made of similar materials. In certain embodiments the end 16 is between 3 and 12 inches above the flat panel 12. In one aspect the end 16 is about four inches above the flat panel 12.

With the panel 16 at an angle to the panel 12 the movement of solids across the screen assembly is facilitated. In certain embodiments fluid is fed to the screen assembly by introducing it at the end of the screen assembly with the panel 16. In one particular aspect the screen mesh layer 14 includes four layers; e.g., a topmost layer of 30 mesh with a 0.0065 inch wire diameter, a next 160 mesh layer with a 0.0014 inch wire diameter, a next 180 mesh layer with a 0.0012 inch wire diameter, and a lowermost 20 mesh layer with a 0.016 inch wire diameter; but any suitable layer(s) of screen, screens, mesh, and/or meshes may be used, including, but not limited to any disclosed or referred to herein.

Figure 44C:
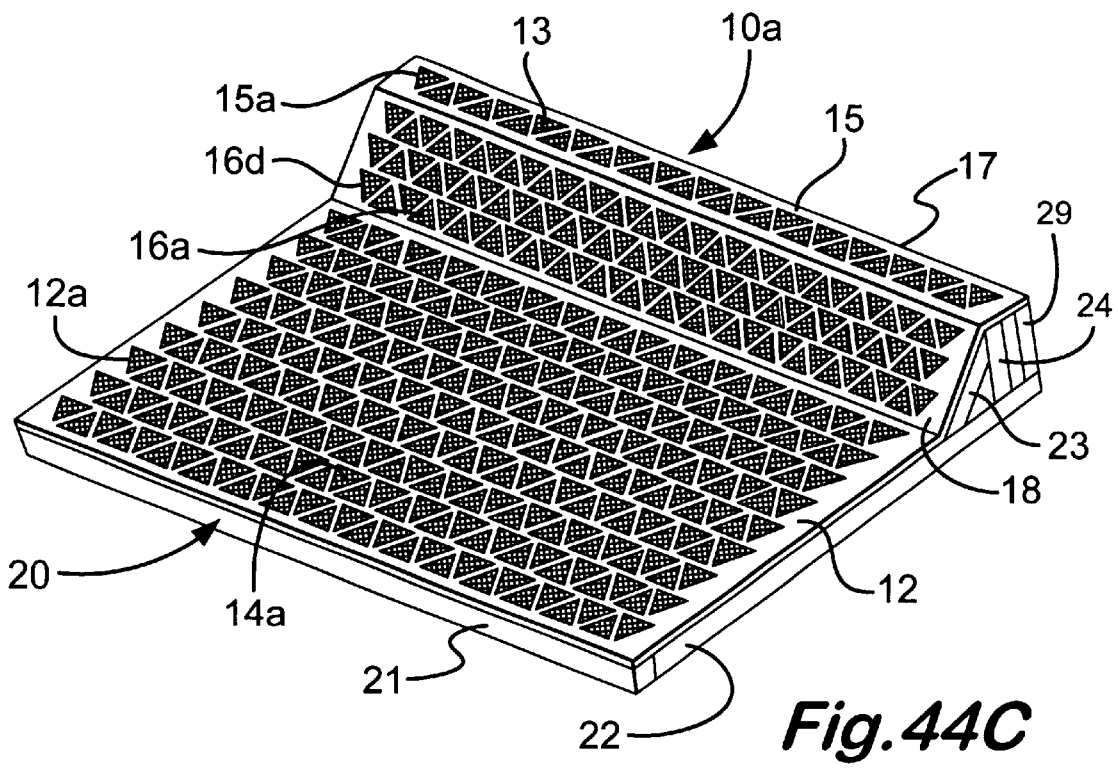

FIG. 44C shows another version, screen assembly 10*a*, of the screen assembly 10 of FIG. 44A (and like numerals indicate like parts). The screen assembly 10*a* has a top portion 17 with a panel 15 (like the panels 12, 16) which has openings 15*a* therethrough. Optionally additional supports (one shown, support 29) are used to support the panel 15. Screen mesh 13 on the panel 15 is like the screen mesh 14. It is to be understood that the mesh 14 and the mesh 16 of FIG. 44A may be used with the screen assembly of FIG. 44C.

Figure 45D:
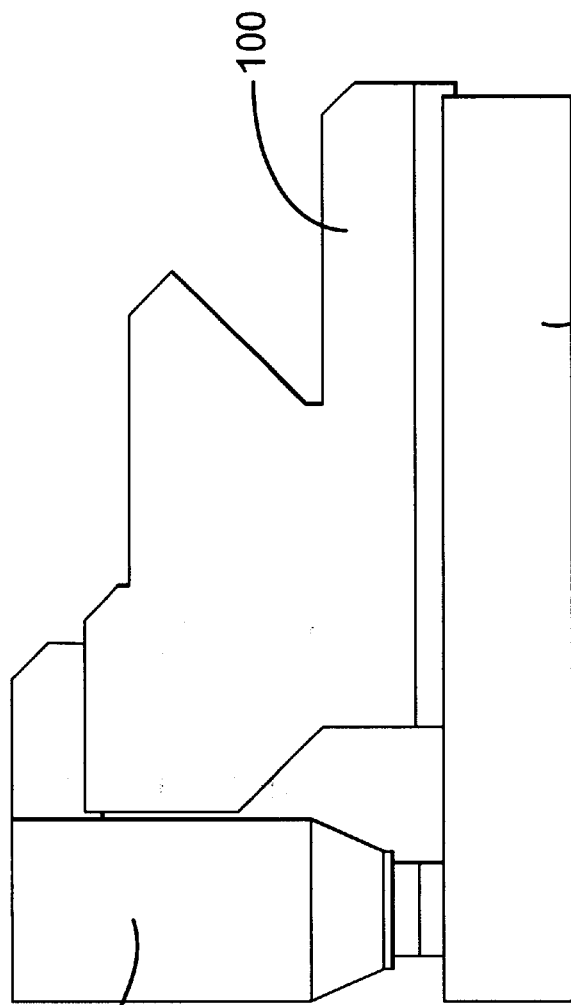
FIG. 45D is an end view of a screen according to the present invention.

FIG. 45D shows a screen assembly 30 with a panel 32. The panel 32 (see FIGS. 45A, 45B) has a base 33 to which are releasably secured a plurality of mesh supports 34. Any suitable screen(s) and/or mesh(es) is/are used on the mesh supports 34 over holes 37 in the mesh supports and over holes 38 in the base 33. Arrows in FIG. 45B indicate the direction of fluid flow through holes 37 in the supports 34 and holes 38 in the base 33.

Figure 45C:
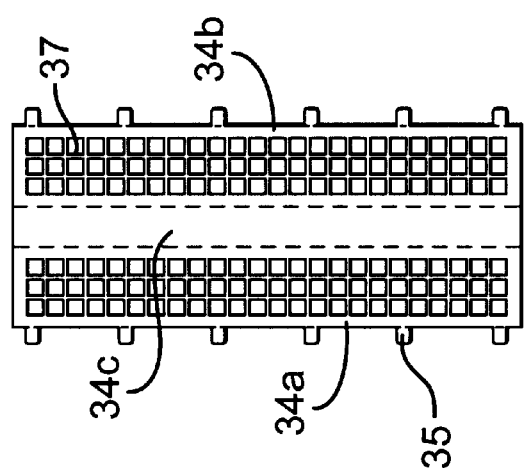
FIG. 45C is a top view of part of the screen of FIG. 45D.

As shown in FIG. 45C each mesh support 34 has two sides 34*a*, 34*b*, a top part 34*c* and a plurality of spaced-apart bendable tabs 34. The tabs 35 are inserted through corresponding holes 39 in the base 33 and then bent to secure the mesh supports 34 to the base 33. In one aspect, prior to bending of the supports 34, screen 31. one or more layers, is applied over the supports 34. In another aspect screen is applied to the structure as shown in FIG. 45B. The supports 34 and the base 33 may be made of any suitable material (e.g., like the panels in FIGS. 45A–45C). In one particular aspect the base 33 and mesh supports 34 are made of mild steel about 0.06 to about 0.14 inches thick. The screen mesh 31 may be any suitable screen(s) and/or mesh(es), including but not limited to any disclosed or referred to herein. Any known mounting hardware and/or hookstrips may be used on a panel 32 or it may be mounted on any known frame or strip support. In one aspect fluid to be screened flows across the screen assembly of FIG. 45D (from top to bottom as viewed in FIG. 45A). Small holes 32*a* around the panel 32 receive epoxy or adhesive and facilitate the adhesion or bonding of the panel 32 to a frame or support.

The mesh supports 34 have a height in certain embodiments, of two, three, four, five, six or more inches. This height, which is significantly higher than the height of ridges, etc. in certain known "three-dimensional" ridged prior art screen assemblies and, thus, screen assemblies according to the present invention present screening material on sides of the supports 34 not covered by solids to fluid to be screened (unlike certain prior art ridged screen assemblies in which screening material in troughs between ridges is covered in operation by solids). Also, by using such mesh supports in certain embodiments of the present invention significantly more screening area is provided in the same floor space or area on a rig or derrick site as compared to the area required for prior art screen assemblies with much less screening area.

In one particular aspect a screen assembly 30 has a base 33 that is about 49.25 inches long and 24.875 inches wide. The holes around the periphery of the base 33 are about 1.01 inches apart and the holes 38 are about 1 inch wide, some of them being 1 inch squares, others being rectangles about 1.5 inches long. The screening layers over the base 33 and mesh supports 34 include a lower layer of 32 mesh, a middle layer of 160 mesh, and an upper layer of 180 mesh all bonded together with epoxy or similar adhesive. Holes 37 may be provided in the tops 34*c* of the mesh supports 34 and screening material layer(s) may be provided over these holes. Instead of the tabs 35/holes 39 structure for connecting the mesh supports 34 to the base 33, any suitable connectors and/or adhesive and/or welding may be used to releasably or permanently connect the mesh supports 34 to the base 33.

Alternatively, the support/base structure may be one piece that is bent into the shape shown in FIG. 45B.

Figure 47A:
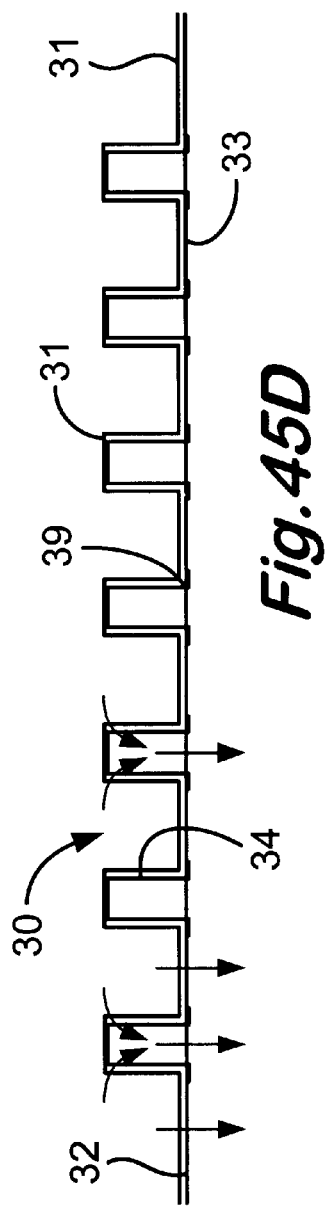
FIG. 47A is a side view of a vibratory separator according to the present invention showing a screen container therein according to the present invention with screens therein according to the present invention.
Figure 46A:
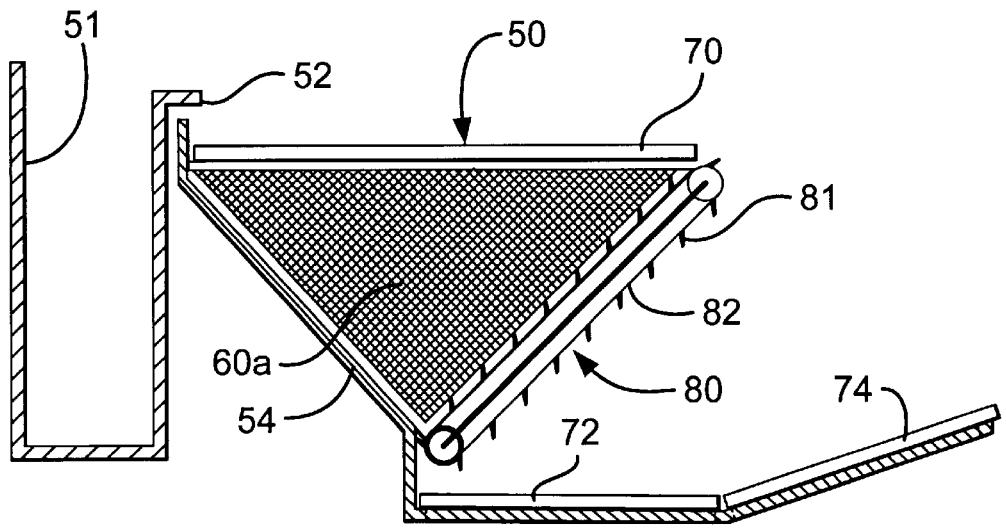
FIG. 46A is a side view in cross-section of a vibratory separator according to the present invention showing a screen according to the present invention.
Figure 46B:
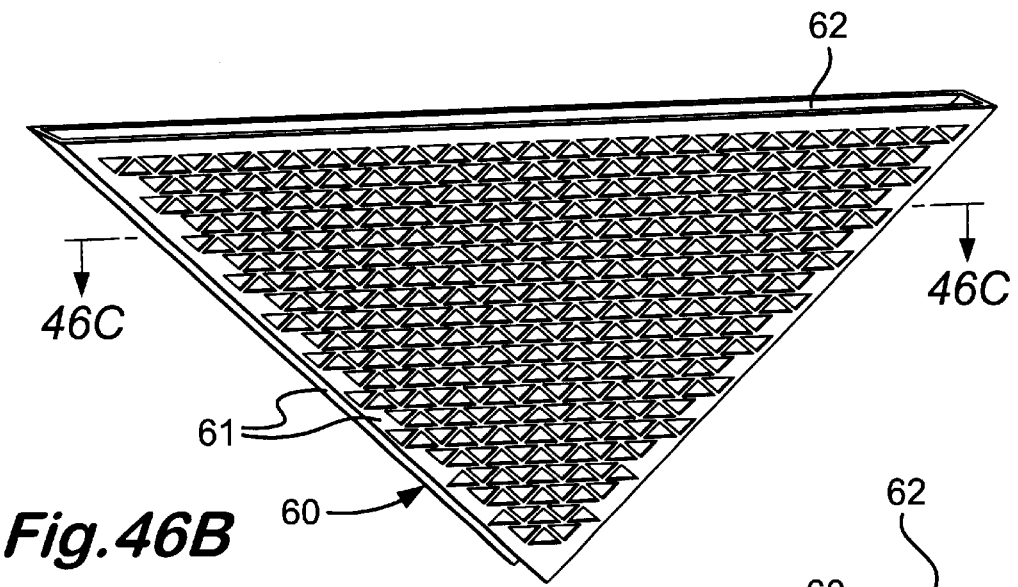
FIG. 46B is a perspective view of the screen shown in FIG. 46A.
Figure 46C:
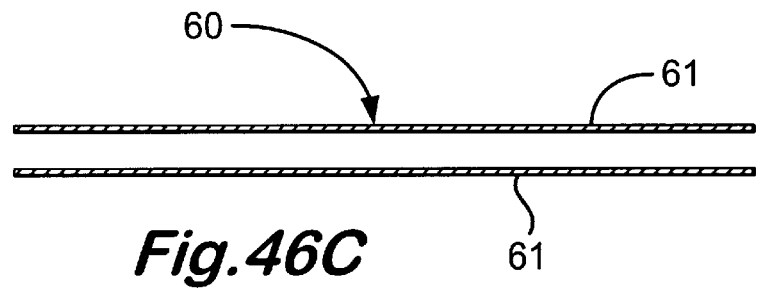
FIG. 46C is a cross-section view along line 46C—46C of FIG. 46B.
Figure 46D:
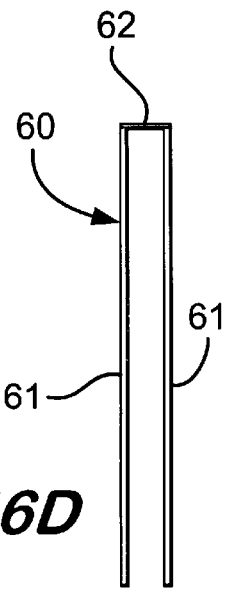
FIG. 46D is an end view of the screen of FIG. 46B.

FIG. 46A shows a vibratory separator apparatus 50 for use in a vibratory separator, e.g. as shown in FIG. 47A, which has plurality of screen assemblies 60 with screening material 60*a* thereon.

Fluid with material to be separated flows from a tank or possum belly" 51 over its lip 52 onto an optional scalping screen 70 (e.g., of 10 mesh) to remove pieces and particles 0.06 inches or greater in size. Fluid with other particles therein passing through the scalping screen 70 flows onto a top 62 of each of a plurality of spaced-apart screen assemblies 60. Any suitable screen material layer(s) 60*a* may be used over the top 62 and over sides 61 of the screen assemblies 60 and, alternatively, the screen assemblies 60 may be a single folded or bent piece of single or multi-layer screening material and/or mesh. A back-up plate prevents over-sized particles from flowing out from between the screen assemblies 60 and insures that screened solids flow from the screen assemblies 60 to drying screens 72, 74. Each screen assembly 60 may have perforated sides 61 with screen mesh layer(s) and/or screening material on the inside and/or outside of each side 61. Any screen material(s) and/or mesh(es) disclosed or referred to herein may be used.

Solids filtered out from fluid and not passing into the interior of the screen assemblies 60 is transported away from the screen assemblies 60 by paddles 81 on a moving belt 82 of a conveyor system 80 (mounted, e.g. to sides of a shaker basket or to other parts thereof. The conveyor system 80 moves the solids away from sides 61 of the screen assemblies 60 and onto the drying screens 72, 74. Any suitable shale shaker screens may be used for the screens 72, 74.

Figure 47B:
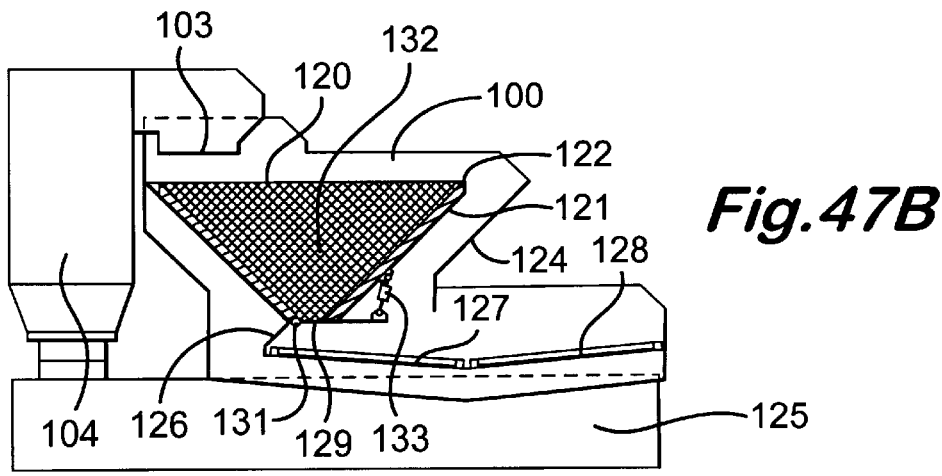
FIG. 47B is a side view of the vibratory separator of FIG. 47A.
Figure 47C:
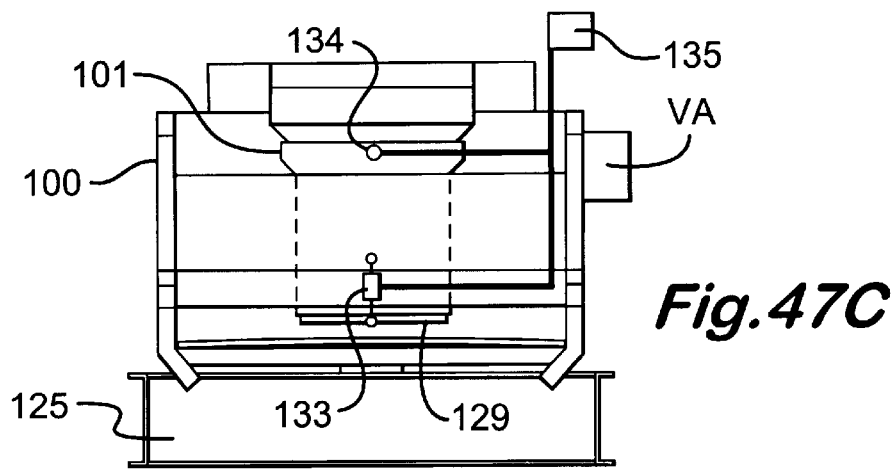
FIG. 47C is an end view of the vibratory separator of FIG. 47A.
Figure 47D:
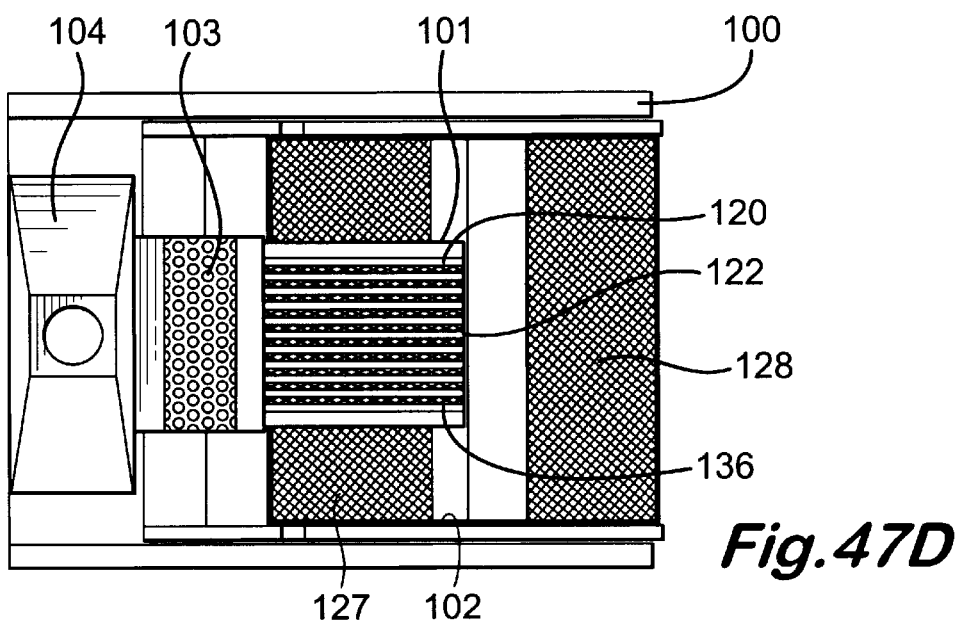
FIG. 47D is a top view of the vibratory separator of FIG. 47A.
Figure 47E:
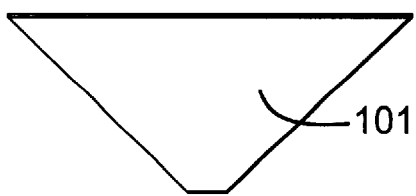
FIG. 47E is a side view of a screen container according to the present invention like the screen container in the vibratory separator of FIG. 47A.
Figure 47F:
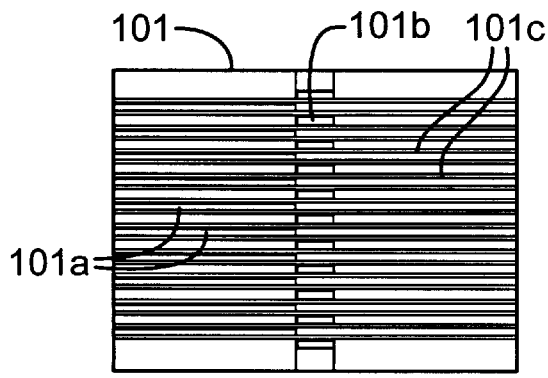
FIG. 47F is a top view of the container of FIG. 47E.
Figure 47G:
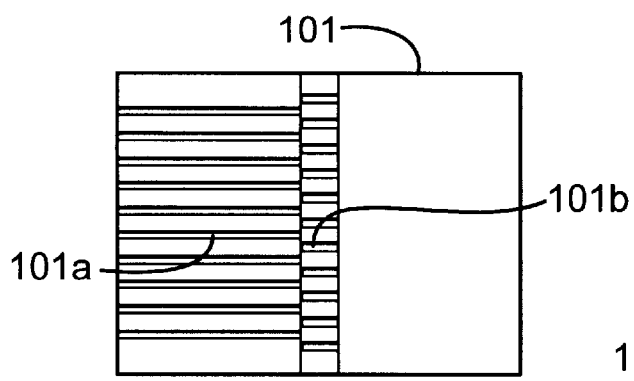
FIG. 47G is an bottom view of the container of FIG. 47E.
Figure 47H:
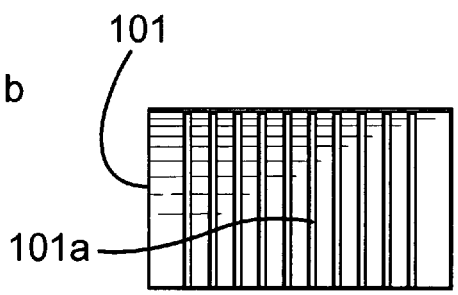
FIG. 47H is an end view of the container of FIG. 47E.
Figure 48A:
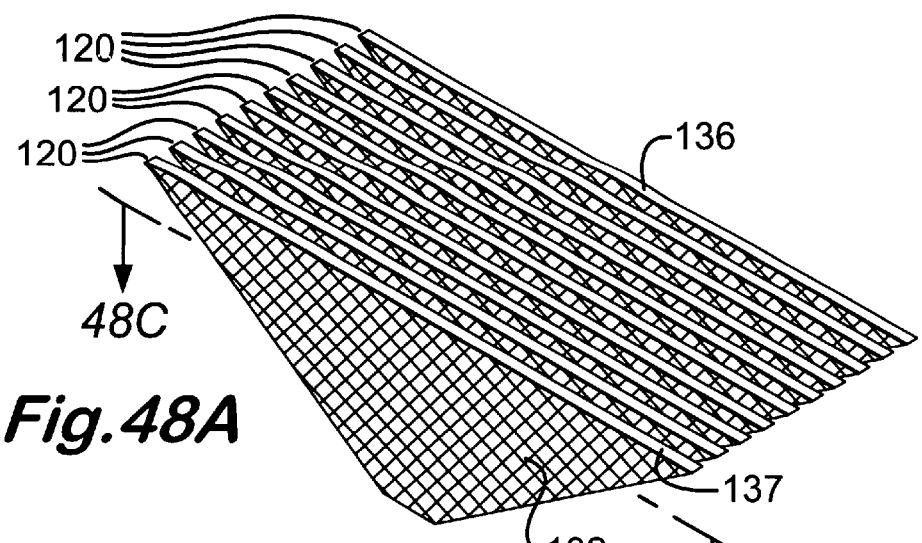
FIG. 48A is a perspective view of screens according to the present invention.
Figure 48B:
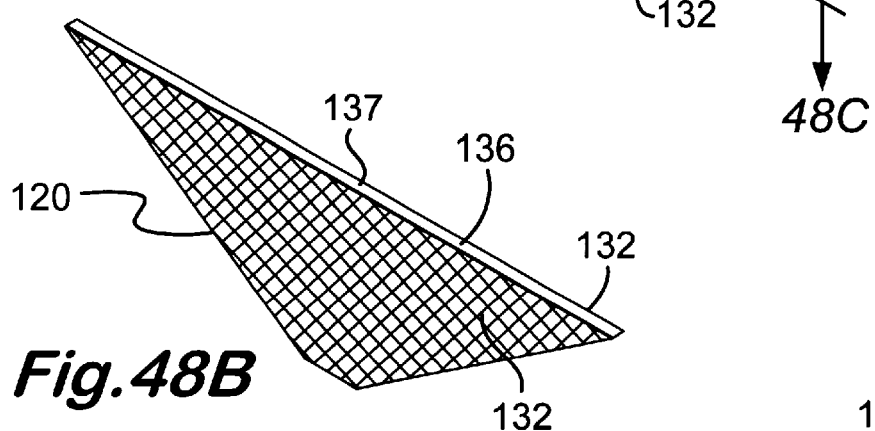
FIG. 48B is a perspective view of one of the screens of FIG. 48A.
Figure 48C:
FIG. 48C is a cross-section view of the screen of FIG. 48A along line 48C—48C.
Figure 48D:
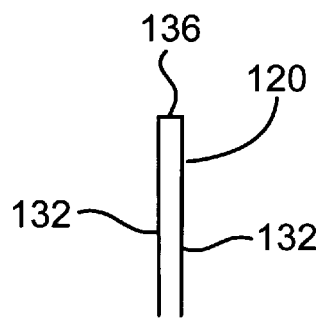
FIG. 48D is an end view of the screen of FIG. 48B.
Figure 48E:
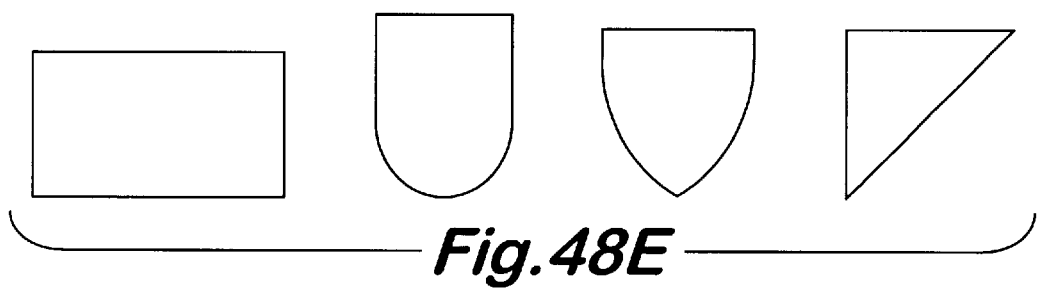
FIG. 48E presents side views of screen assemblies according to the present invention.

FIGS. 47A–47C show another embodiment of systems according to the present invention with vertically oriented screen assemblies (see FIGS. 48A–48C) for a vibratory separator. e.g., but not limited to, a shale shaker. A shale shaker 100 has a plurality of screens 120 mounted within a container 101 secured to a basket 102. Fluid to be treated flows into a tank 104 ("possum belly") of the shaker 100, through an optional distributor plate 103, into the container 101 and onto and then through screen sides 132 and through screen tops 136 into the screens 120. A vibrating apparatus VA is shown schematically in FIG. 47C and may be any suitable known vibrator(s) or vibrating apparatus(es) known in the art, including, but not limited to, any disclosed in any prior art patent, patent, or application referred to herein.

Some of the solids in fluid to be treated may accumulate in the container 101 between the screens 120 and may not pass through the screens 120. Such solids can move up and flow over an end 122 of the container 101 or a gate 129 is opened to allow these solids to flow out lower openings 101*b* in the container 101 and then down to screens 127, 128. Fluid from which solids have been separated by the screens 120 flows down due to gravity and out slots 101*a* in the container 101. An optional diverter plate 124 directs solids that fall onto it onto the screen assemblies 127, 128. The solids (with some fluid) fall to the screen assemblies 127, 128 which are vibrated to further separate solids and fluid and to move the solids off the end (to the right in FIG. 47B) of the shaker 100.

Fluid flowing through he screens 120 and through he screen assemblies 127, 128 falls into a sump 125 for collection, further treatment, re-use, etc. An optional plate 126 prevents fluid that has passed through the screens 120 from flowing to the screen assemblies 127, 128.

The gate 129 may be a plate which is movably connected, e.g. with a hinge 131 to the container 101 and each screen is disposed above one of the bottom openings 101b. If separated solids build up between the screens 120 in the container 101, the gate 129 may be lowered to permit such built up solids to flow out from the container 101 onto the lower screen assemblies 127, 128. Optionally, a remotely controllable cylinder 133 (controllable with a control system 135) may be used to selectively move the gate 129. Optionally a sensor 134 may be interconnected with the control system 135 for controlling movement of the gate 129.

Figure 47I:
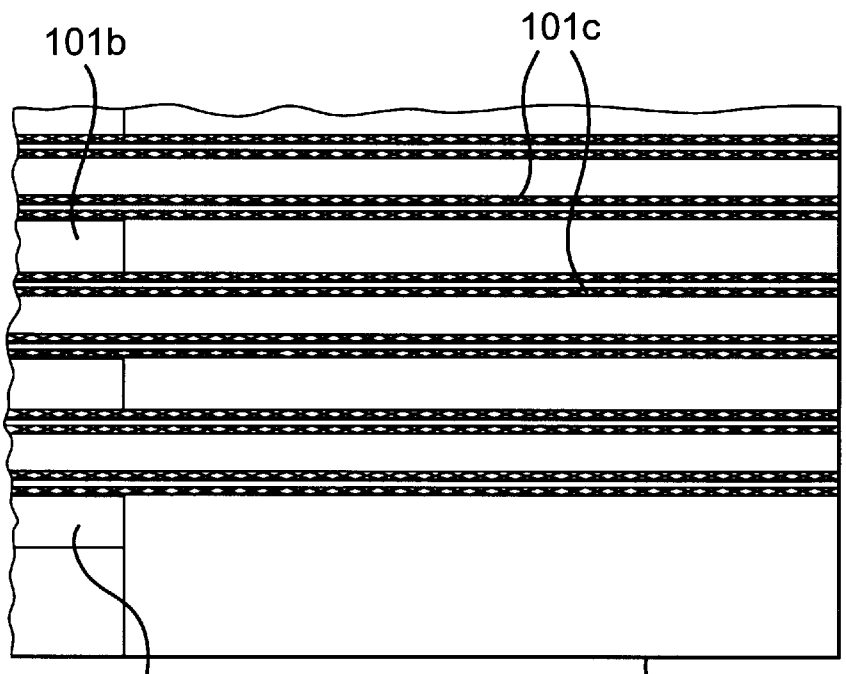
FIG. 47I is an enlargement of part of the container of FIG. 47E.

The tops 136 of each screen 120 may be screening material and, in certain aspects a grid, grill, screen, mesh or cross-members are used under the screening material; or, as shown in FIG. 48 a plurality of cross-members 137 may be used between sides 132. In one embodiment the screens 120 are made from a single layer and a single folded piece of screening material. In another aspect the screens 120 are made from superimposed layers of screening material —optionally bonded, connected, and/or adhered together— that is initially flat and then is bent or folded into the shape shown in FIG. 48D (or any suitable shape, including but not limited to those of FIG. 48E). Sides 132 of such screens 120 are received in slots 101c (see FIG. 47I) of a container 101 to correctly mount and position the screens 120 in the container 101. Optionally, screens may be bolted, screwed, epoxied, cemented, glued and/or welded in place in the container. Screening material may be used on the inside and/or on the outside of screens 120 and may be any screening material layer(s) and/or mesh(es) referred to herein. FIG. 48E shows possible shapes (viewed from the side) for screen containers and screens according to the present invention.

Figure 49C:
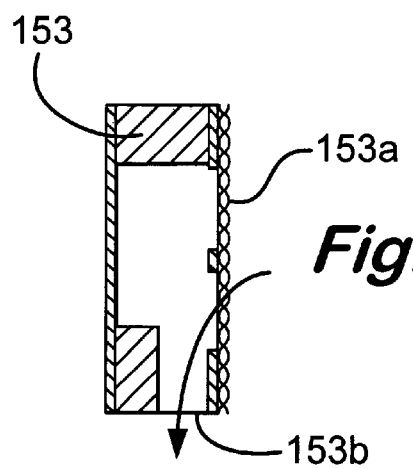
FIG. 49C is a cross-section view of one of screen of FIG. 49B.
Figure 49D:
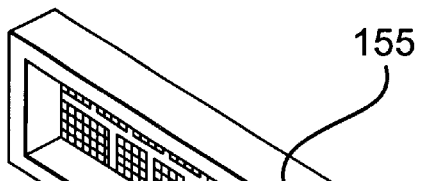
FIG. 49D is a perspective view of a screen according to the present invention.
Figure 49E:
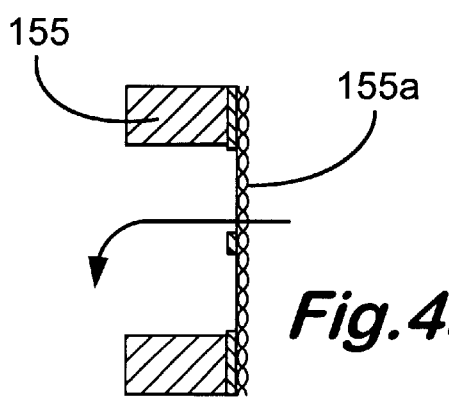
FIG. 49E is a cross-section view of the screen of FIG. 49D.
Figure 49A:
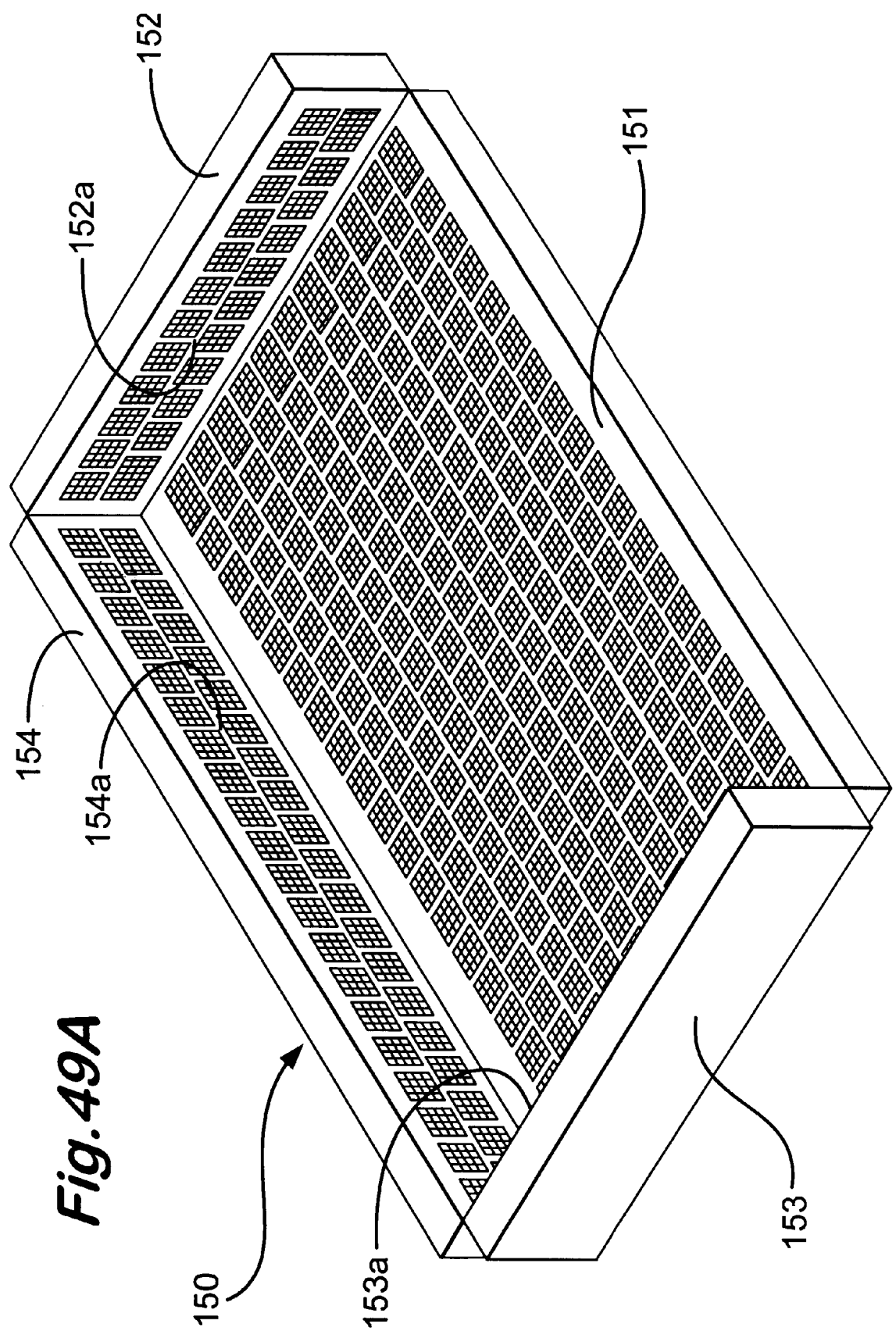
FIG. 49A is a perspective view of a multi-screen arrangement according to the present invention.
Figure 49B:
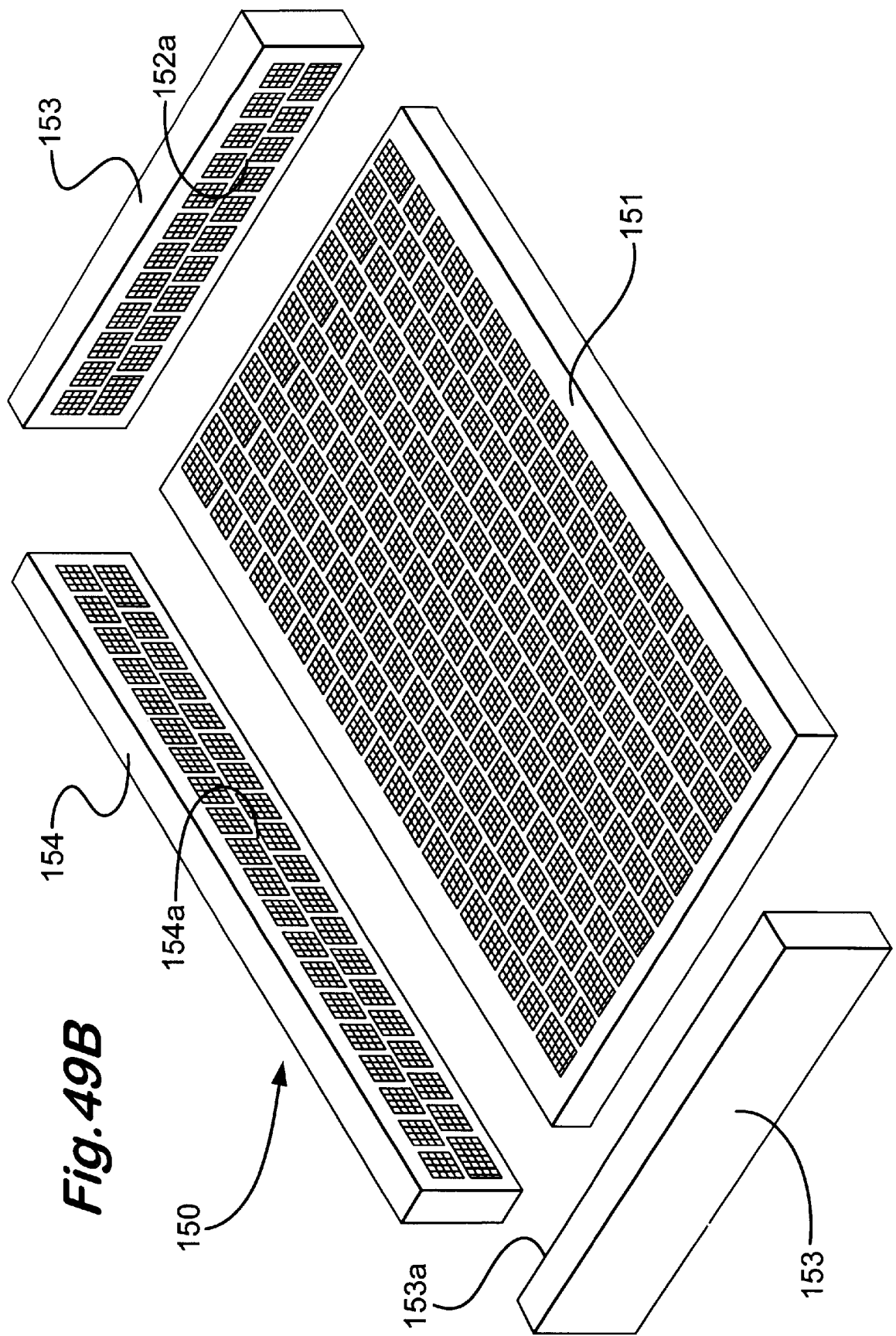
FIG. 49B is a perspective exploded view of the screen arrangement of FIG. 49A.

FIGS. 49A and 49B show a screen assembly 150 according to the present invention for use in a vibratory separator. The screen assembly 150 has a lower screen 151 (which may be any known screen assembly for a vibratory separator or shale shaker, or any screen or screen assembly disclosed herein) against which are mounted and/or to which are secured side screens 152, 153 and, optionally, an end screen 154. Fluid with entrained solids (e.g. but not limited to drilling fluid and fluid with lost circulation material therein) flows onto the screen 154 (if present) then across the screen 151 (from right to left in FIG. 49A). The screens 152–154 are hollow early with a screened side 152a, 153a, 154a. As shown in FIG. 49C, fluid can flow through the screened side into the screen and then out through a bottom opening (153b in FIG. 49C). Any suitable screen, screens, mesh, and/or meshes may be used for or over the screened sides 152a–154a. Although the screens 152–154 are shown in FIG. 49A as extending beyond outer boundaries of the lower screen 151, it is within the scope of this invention to have screen 152, screen 153, and/or screen 154 positioned above the screen 151 so that fluid screened by one of the screens 152–154 is also screened by the screen 151. Alternatively, the screens 152–154 may be positioned so that fluid flow out from their bottoms flows through corresponding holes in the screen 151.

FIG. 49D shows an alternative embodiment 155 for any or all of the screens 152–154 in which fluid flows through a screened side 155a and not through a bottom opening in the screen.

FIG. 50A shows part of a tubular frame 160 used as a screen support for screening material for a screen assembly according to the present invention for use in a vibratory separator or shale shaker. The frame 160 has a top member 161 and a bottom member 162. A plurality of cross members 163 (one shown) interconnect the top and bottom members. One, two, three, four, or more holes 164 (or a series of perforations through the bottom member 162) provide for fluid flow through the bottom member 162 (shown as hollow; solid bottom members with one or more holes or perforations may be used). In one aspect the top member also has such a hole or holes 164.

FIGS. 50B and 50C show a perforated plate 200 for supporting screening material (not shown) for a screen assembly for a vibratory separator, particularly for an end screen or side basket screen according to the present invention as described herein. The perforated plate 200 has a plurality of spaced-apart openings 201 or holes extending through the plate from one surface to the other. A second series of spaced-apart openings 202 or holes extend from the topmost row of openings 201 (as viewed in FIG. 50B) to a bottom side 203 of the plate 200. Openings 202 intersect openings 201 so that fluid flowing into an opening 201 can flow down (as viewed in FIG. 50B) and out from the plate 200, e.g. into a receptacle of a vibratory separator or shale shaker beneath a basket in which is mounted a screen assembly with such a plate.

The present invention, therefore, provides screen assemblies and a vibratory separator with them, the vibratory separator, in at least certain aspects having a base, vibrating apparatus, a screen container on the base, the screen container having a plurality of spaced-apart drain holes, a plurality of spaced-apart screens in the screen-container, said screens oriented vertically within the screen container, and the screens positioned so that screened fluid passes through the screens and flows from the container through the plurality of spaced-apart drain holes. Such a vibratory separator may have one or some—in any possible combination—of the aspects, features, and/or appratuses in the claims that follow.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. §102 and satisfies the conditions for patentability in §102. The invention claimed herein is not obvious in accordance with 35 U.S.C. §103 and satisfies the conditions for patentability in §103. This specification and the claims that follow are in accordance with all of the requirements of 35 U.S.C. §112. The inventors may rely on the Doctrine of Equivalents to determine and assess the scope of their invention and of the claims that follow as they may pertain to apparatus not materially departing from, but outside of, the literal scope of the invention as set forth in the following claims.

What is claimed is:

1. A shale shaker for treating material including drilling fluid with solids entrained therein, the shale shaker comprising a base, vibrating apparatus, a screen container on the base, the screen container having a plurality of spaced-apart drain holes, a plurality of spaced-apart screen assemblies in the screen-container for screening solids from the drilling fluid, said screen assemblies oriented vertically within the screen container, each screen assembly having perforated spaced-apart sides and an interior space between said perforated spaced-apart sides, and the screen assemblies positioned above the plurality of spaced-apart drain holes so that screened drilling fluid is passable down from the screen assemblies into said drain holes, the screen assemblies positioned so that screened fluid passes through the screen assemblies and flows from the container through the plurality of spaced-apart drain holes.

2. The shale shaker of claim 1 further comprising a screen apparatus positioned beneath the screen container for screening material that flows down from the screen container.

3. The shale shaker of claim 1 further comprising the container having at least one bottom opening through which material is passable without passing through a screen of the plurality of spaced-apart screens, and a selectively movable gate apparatus for selectively opening the at least one bottom opening to allow material to pass through.

4. The shale shaker of claim 3 further comprising control apparatus including sensor apparatus for sensing an amount of material to be treated within the screen container that has not passed through the screens, the control apparatus for opening the selectively movable gate upon sensing of said amount.

5. The shale shaker of claim 3 further comprising screen apparatus positioned beneath the screen container for screening material that flows down from the screen container.

6. The shale shaker of claim 2 wherein the screen apparatus comprises a plurality of screen assemblies placed end-to-end.

7. The shale shaker of claim 1 further comprising a feed tank into which material to be treated is initially fed and from which material is supplied to the screen container for treatment.

8. The shale shaker of claim 1 further comprising a distributor apparatus for distributing a feed of material into the screen container.

9. The shale shaker of claim 1 further comprising the screen container having a plurality of screen mounting slots with a pair of mounting slots corresponding to each screen of the plurality of spaced-apart screens, each slot of each pair of mounting slots for receiving part of a screening side.

10. The shale shaker of claim 1 wherein the screen assemblies have a height of at least three inches.

11. The shale shaker separator of claim 1 wherein the screen assemblies have a height of at least four inches.

12. The shale shaker of claim 1 further comprising a lower receptacle for receiving drilling fluid from the screen container.

13. The shale shaker of claim 12 further comprising direction apparatus beneath the screen container for directing screened drilling fluid flowing from the screen container into the lower receptacle.

* * * * *